US 8,050,827 B2

(12) United States Patent
Hasegawa et al.

(10) Patent No.: US 8,050,827 B2
(45) Date of Patent: Nov. 1, 2011

(54) VEHICLE TRANSMISSION SYSTEM

(75) Inventors: Toshiyuki Hasegawa, Hyogo (JP);
Tomoyuki Ebihara, Hyogo (JP); Hideki Kanenobu, Hyogo (JP); Kazunari Koga, Hyogo (JP); Norihiro Ishii, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 429 days.

(21) Appl. No.: 12/261,802

(22) Filed: Oct. 30, 2008

(65) Prior Publication Data

US 2009/0120710 A1    May 14, 2009

Related U.S. Application Data

(63) Continuation-in-part of application No. 11/488,665, filed on Jul. 19, 2006, now Pat. No. 7,601,095.

(30) Foreign Application Priority Data

Jul. 20, 2005   (JP) ................................ 2005-209975
Jul. 20, 2005   (JP) ................................ 2005-210637
Mar. 16, 2006   (JP) ................................ 2006-071929

(51) Int. Cl.
*G06F 7/00*      (2006.01)
*F16H 59/00*     (2006.01)

(52) U.S. Cl. ........................................ 701/51; 74/335

(58) Field of Classification Search .................... 74/330, 74/333, 335, 339, 340, 467, 665 G, 665 GA; 477/51, 53, 54, 68, 74, 120, 124, 143, 180; 701/51, 53, 54

See application file for complete search history.

(56) References Cited

U.S. PATENT DOCUMENTS 4,485,687 A   12/1984   Burke et al.
(Continued)

FOREIGN PATENT DOCUMENTS

EP       0029711 A2    6/1981
(Continued)

OTHER PUBLICATIONS

U.S. Appl. No. 12/562,551, Hasegawa et al., "Vehicle," filed Sep. 18, 2009.

*Primary Examiner* — David D Le
*Assistant Examiner* — Michael Gonzalez
(74) *Attorney, Agent, or Firm* — Sterne, Kessler, Goldstein & Fox P.L.L.C.

(57) ABSTRACT

A vehicle has an engine, an accelerator for controlling the rotary speed of the engine, an axle and a multi-speed transmission for transmitting power from the engine to the axle. The multi-speed transmission includes an odd-numbered speed drive train for an odd-numbered speed level, a first clutch for the odd-numbered speed drive train, an even-numbered speed drive train for an even-numbered speed level, and a second clutch for the even-numbered speed drive train. In correspondence to operation of the accelerator and an actual speed of the axle, either the odd-numbered speed drive train or the even-numbered speed drive train is selected so as to transmit power from the engine to the axle. A shift-up or shift-down timing between the odd-numbered speed level and the even-numbered speed level relative to variation of the actual speed of the axle is changed according to detection of a tilt angle of the vehicle or a weight of the vehicle.

7 Claims, 43 Drawing Sheets

U.S. PATENT DOCUMENTS

| | | | |
|---|---|---|---|
| 5,079,965 A | 1/1992 | Leber et al. | |
| 5,385,064 A | 1/1995 | Reece | |
| 5,390,560 A | 2/1995 | Ordo | |
| 5,599,247 A | 2/1997 | Matsufuji | |
| 5,890,392 A | 4/1999 | Ludanek et al. | |
| 6,086,510 A * | 7/2000 | Kadota | 477/107 |
| 6,345,224 B1 * | 2/2002 | Schumacher et al. | 701/69 |
| 6,793,604 B2 | 9/2004 | Kobayashi | |
| 6,932,735 B2 * | 8/2005 | Kao et al. | 475/276 |
| 7,066,043 B2 | 6/2006 | Kim et al. | |
| 7,080,567 B2 | 7/2006 | Hatakeyama | |
| 7,127,961 B2 | 10/2006 | Bradford et al. | |
| 7,225,696 B2 | 6/2007 | Gitt | |
| 7,529,607 B2 * | 5/2009 | Aubert | 701/55 |
| 2003/0226416 A1 * | 12/2003 | Umemoto et al. | 74/335 |
| 2005/0000307 A1 | 1/2005 | Gumpoltsberger | |
| 2006/0293149 A1 * | 12/2006 | Landes | 477/181 |

FOREIGN PATENT DOCUMENTS

| | | |
|---|---|---|
| JP | 2000038042 | 2/2000 |

* cited by examiner

Fig. 14

| Speed of Main Transmission | | State of Clutch | | Position of Shifter |
|---|---|---|---|---|
| | | C 1 | C 2 | 568a,569a,570a |
| Forward | F4 | OFF | ON | f 4 |
| | F3 | ON | OFF | f 3 |
| | F2 | OFF | ON | f 2 |
| | F1 | ON | OFF | f 1 |
| Backward | R | OFF | ON | r |

F1-F4 : Forward-Traveling 1st-4th Speeds
R : Backward-Traveling Speed

Fig. 15

| Speed of Main Transmission | | Cross Wave Control | Engine Cooperation |
|---|---|---|---|
| Forward | Backward | | |
| F4 | | Not Applied | Not Applied |
| F3 | | Applied | Applied |
| F2 | R | Not Applied | Applied |
| F1 | | Applied | Applied |

Comparison of Maximum Traveling Speeds without Engine Cooperation
V(F3)＜V(R)＜V(F4)

VEHICLE TRANSMISSION SYSTEM

CROSS REFERENCE TO RELATED APPLICATION

This application is a continuation-in-part of U.S. application Ser. No. 11/488,665, filed Jul. 19, 2006, the entire disclosure of which is incorporated herein by reference.

BACKGROUND OF THE INVENTION

1. Field of the Invention

The invention relates to a vehicle transmission system for vehicles such as a tractor or a utility vehicle equipped with a cargo.

2. Related Art

Conventionally, as disclosed in Japanese Laid Open Gazette No. 2000-38042, there is a well-known vehicle including an engine and an axle drivingly connected to each other through a power transmission system consisting of a belt-type continuously variable transmission (hereinafter, "CVT") and a gear-type sub transmission. Due to the CVT, the power transmission system is advantageous for speed change of the vehicle while continuously (not intermittently) transmitting power from the engine to the axle.

However, the CVT has peculiar disadvantages, such as slipping of the belt when wet, short durability of the belt, and inability of engine braking. Further, the gear-type sub transmission requires an onerous clutch-off operation before its gearshift operation.

To solve the problems, it has been suggested that an alternative multi-speed (i.e., discontinuously variable) transmission, such as a gear transmission, solely replace the conventional combination of the CVT and the gear-type sub transmission. However, there still exists the problem that the alternative multi-speed transmission cannot ensure a proper sufficient traveling performance for a vehicle because disengagement of its clutch for gearshift causes a cut-off of the power transmission to the axle, which may cause unexpected movement of a vehicle traveling on a slope.

Further, some works such as snow-removing by a loader requires the vehicle to frequently repeat switching of forward/backward traveling direction (hereinafter, "forward/backward traveling direction switching"). For example, when the vehicle having traveled forward needs to travel backward, the forward-traveling speed stage is manually or automatically shifted down to the neutral stage, so that the neutral stage must be established before a target backward-traveling speed stage is established, thereby requiring a long time for switching the forward/backward traveling direction of the vehicle. Thus, the vehicle is provided with a reverser which can be operated once for promptly changing the forward/backward traveling direction of the vehicle. However, the conventional reverser includes a forward-traveling clutch to be engaged for forward traveling and a backward-traveling clutch to be engaged for backward traveling. The forward-traveling clutch and the backward-traveling clutch are separated from speed-changing clutches of the gear-type sub transmission for establishing various speed stages, and are provided upstream of the speed-changing clutches. Consequently, the reverser increases the number of clutches requiring costs, spaces (obstruction to minimization), complex fluid ducts, and reduction of maintenancability.

Further, it has been suggested that the gearshift of the multi-speed transmission be automatically controlled corresponding to an accelerator operation. However, if the gearshift timing relative to an actual traveling speed of the vehicle, i.e., an actual rotary speed of the axle, is simply fixed, a vehicle ascending a slope or having a heavy weight may have an engine stop because a shift-up timing occurs too early to ensure acceleration of the vehicle, or a vehicle descending a slope may be unexpectedly accelerated because a shift-down timing occurs too late to prevent acceleration of the vehicle so as to void an engine braking, i.e., cause an inertial gravity force of the descending vehicle to overcome the engine braking force.

SUMMARY OF THE INVENTION

A first object of the invention is to provide a vehicle equipped with a multi-speed (discontinuously variable) transmission, replacing the conventional combination of the belt-type continuously variable transmission (i.e., CVT) and the gear-type sub transmission, wherein the multi-speed transmission ensures continuous (non-intermittent) power transmission to the axle regardless of disengagement of a clutch for speed shift.

To attain the first object, according to a first aspect of the invention, a vehicle comprises: an engine; an accelerator for controlling the rotary speed of the engine; an axle; and a multi-speed transmission for transmitting power from the engine to the axle. The multi-speed transmission includes an odd-numbered speed drive train for an odd-numbered speed level, a first clutch for the odd-numbered speed drive train, an even-numbered speed drive train for an even-numbered speed level, and a second clutch for the even-numbered speed drive train. In correspondence to operation of the accelerator and an actual speed of the axle, one of the first and second clutches is engaged and the other of the first and second clutches is disengaged so as to select either the odd-numbered speed drive train or the even-numbered speed drive train to transmit power from the engine to the axle. While the speed level of the multi-speed transmission is shifted between the odd-numbered speed level and the even-numbered speed level, the engagement process of the one of the first and second clutches is timely overlapped with the disengagement process of the other of the first and second clutches.

Alternatively, according to a second aspect of the invention, a vehicle comprises: a cargo; an engine disposed under the cargo; an axle disposed under the cargo; and a multi-speed transmission disposed under the cargo so as to transmit power from the engine to the axle. The multi-speed transmission includes multi-speed drive trains, a sub drive train, a main clutch for the multi-speed drive trains, and a sub clutch for the sub drive train. Unless the multi-speed transmission is operated for speed changing, one of the multi-speed drive trains is selected to drive the axle. When the multi-speed transmission is operated for speed changing, the main clutch is disengaged for selecting one of the multi speed drive trains, and simultaneously, the sub clutch is engaged for transmitting power from the engine to the axle through the sub drive train.

Due to either the first or second aspect of the invention, the multi-speed transmission ensures performance of a smooth speed change (gearshift) without cease of power transmission from the engine to the axle. Therefore, the multi-speed transmission does not require the conventional CVT, so that the multi-speed transmission is safe from the problems peculiar to the CVT. That is, the multi-speed transmission has no problem of the belt slipping when wet, has satisfactory durability, and enables an effective engine braking action. Further, the sole multi-speed transmission does not have to be combined with another transmission mechanism, thereby being simple and inexpensive and facilitating maintenance.

Preferably, in either the first or second aspect, the engine includes a crankshaft extended in the fore-and-aft direction of the vehicle. The multi-speed transmission includes an input portion for receiving power from the crankshaft of the engine, an output for outputting power to the axle, and transmission shafts interposed between the input portion and the output portion. The transmission shafts are extended in the fore-and-aft direction of the vehicle, and juxtaposed laterally of the vehicle. Therefore, a casing incorporating the multi-speed transmission is vertically minimized so as to be easily disposed below a cargo or driver's seat of the vehicle without lowering of a ground clearance of the vehicle.

Preferably, in the first aspect, the multi-speed transmission further includes: a plurality of odd-numbered speed drive trains; a first shifter shaft for selecting one of the plurality of odd-numbered speed drive trains; a plurality of even-numbered speed drive trains; and a second shifter shaft for selecting one of the plurality of even-numbered speed drive trains. The first and second shifter shafts are juxtaposed horizontally. Alternatively, preferably, in the second aspect, the multi-speed transmission includes a plurality of shifter shafts for selecting one of the multi-speed drive trains, and the plurality of shifter shafts are juxtaposed horizontally. Therefore, a casing incorporating the multi-speed transmission is vertically minimized so as to be easily disposed below a cargo or driver's seat of the vehicle without lowering of a ground clearance of the vehicle.

Preferably, in either the first or second aspect, the vehicle further comprises: a transmission casing incorporating the multi-speed transmission; and a tank fluidly connected to the transmission casing so as to store fluid serving as lube for the first and second clutches and the multi-speed transmission. The tank absorbs fluid from the transmission casing so that a level of fluid in the transmission casing becomes lower than a predetermined height during activation of the engine. Therefore, the level of fluid accumulated in the transmission casing is so lowered as to reduce resistance of the fluid against agitation by a high-speed rotating gear in the transmission casing, thereby reducing power loss, and thereby ensuring an economic high-speed traveling of the vehicle.

Further preferably, in either the first or second aspect, the clutches (if the first aspect, the first and second clutches, or if the second aspect, the main and sub clutches) and the shifter shafts are hydraulically controlled, and the fluid stored in the tank also serves as hydraulic pressure fluid for the clutches and the shifter shafts. Therefore, the vehicle requires no additional device for supplying the hydraulic pressure fluid to the hydraulically controlled elements in the multi-speed transmission, thereby being simplified.

Further preferably, in either the first or second aspect, the quantity of fluid recovered from the transmission casing into the tank is increased according to increase of the rotary speed of the engine, and larger than the quantity of fluid supplied from the tank into the transmission casing such as to serve as the lube and the hydraulic pressure fluid. Therefore, the level of the fluid sump in the transmission casing is kept constant, so as to ensure the above-mentioned advantageous reduction of power loss.

Preferably, in the first aspect, either the first or second clutch also serves as a start-up clutch to be engaged during start of the vehicle. Alternatively, preferably, in the second aspect, the main clutch also serves as the start-up clutch to be engaged during start of the vehicle. Therefore, the vehicle requires no additional start-up device such as a torque converter, thereby being simplified and reducing costs.

A second object of the invention is to provide a vehicle transmission system comprising a dual clutch type multi-speed (discontinuously variable) transmission, which includes first and second clutches, odd-numbered speed drive trains to be activated by engaging the first clutch, and even-numbered speed drive trains to be activated by engaging the second clutch, wherein the vehicle transmission system can promptly change a forward/backward traveling direction of a vehicle without an additional clutch for changing the traveling direction.

To attain the second object, according to a third aspect of the invention, a vehicle transmission system for transmitting power from a prime mover to an axle, comprises a speed-changing mode setting means, and a multi-speed transmission. A reverse mode can be set by the speed-change mode setting means. The multi-speed transmission includes a group of odd-numbered speed drive trains for forward-traveling, a first clutch for the odd-numbered speed drive trains, a group of even-numbered speed drive trains for forward-traveling, a second clutch for the even-numbered speed drive trains, and a backward traveling drive train. When one of the odd-numbered speed drive trains is selected to be activated, the selected odd-numbered speed drive train is actually activated by engaging the first clutch. When one of the even-numbered speed drive trains is selected to be activated, the selected even-numbered speed drive train is actually activated by engaging the second clutch. When the clutch-engagement is shifted between the first and second clutches, an engagement action of one of the first and second clutches and a disengagement action of the other of the first and second clutches overlap. When the reverse mode is set by the speed-changing mode setting means, at least one of the first and second clutches is engaged or disengaged so as to activate either one of all the odd-and-even numbered speed drive trains for forward traveling selected to be activated or the backward traveling drive train.

Therefore, once the speed-change mode setting means, such as a switch or a lever, is operated to set the reverse mode, an operator of a vehicle can select either a backward traveling speed set by the backward traveling drive train or a forward traveling speed set by one of the odd-and-even numbered speed drive trains for forward traveling, so as to promptly exchange these speeds for each other only by use of engagement or disengagement of the first or second clutches without another speed-change operation. Accordingly, when the vehicle alternately repeats the forward traveling and backward traveling for a work, the distance for repeating the forward-traveling and backward-traveling can be reduced so as to improve the efficiency for the work. Further, the vehicle transmission system needs no additional clutch for switching the forward/backward traveling direction, i.e., the number of clutches for speed-changing and traveling-direction changing of the vehicle can be reduced, thereby simplifying a structure of fluid ducts for clutches, reducing costs, improving maintenancability and minimizing the vehicle.

Preferably, while the reverse mode is set, the backward traveling drive train is constantly selected to be activated, and is actually activated by engaging one of the first and second clutches. Therefore, during the setting of the reverse mode, an operation for selecting the backward traveling drive train is omitted so as to ensure the promptness in shift between the forward-traveling speed and the backward-traveling speed, and on the other hand, the alternate engagement/disengagement of the first and second clutches ensures a half-clutch state so as to prevent a shock from occurring during the forward/backward traveling direction change.

Further, the group of the odd-numbered speed drive trains are disposed downstream of the first clutch so that, when one of the odd-numbered drive trains is selected to be activated, the selected odd-numbered drive train receives power from the prime mover by engaging the first clutch. The group of the even-numbered speed drive trains are disposed downstream of the second clutch so that, when one of the even-numbered drive trains is selected to be activated, the selected even-numbered drive train receives power from the prime mover by engaging the second clutch. The backward traveling drive train is disposed downstream of the one of the first and second clutches so that, when the backward traveling drive train is selected to be activated, the backward traveling drive train receives power from the prime mover by engaging the one of the first and second clutches. Therefore, as mentioned above, each of all the speed drive trains of the multi-speed transmission for forward traveling and backward traveling is activated by engaging the corresponding first or second clutch while it is selected to be activated, so that many speed stages can be provided by engaging/disengaging only the first and second clutches.

Preferably, in the third aspect, the backward traveling drive train has a deceleration ratio larger than a standard deceleration ratio which is an average of maximum and minimum deceleration ratios of all the odd-and-even numbered speed drive trains. Therefore, even if a vehicle having traveled forward at high speed, the vehicle set for backward traveling comes to travel backward at low speed, and is prevented from unexpectedly starting to travel backward.

Preferably, in the third aspect, the vehicle transmission system further comprises a sub transmission disposed downstream of the multi-speed transmission, having plural sub speeds. The reverse mode is realized only when a certain sub speed of the sub transmission is established. Therefore, for example, the vehicle transmission system may be configured so that the reverse mode can be realized only when a low sub speed of the sub transmission is set, and a normal traveling mode for changing speeds of the multi-speed transmission step by step must be realized when either a middle or high sub speed of the sub transmission is set. In the normal traveling mode, a neutral state must be created on the way of changing the forward/backward traveling direction. Accordingly, in the reverse mode, when the forward traveling is selected, a vehicle is prevented from suddenly starting and accelerating, so that the vehicle can stably travel forward. Which sub speed enables realization of the reverse mode may be determined to correspond to various conditions such as a target work and an operator's technique. As a result, the vehicle transmission system improves traveling of the vehicle in stability, comfort and working efficiency.

Preferably, in the third aspect, one of all the odd-and-even numbered forward traveling speeds is selected as a rated forward traveling speed for the reverse mode. When the reverse mode set by the speed-changing mode setting means is realized, either any of the forward traveling speeds not more than the rated forward traveling speed or a backward traveling speed due to the backward traveling drive train is selected. Therefore, in the reverse mode, a vehicle can travel forward at a suitable speed determined as a rated forward speed corresponding to various conditions such as a target work condition or an operator's technique, thereby improving stability, comfort and working efficiency in a traveling vehicle.

Further, when a load on the prime mover during traveling of a vehicle exceeds a threshold load, the rated forward traveling speed is automatically changed to a forward traveling speed lower than the original forward traveling speed selected as the rated forward traveling speed. Therefore, when the prime mover in a traveling vehicle is overloaded, the lower forward-traveling speed is realized for ensuring high torque without manipulation of an operator, thereby surely preventing the prime mover from stalling.

Preferably, in the third aspect, an accelerator is provided to be operated for changing a rotary speed of the prime mover, and wherein an actual traveling speed of a vehicle by setting the backward traveling speed and by fully operating the accelerator for increasing the rotary speed of the prime mover does not exceed that by setting the rated forward traveling speed and by fully operating the accelerator for increasing the rotary speed of the prime mover. Therefore, the actual backward traveling speed of the vehicle can constantly be not more than the actual forward traveling speed immediately before the forward/backward traveling direction change, so as to prevent the vehicle from suddenly starting backward, thereby improving the operability and stability of the vehicle set in the reverse mode.

A third object of the invention is to provide the vehicle according to the first aspect, equipped with the multi-speed transmission in which the first clutch for the odd-numbered speed drive train and the second clutch for the even-numbered speed drive train are automatically controlled for speed shift (gear change) in association with the accelerator operation, wherein the speed shift timing of the multi-speed transmission is optimized so as to prevent the vehicle engine, while the vehicle is ascending a slope or heavily loaded, from stalling, and to effect an engine braking onto the vehicle when descending a slope.

To attain the third object, according to a fourth aspect of the invention, a vehicle comprises: an engine; an accelerator for controlling the rotary speed of the engine; an axle; and a multi-speed transmission for transmitting power from the engine to the axle. The multi-speed transmission includes an odd-numbered speed drive train for an odd-numbered speed level, a first clutch for the odd-numbered speed drive train, an even-numbered speed drive train for an even-numbered speed level, and a second clutch for the even-numbered speed drive train. In correspondence to operation of the accelerator and an actual speed of the axle, either the odd-numbered speed drive train or the even-numbered speed drive train is selected so as to transmit power from the engine to the axle. A shift-up or shift-down timing between the odd-numbered speed level and the even-numbered speed level relative to variation of the actual speed of the axle is changed according to detection of a tilt angle of the vehicle and/or detection of a weight of the vehicle. Therefore, due to the control of the first and second clutches, the multi-speed transmission ensures smooth perform speed change (gearshift) without cease of power transmission from the engine to the axle regardless of the tilt condition of the vehicle and/or variation of the weight of the vehicle (load on the vehicle).

Preferably, in the fourth aspect, when a tilt angle of the vehicle ascending a slope is detected, the actual speed of the axle corresponding to the shift-up timing is larger than that when a tilt angle of the vehicle traveling on a flat land is detected. Therefore, when the vehicle ascends a slope, the engine rotary speed arises to a sufficient value before the shift-up of the multi-speed transmission, thereby preventing stalling of the engine.

Preferably, in the fourth aspect, when a tilt angle of the vehicle descending a slope is detected, the actual speed of the axle corresponding to the shift-down timing is larger than that when a tilt angle of the vehicle traveling on a flat land is detected. Therefore, when the vehicle descends a slope, the shift-down of the multi-speed transmission is performed early enough for deceleration of the engine, thereby ensuring an effective engine braking.

Preferably, in the fourth aspect, when a large weight of the vehicle is detected, the actual speed of the axle corresponding to the shift-up timing is larger than that when a small weight of the vehicle is detected. Therefore, when the vehicle is heavily weighed (loaded), the engine rotary speed arises to a sufficient value before the shift-up of the multi-speed transmission, thereby preventing stalling of the engine.

Preferably, in the fourth aspect, when at least one of a tilt angle of the vehicle ascending a slope and a large weight of the vehicle is detected, the actual speed of the axle corresponding to the shift-up timing is larger than that when both the vehicle traveling on a flat land and a small weight of the vehicle are detected. Therefore, when the vehicle ascends a slope or when the vehicle is heavily weighed (loaded), the engine rotary speed surely arises to a sufficient value before the shift-up of the multi-speed transmission, thereby preventing stalling of the engine.

Preferably, in the fourth aspect, when both a tilt angle of the vehicle ascending a slope and a large weight of the vehicle are detected, the actual speed of the axle corresponding to the shift-up timing is further larger than that when one of a tilt angle of the vehicle ascending a slope and a large weight of the vehicle is detected. Therefore, even when the heavily weighed (loaded) vehicle ascends a slope, the engine rotary speed surely arises to a sufficient value before the shift-up of the multi-speed transmission, thereby preventing stalling of the engine.

Preferably, in the fourth aspect, when a tilt angle of the vehicle descending a slope is detected, the actual speed of the axle corresponding to the shift-down timing is larger than that when both a tilt angle of the vehicle traveling on a flat land and a small weight of the vehicle are detected. Therefore, when the vehicle descends a slope, the shift-down of the multi-speed transmission is performed early enough for deceleration of the engine, thereby ensuring an effective engine braking.

A fourth object of the invention is to provide the vehicle according to the first aspect, equipped with the multi-speed transmission including the first clutch for the odd-numbered speed drive train and the second clutch for the even-numbered speed drive train, wherein the vehicle, ascending a slope or heavily loaded, can start without stalling of the engine, and wherein the vehicle descending a slope can start with an effective engine braking.

To attain the fourth object, according to a fifth aspect of the invention, a vehicle comprises: an engine; an axle; and a multi-speed transmission for transmitting power from the engine to the axle. The multi-speed transmission includes one or more clutches for shifting a speed level. One of the clutches for shifting a speed level also serves as a start-up clutch to be engaged during start of the vehicle. An increased rate of a clutch pressure of the start-up clutch to a time passage is changed according to detection of a tilt angle of the vehicle and/or detection of a weight of the vehicle. Therefore, due to the control of the start-up clutch, the vehicle can creep in correspondence to the tilt condition of the vehicle and/or the weight of the vehicle (load on the vehicle), or the vehicle can be smoothly accelerated to a target speed set by an accelerator operation without cease of power transmission from the engine to the axle.

Preferably, in the fifth aspect, when a tilt angle of the vehicle ascending a slope is detected, the increased rate of the clutch pressure is larger than that when a tilt angle of the vehicle traveling on a flat land is detected. Therefore, when the vehicle ascends a slope, the clutch pressure of the start-up clutch and the driving force of the axle are increased quickly enough to prevent delay of the start of the vehicle or slip of the vehicle caused by the slope.

Preferably, in the fifth aspect, when a tilt angle of the vehicle descending a slope is detected, the increased rate of the clutch pressure is smaller than that when a tilt angle of the vehicle traveling on a flat land is detected. Therefore, when the vehicle descends a slope, the clutch pressure of the start-up clutch and the driving force of the axle are increased slowly so as to prevent sudden acceleration of the vehicle.

Preferably, in the fifth aspect, when a large weight of the vehicle is detected, the increased rate of the clutch pressure is larger than that when a small weight of the vehicle is detected. Therefore, when the vehicle is heavily weighed (loaded), the clutch pressure of the start-up clutch and the driving force of the axle are increased quickly enough to prevent delay of the start of the vehicle.

Preferably, in the fifth aspect, when at least one of a tilt angle of the vehicle ascending a slope and a large weight of the vehicle is detected, the increased rate of the clutch pressure is larger than that when both a tilt angle of the vehicle traveling on a flat land and a small weight of the vehicle are detected. Therefore, when the vehicle ascends a slope or when the vehicle is heavily weighed (loaded), the clutch pressure of the start-up clutch and the driving force of the axle are increased quickly enough to prevent delay of the start of the vehicle or slip of the vehicle.

Preferably, in the fifth aspect, when both a tilt angle of the vehicle ascending a slope and a large weight of the vehicle are detected, the increased rate of the clutch pressure is further larger than that when one of a tilt angle of the vehicle traveling on a flat land and a small weight of the vehicle is detected. Therefore, even when the heavily weighed (loaded) vehicle ascends a slope, the clutch pressure of the start-up clutch and the driving force of the axle are increased quickly enough to prevent delay of the start of the vehicle or slip of the vehicle.

Preferably, in the fifth aspect, when a tilt angle of the vehicle descending a slope is detected, the increased rate of the clutch pressure is smaller than that when both a tilt angle of the vehicle traveling on a flat land and a small weight of the vehicle are detected. Therefore, when the vehicle descends a slope, the clutch pressure of the start-up clutch and the driving force of the axle are increased slowly so as to prevent sudden acceleration of the vehicle.

Preferably, in the fifth aspect, the vehicle further comprises a brake shiftable between a braking state for braking the axle and an unbraking state for unbraking the axle. The increased rate of the clutch pressure is changed according to detection of the tilt angle of the vehicle immediately after a shift of the brake from the braking state to the unbraking state is confirmed. Since the unbraking operation for shifting the brake from the braking state to the unbraking state is indispensable just before the start of the vehicle, the control of the start-up clutch associated with the unbraking operation is surely associated with the start of the vehicle.

These, other and further objects, features and advantages will appear more fully from the following description with reference to the accompanying drawings.

BRIEF DESCRIPTION OF THE DRAWINGS

FIG. 14 is a table indicating a correlation of engagement/disengagement of speed clutches for respective speed stages in relation to shifter positions according to the third embodiment.

FIG. 15 is a table indicating speed control patterns using variation of combination of a forward-traveling speed stage and a backward-traveling speed stage according to the third embodiment while an automatic reverse mode is established.

DETAILED DESCRIPTION OF THE INVENTION

Figure 1:
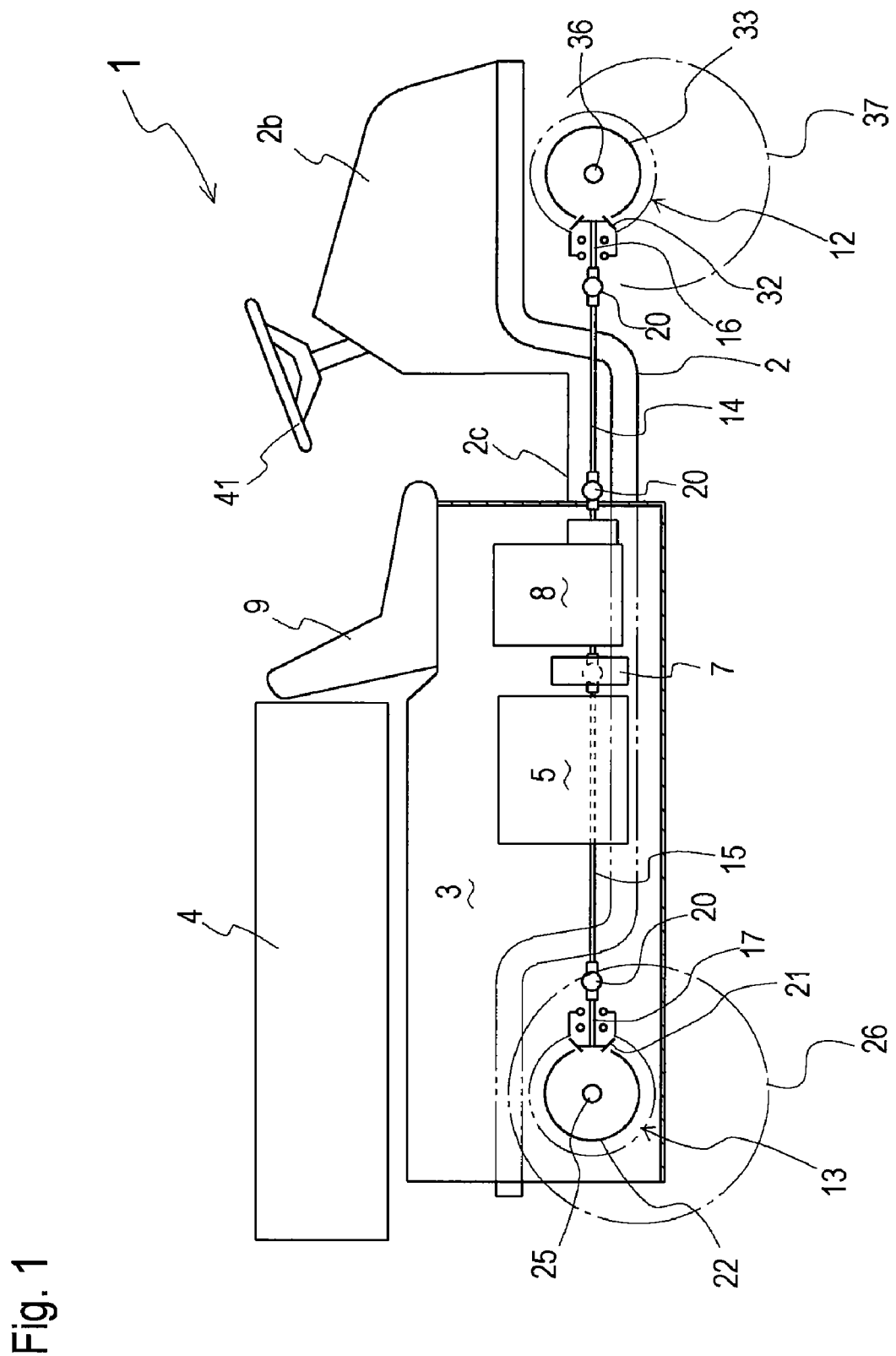
FIG. 1 is a side view of a utility vehicle according to a first embodiment of the invention.

Referring to FIGS. 1 to 9, a vehicle such as a utility vehicle according to a first embodiment will be described. Hereinafter, the position and direction of each element is stated on the basis of the traveling direction of the vehicle.

A general structure of a vehicle 1 will be described with reference to FIGS. 1 and 2. Vehicle 1 is a utility vehicle serving as a typical vehicle according to the invention. A front frame 2 and a rear frame 3 joined to each other constitute an entire body frame of vehicle 1. Rear frame 3 consists of a horizontal bottom plate, which is substantially rectangular when viewed in plan, and vertical side plates erected on front, rear, left and right end edges of the bottom plate. A cargo 4 is disposed above rear frame 3. Preferably, cargo 4 is vertically rotatable. Rear frame 3 serves as a base for supporting cargo 4. A pair of left and right seats 9 are mounted on a downwardly stepped front portion of rear frame 3. One seat 9 (in this embodiment, left seat 9) is an operator's seat 9a, and the other seat 9 (in this embodiment, right seat 9) is a partner's seat 9b. A steering wheel 41 is disposed in front of operator's seat 9a.

Vehicle 1 is provided with an engine 5, serving as a prime mover, including a fore-and-aft horizontal crankshaft (not shown) inside of rear frame 3 under seats 9. Engine 5 is disposed laterally opposite to driver's seat 9a (i.e., laterally eccentrically toward partner's seat 9b) because it is considered that a driver necessarily sits on driver's seat 9a during travel of vehicle 1 and that heavy components including steering wheel 41 are disposed around driver's seat 9*a*. Therefore, when a driver sits on driver's seat 9*a*, the weight of vehicle 1 is laterally distributed, i.e., vehicle 1 is laterally balanced so as to stabilize its traveling and traction performance.

A transmission casing 8 is disposed in front of engine 5. An input shaft 18 projects rearward from a right rear portion of transmission casing 8 (laterally toward engine 5). An output shaft 6 of engine 5 projects forward so as to be substantially coaxially connected to input shaft 18 through a flywheel 7 which can absorb vibration of engine 5.

Transmission casing 8 incorporates a later-discussed multi-speed (discontinuously variable) transmission 19 including a plurality of gear trains. A front output shaft 10 projects forward from a front surface of transmission casing 8, and a rear output shaft 11 projects rearward from a rear surface of transmission casing 8. Multi-speed transmission 19 controls its gear ratio for speed-changing the rotary force in the forward traveling direction (and directionally reverses its rotation direction when it is set for backward traveling) in correspondence to the rotary speed of input shaft 18 driven by power from engine 5, and distributes its output power between front output shaft 10 and rear output shaft 11.

A rear transaxle 13 is disposed behind transmission casing 8. An input shaft 17 projects forward from a front surface of rear transaxle 13, and is connected to rear output shaft 11 through a slightly laterally slanted horizontal propeller shaft 15 and joints (universal joints) 20. Rear output shaft 11 projects rearward from a left rear portion of transmission casing 8 (laterally opposite to engine 5 and input shaft 18) so that propeller shaft 15 among other members interposed between rear output shaft 11 and input shaft 17 is laterally offset from engine 5.

On the other hand, a front transaxle 12 having a rearwardly projecting input shaft 16 is disposed in front of transmission casing 8. Input shaft 16 is connected to front output shaft 10 through a propeller shaft 14 and joints (universal joints) 20. Since no element to be considered about interference with propeller shaft 14 and joints 20 exists between transmission casing 8 and front transaxle 12, a substantially fore-and-aft coaxial alignment of front output shaft 10, propeller shaft 14 and input shaft 16 is provided so as to reduce stress on joints 20 and to silence the rotation of joints 20. If it is better, joints 20 can be inexpensive, simple cylindrical couplings, instead of expensive universal joints.

Rear transaxle 13 is disposed at the substantially laterally middle position under a rear portion of rear frame 3, stepped upward from the front portion thereof. A bracket (not shown) is extended from rear frame 3 so as to support rear transaxle 13 through vibration-isolating means (such as rubber). A rear differential gear unit 27 is disposed in rear transaxle 13. Differential gear unit 27 includes a differential cage 23. A bull gear 22 is integrally provided on differential cage 23 and meshes with a bevel gear 21 formed (or fixed) on a rear end of input shaft 17. Left and right first axles 25 are inserted at proximal ends thereof into differential cage 23. In differential cage 23, beveled differential side gears fixed on the proximal ends of first axles 25 mesh with a beveled pinion so as to constitute a rear bevel gear train 35 through which left and right first axles 25 are differentially rotatably connected to each other. Left and right rear wheels 26 are disposed on left and right outsides of the rear portion of rear frame 3. Each first axle 25 is drivingly connected to a rear wheel shaft 26*a* serving as a center shaft of each rear wheel 26 through universal joints 28 and a propeller shaft 29.

In rear bevel gear train 35, when first axles 25 are substantially evenly loaded by a ground surface, the rotary force of differential cage 23 is transmitted to both first axles 25 so as to drive both rear wheels 26. First axles 25 differentially rotate in correspondence to the differential load between rear wheels 26. Rear bevel gear train 35 is provided with a limited slip differential (LSD) mechanism 35*a*, through which the rotary force of one axle 25 is transmitted to the other axle 25 loaded less than the one axle 25 when the differential load exceeds a predetermined value. In LSD mechanism 35*a*, friction disks engaged to one axle 25 and friction disks engaged to differential cage 23 are alternately arranged so as to cause a pressure among them through a pressure plate and an electric actuator 35*b*, thereby optimizing the rotary speed difference between left and right axles 25 for improving cornering of vehicle 1 and corresponding to any ground condition.

Left and right stays 3*a* project distally leftward and rightward from the left and right sides of the rear portion of rear frame 3. A suspension mechanism 30, including a coiled spring or another shock absorber, is interposed between each stay 3*a* and each rear wheel 26.

A front portion of front frame 2 is stepped upward from the rear portion thereof. Front transaxle 12 is disposed at the substantially lateral middle position under the front portion of front frame 2. A bracket (not shown) is extended from front frame 2 so as to support front transaxle 12 through vibration-isolating means (such as rubber). A front differential gear unit 31 is disposed in front transaxle 12. Differential gear unit 31 includes a differential cage 34. A bull gear 33 is integrally provided on differential cage 34 and meshes with a bevel gear 32 formed (or fixed) on a front end of input shaft 16. Left and right second axles 36 are inserted at proximal ends thereof into differential cage 34. In differential cage 34, beveled differential side gears fixed on the proximal ends of second axles 36 mesh with a beveled pinion so as to constitute a front bevel gear train 35 through which left and right second axles 36 are differentially rotatably connected to each other. Left and right front wheels 37 are disposed on left and right outsides of the front portion of front frame 2. Each second axle 36 is drivingly connected to a front wheel shaft 37*a* serving as a center shaft of each front wheel 37 through universal joints 38 and a propeller shaft 39.

With respect to front bevel gear train 35 in front transaxle 12, when second axles 36 are substantially evenly loaded by a ground surface, the rotary force of differential cage 34 is transmitted to both second axles 36 so as to drive both front wheels 37. Second axles 36 differentially rotate in correspondence to the differential load between front wheels 37. Similar to rear bevel gear train 35 in rear transaxle 13, front bevel gear train 35 is provided with a limited slip differential (LSD) mechanism 35*a*, through which the rotary force of one axle 36 is transmitted to the other axle 36 loaded less than the one axle 36 when the differential load exceeds a predetermined value, thereby optimizing the rotary speed difference between left and right axles 36 for improving cornering of vehicle 1 and corresponding to any ground condition. Further, a later-discussed center differential gear unit 101 is mechanically connected to second axles 36 so as to surely apply engine braking onto second axles 36 as well as first axles 25.

Left and right stays 2*a* project distally leftward and rightward from the left and right sides of the front portion of front frame 2. A suspension mechanism 40, including a coiled spring or another shock absorber, is interposed between each stay 2*a* and each front wheel 37.

An upright front cover 2*b* is mounted on the front portion of front frame 2, and provided at an upper rear end portion thereof with a control and indicator panel, above which steering wheel 41 is disposed. A horizontal platform 2*c*, serving as a footrest, is spread behind the rear end of front cover 2*b* and is extended out leftward and rightward.

Figure 9:
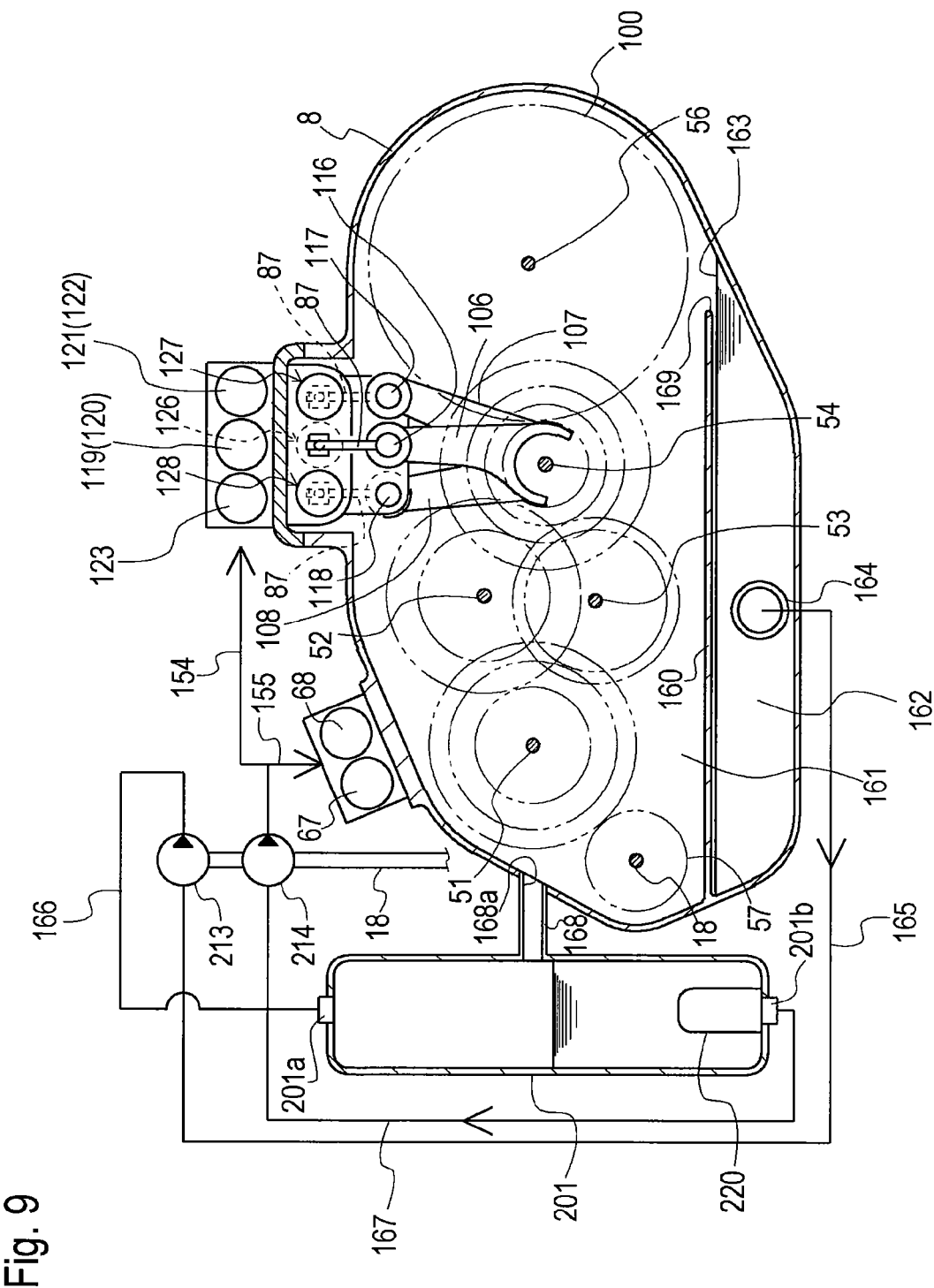
FIG. 9 is a front view partly in section of the transmission casing according to the first embodiment, showing a circulation system of lube therein.

Multi-speed transmission 19 will be described with reference to FIGS. 3, 6 and 9. In transmission casing 8, input shaft 18, a clutch input shaft 51, a first traveling gearshift shaft 52, a second traveling gearshift shaft 53, a traveling output shaft 54, a counter shaft 55 and a traveling PTO shaft 56, are disposed in the fore-and-aft direction of vehicle 1 and in parallel to one another, so as to serve as a group of transmission shafts of multi-speed transmission 19.

In this regard, in multi-speed transmission 19, input shaft 18 serves as an input portion for receiving the output force of engine 5, and traveling PTO shaft 56 serves as an output portion for distributing power between first axles 25 and second axle 36. In connection with the fore-and-aft crankshaft of engine 5, the group of the transmission shafts of multi-speed transmission 19, ordered in the power transmission course from input shaft 18 to traveling PTO shaft 56, are extended in the fore-and-aft direction of vehicle 1, so as to be juxtaposed laterally of vehicle 1, thereby minimizing transmission casing 8 incorporating multi-speed transmission 19. Such vertically minimized transmission casing 8 can be easily disposed under cargo 4 or seats 9 without reduction of the ground clearance of vehicle 1 or heightening of vehicle 1.

Input shaft 18 is fixedly provided on a rear portion thereof with a gear 57, and projects out at a front portion thereof forward from transmission casing 8 so as to be provided thereon with pumps 213 and 214. Therefore, pumps 213 and 214 are driven together by input shaft 18.

Clutch input shaft 51 is disposed upwardly leftward from input shaft 18, and provided thereon with multi friction disk type first and second clutches 58 and 59. Second clutch 59 is disposed behind first clutch 58, and a gear 60 is fixed on clutch input shaft 51 behind second clutch 59. Gear 60 meshes with gear 57 so as to constantly transmit the rotary force of input shaft 18 to clutch input shaft 51.

A first clutch output gear 61 is relatively rotatably provided on clutch input shaft 51 in front of first clutch 58. When first clutch 58 is engaged, first clutch output gear 61 is relatively unrotatably connected to clutch input shaft 51 through engaged first clutch 58. A first clutch hydraulic cylinder 71 is provided for the selective engagement and disengagement of first clutch 58. A second clutch output gear 66 is relatively rotatably provided on clutch input shaft 51 behind second clutch 59. When second clutch 59 is engaged, second clutch output gear 66 is relatively unrotatably connected to clutch input shaft 51 through engaged second clutch 59. A second clutch hydraulic cylinder 72 is provided for the selective engagement and disengagement of second clutch 59. A later-discussed clutch control mechanism controls hydraulic cylinders 71 and 72 so as to gradually continuously change the transmitted torque between shafts 51 and 52 while the speed level of multi-speed transmission 19 is shifted by disengaging one clutch 58 or 59 having been engaged and engaging the other clutch 59 or 58 having been disengaged.

First traveling gearshift shaft 52 is disposed upwardly leftward from clutch input shaft 51. First traveling gearshift shaft 52 is fixedly provided on a front portion thereof with a first speed normal drive gear 81, a third speed normal drive gear 83 disposed in front of first speed normal drive gear 81, an input gear 76 disposed in front of second speed normal drive gear 83, and a reverse drive gear 85 disposed in front of input gear 76. Input gear 76 meshes with first clutch output gear 61 so as to transmit the rotary force of clutch input shaft 51 to first traveling gearshift shaft 52 through engaged first clutch 58.

Second traveling gearshift shaft 53 is disposed downwardly leftward from clutch input shaft 51. Second traveling gearshift shaft 53 is fixedly provided on a rear portion thereof with an input gear 77, a second speed normal drive gear 82 disposed in front of input gear 77, and a fourth speed normal drive gear 84 disposed in front of second speed normal drive gear 82. Input gear 77 meshes with second clutch output gear 66 so as to transmit the rotary force of clutch input shaft 51 to second traveling gearshift shaft 53 through engaged second clutch 59.

Traveling output shaft 54 is disposed downwardly leftward from first traveling gearshift shaft 52 and upwardly leftward from second traveling gearshift shaft 53. Traveling output shaft 54 is relatively rotatably provided thereon with a second speed normal driven gear 92, a fourth speed normal driven gear 94 disposed in front of second speed normal driven gear 92, a first speed normal driven gear 91 disposed in front of fourth speed normal driven gear 94, a third speed normal driven gear 93 and a reverse driven gear 95. First and third speed normal driven gears 91 and 93 mesh with respective first and third speed normal drive gears 81 and 83 fixed on first traveling gearshift shaft 52. Second and fourth speed normal driven gears 92 and 94 mesh with respective second and fourth speed normal drive gears 82 and 84 fixed on second traveling gearshift shaft 53. Fore-and-aft extended counter shaft 55 is disposed between first traveling gearshift shaft 52 and traveling output shaft 54, and an idle gear 86 is provided on counter shaft 55 so as to mesh with reverse drive gear 85 and reverse driven gear 95.

In this arrangement, gears 81 and 91 constitute a first speed normal (forward traveling) gear train, gears 82 and 92 constitute a second speed normal (forward traveling) gear train, gears 83 and 93 constitute a third speed normal (forward traveling) gear train, gears 84 and 94 constitute a fourth speed normal (forward traveling) gear train, and gears 85, 86 and 95 constitute a reverse (backward traveling) gear train.

Traveling output shaft 54 is relatively unrotatably and axially unslidably provided thereon with splined hubs 96, 97 and 98. Splined hub 96 is disposed between first speed normal driven gear 91 and third speed normal driven gear 93, splined hub 97 is disposed between second speed normal driven gear 92 and fourth speed normal driven gear 94, and splined hub 98 is disposed behind reverse driven gear 95 (in front of third speed normal driven gear 93). Shifters 96*a*, 97*a* and 98*a* are axially slidably and relative unrotatably fitted on respective splined hubs 96, 97 and 98.

First and third speed normal driven gears 91 and 93 are formed with respective clutch teeth portions 91*a* and 93*a* facing splined hub 96. Third and fourth speed normal driven gears 92 and 94 are formed with respective clutch teeth portions 92*a* and 94*a* facing splined hub 97. Reverse driven gear 95 is formed with a clutch teeth portion 95*a* facing splined hub 98. A synchronizer is interposed between each of spline hubs 96, 97 and 98 and each of clutch teeth portions 91*a*, 93*a*, 92*a*, 94*a* and 95*a*.

Due to the arrangement, one of clutch teeth portions 91*a*, 92*a*, 93*a*, 94*a* and 95*a* is selected to mesh with corresponding one of shifters 96*a*, 97*a* and 98*a* through the corresponding synchronizer, so as to relatively unrotatably connect the corresponding driven gear 91, 92, 93, 94 or 95 to traveling output shaft 54, thereby smoothly transmitting the rotary force of one of first and second traveling gearshift shafts 52 and 53 to traveling output shaft 54 through the selected gear train.

A gear 99 is fixed on traveling output shaft 54 behind second speed normal driven gear 92, and meshes with a bull gear 100 of a center differential gear unit 101. Center differential gear unit 101 includes a differential cage 102 incorporating a center bevel gear train 35 for differentially distributing the rotary force of traveling output shaft 54 forward and rearward.

Traveling PTO shaft 56 is extended forward from center differential gear unit 101 so as to project into a PTO gear casing 103 provided on a left front surface of transmission casing 8. In PTO gear casing 103, a gear 104 is fixed on a front end of traveling PTO shaft 56 and meshes with a gear 105 fixed on front output shaft 10, so as to transmit the rotary force of traveling output shaft 54 to front output shaft 10 through center differential gear unit 101. Further, propeller shaft 14 transmits the rotary force of front output shaft 10 to front transaxle 12.

Rear output shaft 11 is extended rearward from center differential gear unit 101 and connected to propeller shaft 15 so as to transmit the rotary force of traveling output shaft 54 to rear transaxle 13 through center differential gear unit 101 and propeller shaft 15. Center bevel gear train 35 in center differential gear unit 101 is provided with an LSD mechanism 35a, similar to bevel gear trains 35 in respective front and rear differential gear units 27 and 31.

Due to this arrangement, vehicle 1 starts traveling forward at the first speed level established by the first speed normal gear train when first clutch 58 is engaged in a precondition that the first speed normal gear train is selected. Namely, first clutch 58 serves as a start-up clutch to be engaged for the starting of vehicle 1. If the second speed normal gear train is previously selected and then second clutch 59 is engaged, vehicle 1 starts forward at the second speed level established by the second speed normal gear train. In this case, second clutch 59 serves as a start-up clutch to be engaged for the starting of vehicle 1. The clutch pressure of either clutch 58 or 59 serving as the start-up clutch is set appropriately for establishing creep of vehicle 1 during its start.

In this way, first and second clutches 58 and 59 can be used as the start-up clutch to be engaged for starting of vehicle 1, instead of an additional device for starting of vehicle 1, e.g., a torque converter, thereby making simple and inexpensive vehicle 1.

A mechanism for controlling the shifters and clutches will be described with reference to FIGS. 3 to 6 and 9. A first fork 106, a second fork 107 and a third fork 108 are fitted onto respective shifters 96a, 97a and 98a, and are formed at basal ends thereof with respective bosses that are relatively unrotatably and axially unslidably fixed through respective pins 115 on a first shifter shaft 116, a second shifter shaft 117 and a third shifter shaft 118, respectively.

A shifter housing 125 is fixed at a bottom base portion thereof onto a top portion of transmission casing 8 so as to cover a top opening of transmission casing 8. A front bearing wall 109 and a rear bearing wall 110 are extended downward from shifter housing 125 into transmission casing 8. First, second and third shifter shafts 116, 117 and 118 are horizontally juxtaposed and fore-and-aft slidably supported between front and rear bearing walls 109 and 110, so that first, second and third forks 106, 107 and 108 are fore-and-aft slidably integral with respective first, second and third shifter shafts 116, 117 and 118.

When first shifter shaft 116 is slid forward or rearward, first fork 106 moves shifter 96a, so that shifter 96a engages one of driven gears 91 and 93 with splined hub 96. Therefore, one of the odd-numbered (i.e., first and third) speed gear trains is selected to be drivingly connected to traveling output shaft 54. When second shifter shaft 117 is slid forward or rearward, second fork 107 moves shifter 97a, so that shifter 97a engages one of driven gears 92 and 94 with splined hub 97. Therefore, one of the even-numbered (i.e., second and fourth) speed gear trains is selected to be drivingly connected to traveling output shaft 54.

In this regard, while multi-speed transmission 19 includes the odd-numbered (i.e., first and third) speed gear trains and the even-numbered (i.e., second and fourth) speed gear trains, first shifter shaft 116 for selecting one of the odd-numbered speed gear trains and second shifter shaft 117 for selecting one of the even-numbered speed gear trains are horizontally juxtaposed as mentioned above so as to vertically minimize transmission casing 8 incorporating multi-speed transmission 19.

First shifter shaft 116 is formed on the outer peripheral surface thereof with a rear annular groove 116a for setting a third speed forward traveling position for making shifter 96a engage driven gear 93 with splined hub 96, a fore-and-aft middle annular groove 116b for setting a neutral position for making shifter 96a separate both driven gears 91 and 93 from splined hub 96, and a front annular groove 116c for setting a first speed forward traveling position for making shifter 96a engage driven gear 91 with splined hub 96. Bearing wall 109 is bored therein with an upwardly vertical hole 109a from the bottom surface thereof. A spring 112 and a detent ball 113 are fitted into hole 109a so that detent ball 113 pressed by spring 112 can be engaged into one of grooves 116a, 116b and 116c, thereby constituting a detent mechanism 111 for locating shifter shaft 116.

Detent ball 113 biased by spring 112 is constantly pressed against first shifter shaft 116. When first shifter shaft 116 is fore-and-aft slid to one target position of the first and third speed forward traveling positions and the neutral positions, detent ball 113 is pressed into one of grooves 116a, 116b and 116c so as to hold first shifter shaft 116 at the target position. Second shifter shaft 117 is provided with a similar detent mechanism, so as to be held at one target position of a second speed forward traveling position (for making shifter 97a engage driven gear 92 with splined hub 97), a neutral position (for making shifter 97a separate both driven gears 92 and 94 from splined hub 97), and a fourth speed forward traveling position (for making shifter 97a engage driven gear 94 with splined hub 97). Third shifter shaft 118 is also provided with a similar detent mechanism, so as to be held at one target position of a backward traveling position (for making shifter 98a engage driven gear 95 with splined hub 98) and a neutral position (for making shifter 98a separate driven gear 95 from splined hub 98).

Shifter housing 125 is formed so as to incorporate a first hydraulic cylinder 126, a second hydraulic cylinder 127 and a third hydraulic cylinder 128 extended in the fore-and-aft direction of vehicle 1 and juxtaposed laterally in parallel. First, second and third cylinders 126, 127 and 128 include respective piston rods 129, 134 and 139 having outer ends from which respective connection arms 87 are extended downward and connected at bottom ends thereof to ends of first, second and third shifter shafts 116, 117 and 118, respectively.

In first hydraulic cylinder 126, a first piston 130 is fixed on an inner end of piston rod 129, so as to be selectively disposed at one of a first speed forward traveling position, a neutral position and a third speed forward traveling position. First piston 130 is shaped such as to include a diametrically large portion 130a and a diametrically small portion 130b. A cylindrical second piston 131, having an outer diameter larger than that of diametrically large portion 130a, is axially slidably fitted on diametrically small portion 130b. First hydraulic cylinder 126 has a shoulder portion 125a, which is formed by stepping a wall of shifter housing 125 so as to correspond to the diametric difference between diametrically large portion 130a of first piston 130 and second piston 131. First and second pistons 130 and 131 constitute a piston 146. First hydraulic cylinder 126 includes fluid chambers 132 and 133, which are disposed fore-and-aft opposite to each other with respect to piston 146 and connected to respective electromagnetic valves 119 and 120 through respective fluid passages 143 and 144.

Figure 4:
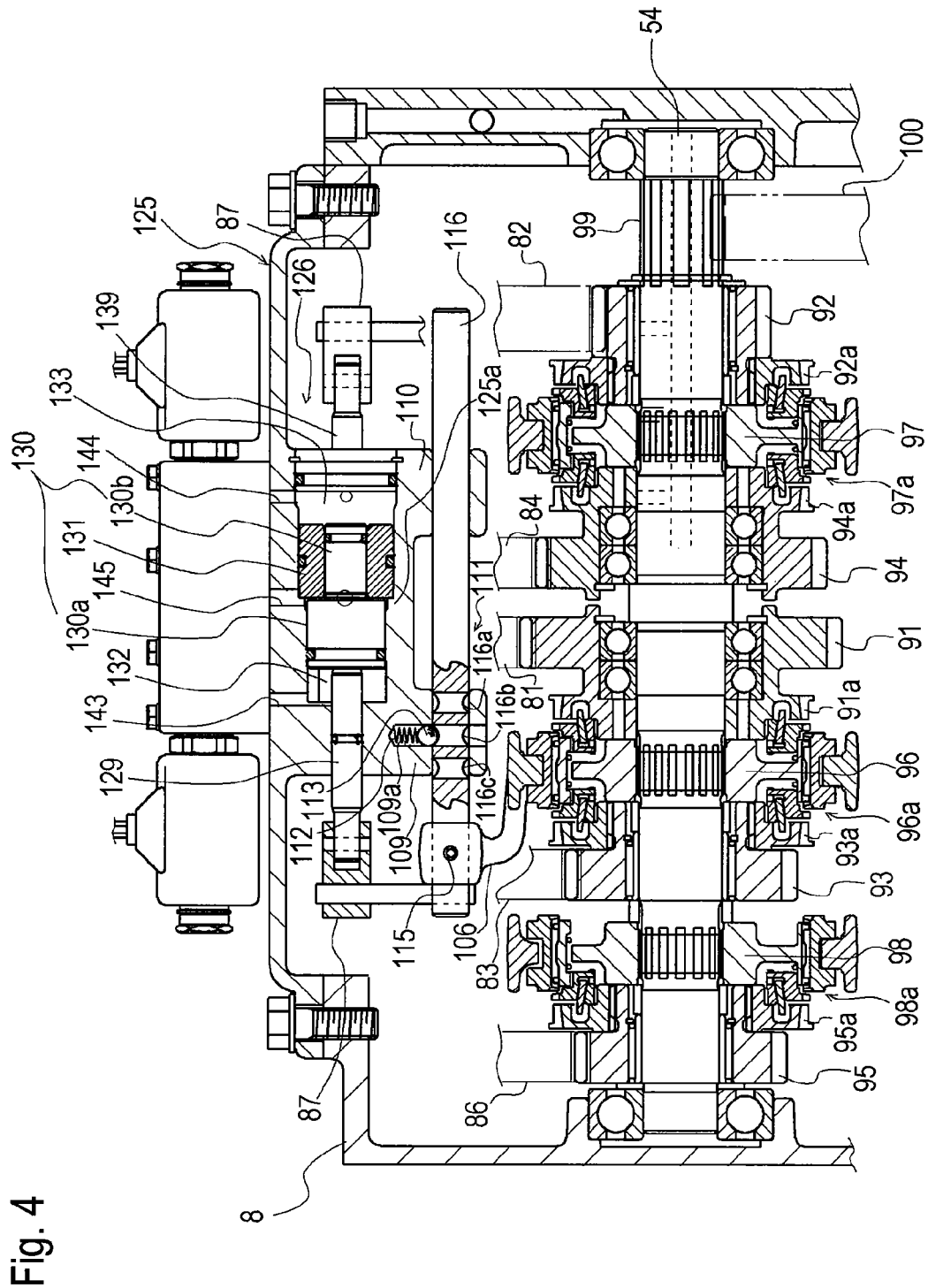
FIG. 4 is a side view partly in section of a transmission casing according to the first embodiment.
Figure 5:
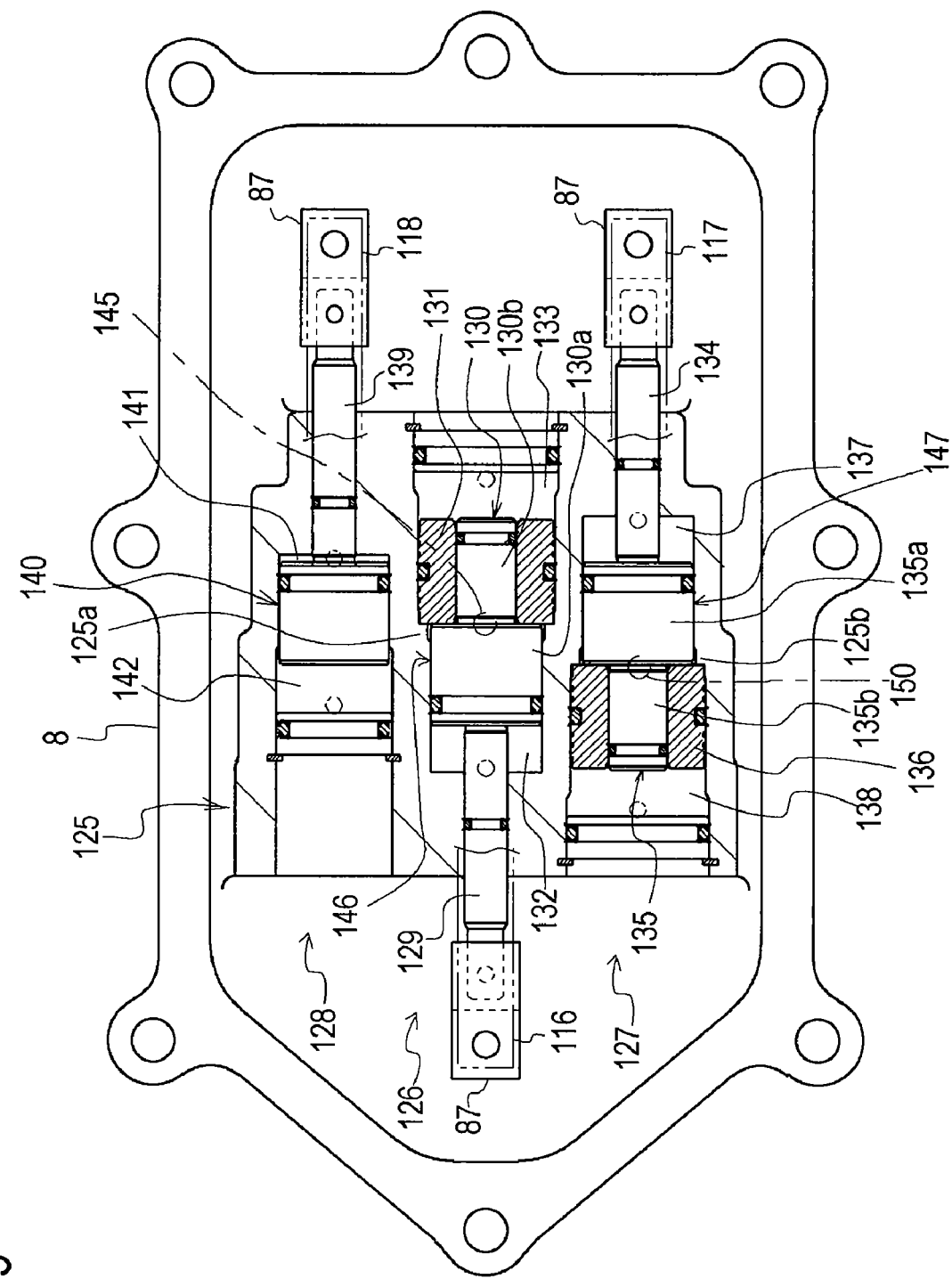
FIG. 5 is a bottom view partly in section of a cylinder chamber at an upper portion of the transmission casing according to the first embodiment.
Figure 6:
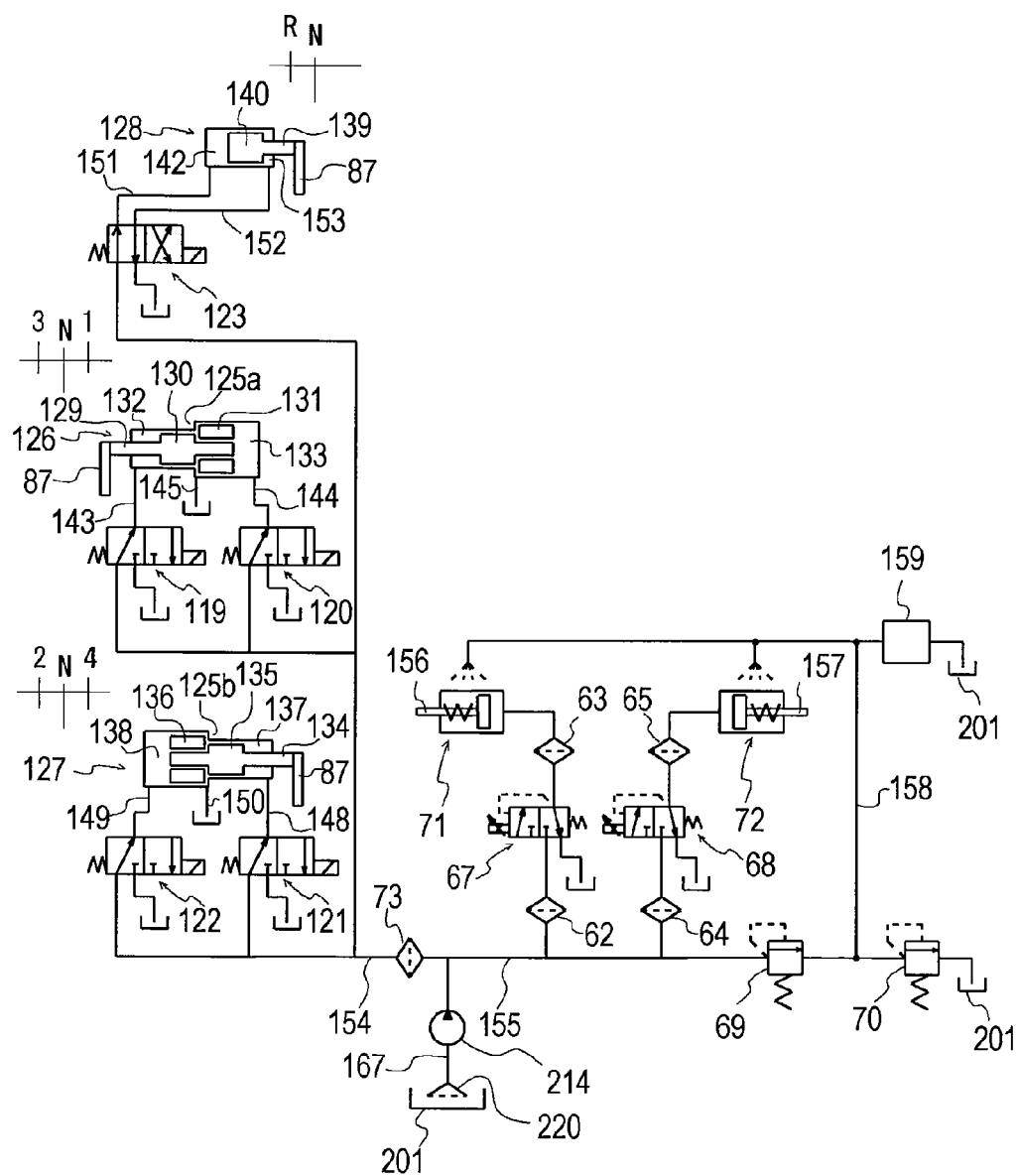
FIG. 6 is a diagram of a hydraulic circuit for gearshift and clutch operation according to the first embodiment.

When both electromagnetic valves 119 and 120 are unexcited for neutralizing first hydraulic cylinder 126 as shown in FIG. 6, electromagnetic valves 119 and 120 supply pressure fluid to respective chambers 132 and 133 through respective passages 143 and 144. However, a gap between first and second pistons 130 and 131 is opened to a drain passage 145 so as to move first piston 130 (rightward in FIGS. 4 to 6) and second piston 131 (leftward in FIGS. 4 to 6) toward each other. Consequently, as shown in FIGS. 4 and 5, diametrically large portion 130*a* of first piston 130 and second piston 131 abut against each other, and second piston 131 abuts against shoulder portion 125*a*, because an area of second piston 131 pressed by fluid in chamber 133 is larger than an area of second piston 131 pressed by fluid in chamber 132. In this way, piston 146 is accurately retained at the neutral position.

When multi-speed transmission 19 is set for the first speed forward traveling, electromagnetic valve 119 is unexcited to supply fluid into chamber 132 and electromagnetic valve 120 is excited to stop supply fluid to chamber 133, so that the fluid in chamber 132 pushes piston 146 toward chamber 133 (rightward in FIGS. 4 to 6). Consequently, piston 146 abuts against a wall surface of shifter housing 125 serving as an outer end of chamber 133, thereby being retained at the first speed forward traveling position. When multi-speed transmission 19 is set for the third speed forward traveling, electromagnetic valve 120 is unexcited to supply fluid into chamber 133 and electromagnetic valve 119 is excited to stop supply fluid to chamber 132, so that the fluid in chamber 133 pushes piston 146 toward chamber 132 (leftward in FIGS. 4 to 6). Consequently, second piston 131 abuts against shoulder 125*a* and first piston 130 is further moved and abuts against a wall surface of shifter housing 125 serving as an outer end of chamber 132, thereby being retained at the third speed forward traveling position.

In second hydraulic cylinder 127, a first piston 135 is fixed on an inner end of piston rod 134, so as to be selectively disposed at one of a second speed forward traveling position, a neutral position and a fourth speed forward traveling position. First piston 135 is shaped such as to include a diametrically large portion 135*a* and a diametrically small portion 135*b*. A cylindrical second piston 136, which is diametrically larger than diametrically large portion 135*a*, is axially slidably fitted on diametrically small portion 135*b*. Second hydraulic cylinder 127 has a shoulder portion 125*b*, which is formed by stepping a wall of shifter housing 125 so as to correspond to the diametric difference between diametrically large portion 135*a* of first piston 135 and second piston 136. First and second pistons 135 and 136 constitute a piston 147. Second hydraulic cylinder 127 includes fluid chambers 137 and 138, which are disposed fore-and-aft opposite to each other with respect to piston 147 and connected to respective electromagnetic valves 121 and 122 through respective fluid passages 148 and 149.

When both electromagnetic valves 121 and 122 are unexcited for neutralizing second hydraulic cylinder 127 as shown in FIG. 6, electromagnetic valves 121 and 122 supply pressure fluid to respective chambers 137 and 138 through respective passages 148 and 149. However, a gap between first and second pistons 135 and 136 is opened to a drain passage 150 so as to move first piston 135 (leftward in FIGS. 5 and 6) and second piston 136 (rightward in FIGS. 5 and 6) toward each other. Consequently, as shown in FIG. 5, diametrically large portion 135*a* of first piston 135 and second piston 136 abut against each other, and second piston 136 abuts against shoulder portion 125*b*, because an area of second piston 136 pressed by fluid in chamber 138 is larger than an area of second piston 136 pressed by fluid in chamber 137. In this way, piston 147 is accurately retained at the neutral position.

When multi-speed transmission 19 is set for the second speed forward traveling, electromagnetic valve 121 is unexcited to supply fluid into chamber 137 and electromagnetic valve 122 is excited to stop supply fluid to chamber 138, so that the fluid in chamber 137 pushes piston 147 toward chamber 138 (leftward in FIGS. 5 and 6). Consequently, piston 147 abuts against a wall surface of shifter housing 125 serving as an outer end of chamber 138, thereby being retained at the second speed forward traveling position. When multi-speed transmission 19 is set for the fourth speed forward traveling, electromagnetic valve 122 is unexcited to supply fluid into chamber 138 and electromagnetic valve 121 is excited to stop supply fluid to chamber 137, so that the fluid in chamber 138 pushes piston 147 toward chamber 137 (rightward in FIGS. 5 and 6). Consequently, second piston 136 abuts against shoulder 125*b*, and first piston 135 is further moved and abuts against a wall surface of shifter housing 125 serving as an outer end of chamber 137, thereby being retained at the fourth speed forward traveling position.

A gearshift fluid passage 154 is branched to electromagnetic valves 121 and 122, branched to electromagnetic valves 119 and 120 at the downstream of the branching point to electromagnetic valves 121 and 122, and connected to an electromagnetic valve 123 at the downstream of the branching point to electromagnetic valves 119 and 120. In third hydraulic cylinder 128, a piston 140 is fixed on an inner end of piston rod 139 so as to be selectively disposed at either a neutral position or a backward traveling position. Third hydraulic cylinder 128 includes chambers 142 and 153, which are disposed fore-and-aft opposite to each other with respect to piston 140 and connected to electromagnetic valve 123 through respective passages 151 and 152.

When multi-speed transmission 19 is set for forward traveling or neutralized, electromagnetic valve 123 is unexcited as shown in FIG. 6, so as to supply fluid from gearshift fluid passage 154 into chamber 142, and to drain fluid from chamber 153, thereby retaining piston 140 and piston rod 139 at the neutral position. When multi-speed transmission 19 is set for backward traveling, electromagnetic valve 123 is excited so as to supply fluid from gearshift fluid passage 154 into chamber 153, and to drain fluid from chamber 142, thereby moving piston 140 and rod 139 (leftward in FIGS. 5 and 6) to the backward traveling position.

When engine 5 is started up, all electromagnetic valves 119, 120, 121, 122 and 123 are unexcited as shown in FIG. 6, so as to keep the neutral state of multi-speed transmission 19. When one traveling speed and direction mode of vehicle 1 is selected among the four forward traveling speeds and the backward traveling, corresponding one of electromagnetic valves 119, 120, 121, 122 and 123 is selectively excited, and any of pistons 146, 147 and 148 is moved together with corresponding piston rod 129, 134 or 139, corresponding connection arm 87, corresponding shifter shaft 116, 117 or 118, and corresponding fork 106, 107 or 108, so as to engage corresponding shifter 96*a*, 97*a* or 98*a* with one of driven gears 91, 92, 93, 94 and 95 corresponding to the selected traveling mode, thereby transmitting the rotary force of selected one of driven gears 91 to 95 to traveling output shaft 54. Then, center differential unit 101 distributes the rotary force of traveling output shaft 54 between front and rear output shafts 10 and 11, so as to drive front and rear transaxles 12 and 13, whereby vehicle 1 travels at the selected speed level and in the selected direction.

Pump 214 sucks fluid from a tank 201 through an oil filter 220, and distributes the fluid between gearshift fluid passage 154 and a clutch fluid passage 155. A relief valve 69 determines the maximum hydraulic pressure in clutch fluid passage 155 so as to protect a hydraulic circuit for supplying fluid to hydraulic cylinders 71 and 72. The fluid whose pressure is regulated by relief valve 69 is supplied to first clutch hydraulic cylinder 71 through a line filter 62, an electromagnetic proportional pressure reduction valve 67 and a line filter 63, and also supplied to second clutch hydraulic cylinder 72 through a line filter 64, an electromagnetic proportional pressure reduction valve 68 and a line filter 65.

Due to electromagnetic proportional pressure reduction valves 67 and 68, pistons 156 and 157 of respective hydraulic cylinders 71 and 72 are gradually and continuously moved, so as to continuously change the pressure among friction disks of respective first and second clutches 58 and 59. Therefore, each of clutches 58 and 59 can gradually and continuously change a torque transmitted therethrough when it is switched between the engagement state and the disengagement state.

A relief valve 70 is provided on a passage 158 on the downstream of relief valve 69 so as to determine the maximum pressure of fluid flowing therethrough. The fluid passed through relief valve 70 is supplied for lubricating a lubricated section 159 of multi-speed transmission 19 including various components and first and second clutches 58 and 59.

The gearshift of multi-speed transmission 19 is automatically controlled in correspondence to a relation between an accelerator operation degree (if the accelerator operation device is an accelerator pedal, a depression of the accelerator pedal) and an actual traveling speed of vehicle 1 (i.e., an actual rotary speed of axles 25 and 36). The automatic gearshift process will be described with reference to FIGS. 3 to 8.

Figure 7:
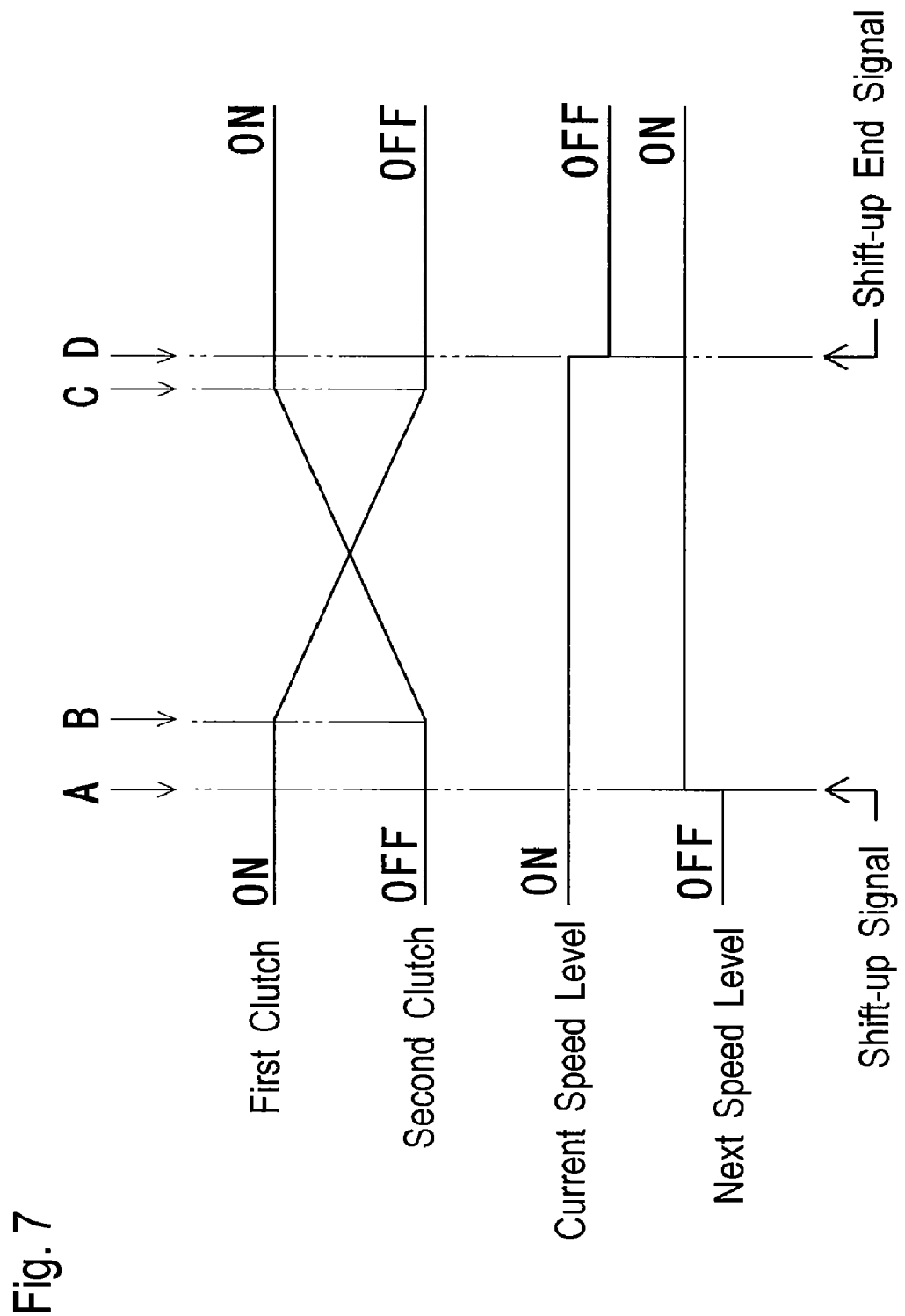
FIG. 7 is a time chart of gearshift control according to the first embodiment.

A gearshift (shift-up) pattern from the first forward traveling speed to the second forward traveling speed during traveling of vehicle 1 will be described as a respective gearshift pattern. As shown in FIG. 7, during the first speed forward travel of vehicle 1 (while the accelerator operation degree (e.g., depression of the accelerator pedal) corresponds to the first speed forward traveling), first clutch 58 is engaged (clutched on). In other words, first clutch hydraulic cylinder 71 keeps the proper clutch pressure of first clutch 58. At this time, electromagnetic valve 120 is excited (the other electromagnetic valves 119, 121, 122 and 123 are unexcited), so as to hold first shifter shaft 116 and first fork 106 at the first speed forward traveling position, so that shifter 96a engages with first speed normal driven gear 91, thereby drivingly connecting traveling output shaft 54 to first clutch 58 through the first speed normal gear train, i.e., gears 81 and 91. Therefore, the rotary force of first traveling gearshift shaft 52 driven by power from engine 5 through input shaft 18 and traveling input shaft 51 is transmitted to traveling output shaft 54 through engaged first clutch 58 and the first speed normal gear train (i.e., gears 81 and 91) essentially drivingly connected to first clutch 58. Simultaneously, second clutch 59 is disengaged (clutched off). In other words, second clutch hydraulic cylinder 72 keeps the minimum clutch pressure of second clutch 59. At this time, second shifter clutch shaft 117 and second fork 107 are disposed at the neutral position so as to disengage shifter 97a from driven gears 92 and 94.

When the accelerator operation device (e.g., the accelerator pedal) is operated at a timing A in FIG. 7, so as to increase the accelerator operation degree (e.g., depression of the accelerator pedal) for shift-up to the second speed forward traveling, a gearshift (shift-up) signal is inputted to a controller (not shown). Accordingly, the engagement of first clutch 58, the engagement of the first speed normal gear train (gears 81 and 91) with traveling output shaft 54, and the disengagement of second clutch 59 are kept as the state during the first speed forward traveling of vehicle 1, and the second speed gear train (i.e., gears 82 and 92) essentially connected to second clutch 59 is engaged with traveling output shaft 54. In this regard, unexcited electromagnetic valve 122 is excited so as to shift second shifter shaft 117 and second fork 107 to the second speed forward traveling position through piston rod 134 of second hydraulic cylinder 127, whereby shifter 97a having been disposed at the neutral position (separated from driven gears 92 and 94) slides to engage with second speed normal driven gear 92, thereby drivingly connecting traveling output shaft 54 to second clutch 59 through the second speed normal gear train (i.e., gears 82 and 92). However, at this time, second clutch 59 is still disengaged so as to prevent power from engine 5 from being transmitted to the second speed normal gear train, thereby reducing sudden stress caused by the engagement of the second speed normal gear train with traveling output shaft 54.

After the input of the gearshift (shift-up) signal, the controller confirms the engagement of the second speed normal gear train with traveling output shaft 54 before the process reaches a timing B shown in FIG. 7. At timing B, the controller issues a clutch-shift control signal for gradually disengaging first clutch 58 and for gradually engaging second clutch 59. Accordingly, electromagnetic proportional pressure reduction valves 67 and 68 are controlled so as to gradually and continuously move pistons 156 and 157 of hydraulic cylinders 71 and 72, respectively, so that, first clutch 58 is gradually transferred from the engagement state to the disengagement state (i.e., the clutch pressure of first clutch 58 is gradually reduced), and second clutch 59 is gradually transferred from the disengagement state to the engagement state (i.e., the clutch pressure of second clutch 59 is gradually increased). Therefore, the disengagement process of first clutch 58 and the engagement process of second clutch 59 overlap each other.

During a time passage from timing B to a timing C, the issue of the clutch-shift control signal from the controller is maintained. At timing C, first clutch 58 is completely disengaged (clutched off) and second clutch 59 is completely engaged (clutched on). In other words, during the issue of the clutch-shift control signal, both the first speed normal gear train and the second speed normal gear train are kept engaging with traveling output shaft 54, so that the power of engine 5 to the first speed normal gear train essentially connected to first clutch 58 is gradually reduced and the power of engine 5 to the second speed normal gear train essentially connected to second clutch 59 is gradually increased. Namely, the gearshift process involves a state that first and second clutches 58 and 59 are simultaneously half-clutched. Therefore, during the gearshift process since timing A till timing C, power of engine 5 is kept to traveling output shaft 54 without intermittence, and with respect to the share of power transmission to traveling output shaft 54 between the first speed normal gear train and the second speed normal gear train, the power transmission share of the first speed normal gear train is gradually reduced and the power transmission share of the second speed normal gear train is increased compensatively, so that the power transmission share of the second speed normal gear train reaches 100% at timing C. When the variation of clutch pressures of first and second clutches 58 and 59 relative to time passage are graphed, a curve representing the gradual reduction of clutch pressure of first clutch 58 cross a curve representing the gradual increase of clutch pressure of second clutch 59. Hereinafter, a clutch-shift control pattern using two clutches such that a curve representing gradual reduction of clutch pressure of one clutch crosses a curve representing gradual increase of clutch pressure of the other clutch is referred to as "cross wave control", which is adaptable to later-discussed various gearshift patterns.

When the gearshift (shift-up) process shown in FIG. 7 reaches a timing D slightly after timing C, the controller issues a gearshift (shift-up) end signal. Accordingly, the engagement of second clutch 59, the engagement of the second speed normal gear train (gears 82 and 92) with traveling output shaft 54, and the disengagement of first clutch 58 are kept as the state during the second speed forward traveling of vehicle 1, and the first speed gear train (i.e., gears 81 and 91) essentially connected to first clutch 58 is disengaged from traveling output shaft 54. In this regard, excited electromagnetic valve 120 is unexcited so as to shift first shifter shaft 116 and first fork 106 from the first speed forward traveling position through piston rod 129 of first hydraulic cylinder 126, whereby shifter 96a having been disposed at the first speed forward traveling position (engaged with first speed normal driven gear 91) slides to disengage from both first and third speed normal driven gears 91 and 93, thereby drivingly disconnecting traveling output shaft 54 from the first speed normal gear train (i.e., gears 81 and 91). In this way, the gearshift (shift-up) from the first forward traveling speed to the second forward traveling speed is completed by the disengagement of the first speed normal gear train (essentially connected to first clutch 58) from traveling output shaft 54 after the clutch-shift of first and second clutches 58 and 59, i.e., disengagement of first clutch 58 and engagement of second clutch 59. Therefore, sudden stress onto the power transmission system caused by the disengagement of the first speed normal gear train from traveling output shaft 54 is reduced. The other gearshift processes (e.g., shift-up from the second forward traveling speed to the third forward traveling speed, and shift-up from the third forward traveling speed to the fourth forward traveling speed) are performed similar to the shift-up process from the first forward traveling speed to the second forward traveling speed.

Hereinafter, it is assumed that the accelerator operation device is an accelerator pedal. With respect to the automatic gearshift control of multi-speed transmission 19 according to detection of depression of the accelerator pedal and detection of the actual traveling speed (i.e., the actual rotary speed of axles 25 and 36), timing A for issuing the gearshift signal and timing D for issuing the gearshift end signal are determined on the basis of a map of gearshift characteristic curves as shown in FIG. 8, detection of the actual throttle valve opening degree of engine 5 (corresponding to the depression of the accelerator pedal) by a sensor, and detection of the actual traveling speed of vehicle 1 (i.e., the rotary speed of axles 25 and 36) by a sensor.

Figure 8:
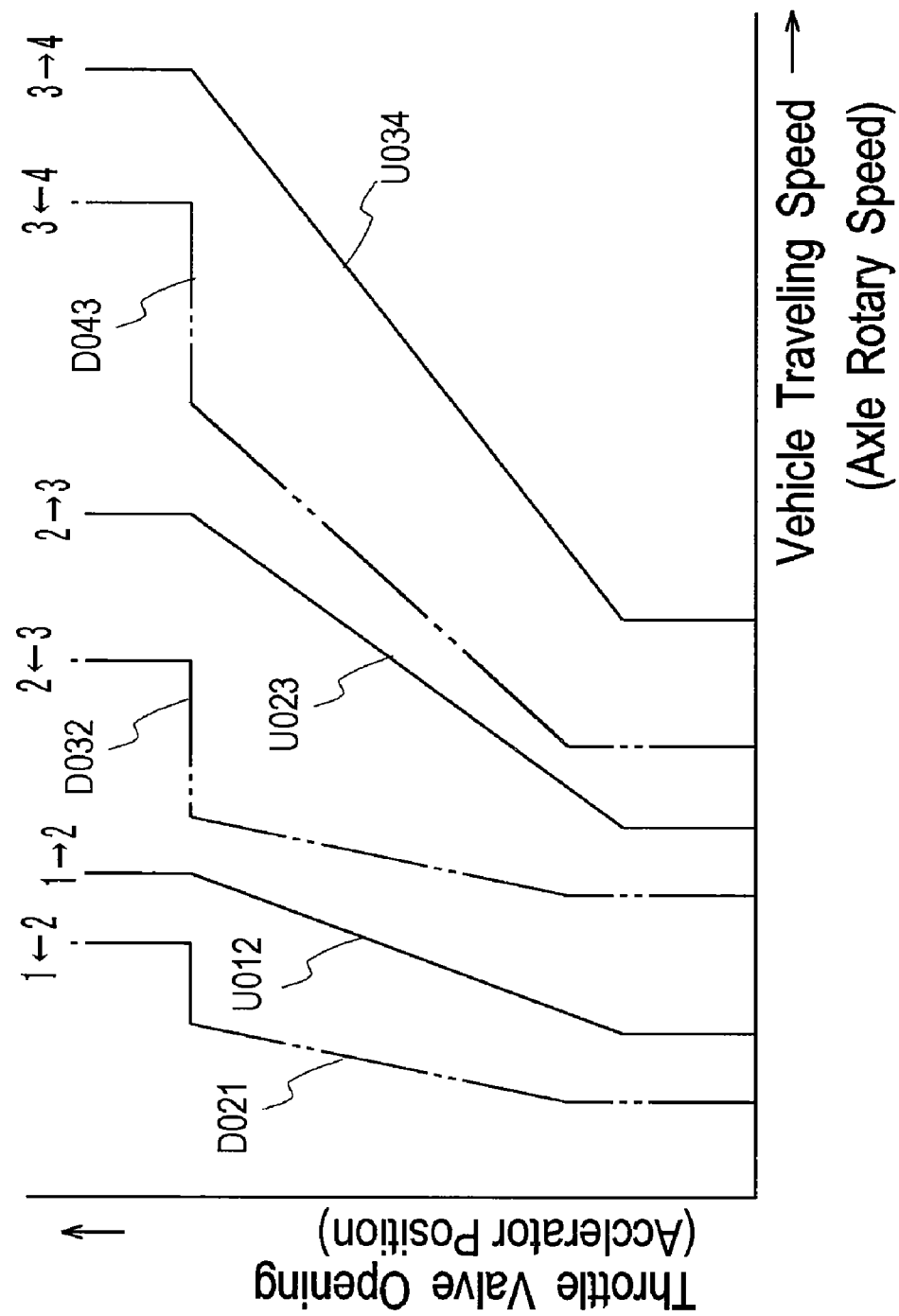
FIG. 8 is a map of characteristic curves for gearshift according to the first embodiment.

The gearshift based on the map of FIG. 8 is characteristic in that, with respect to a gearshift between any neighboring speeds, the traveling speed corresponding to shift-down is less than that corresponding to shift-up on the assumption that the accelerator operation degree (or throttle opening degree) is constant. In this regard, on the same assumption, the traveling speed on a graph D021 for shift-down from the second speed to the first sped is less than that on a graph U012 for shift-up from the first speed to the second speed. The relation between graphs U023 and D032 for shift up and down between the second speed and the third speed, and the relation between graphs U034 and D043 for shift up and down between the third speed and the fourth speed are similar. Therefore, multi-speed transmission 19 is prevented from being gearshifted excessively sensitively in reaction to variation of the vehicle traveling speed. Further, on each of the graphs, a lower traveling speed corresponds to a range of less accelerator degree $8^{th}$ rottle opening degree), and a higher traveling speed corresponds to a range of greater accelerator degree. Consequently, when the undepressed accelerator is suddenly depressed to a great depth, the vehicle traveling speed is increased to a considerably high value while keeping a low speed stage of transmission 19, thereby ensuring sufficient acceleration with the high torque created by the low speed stage. On the contrary, when the accelerator depressed at a depth corresponding to a high speed stage is suddenly returned to an undepressed position, the vehicle traveling speed is reduced to a considerably low value while keeping a high speed stage of transmission 19, thereby preventing transmission 19 from being suddenly shifted down.

A lubrication structure in transmission casing 8 incorporating multi-speed transmission 19 will now be described with reference to FIGS. 6 and 9. Inside transmission casing 8, a horizontal plate-like partition 160 is extended from a lower wall portion of transmission casing 8 so as to partition the inside space of transmission casing 8 into upper and lower chambers 161 and 162. Upper chamber 161 above partition 160 incorporates multi-speed transmission 19, and lower chamber 162 below partition 160 serves as a fluid sump for collecting fluid falling from multi-speed transmission 19.

An opening 169 is provided sidewise (leftward) from an (left) end of partition 160 and vertically downward from traveling PTO shaft 56. Therefore, hydraulic pressure fluid leaked from hydraulic devices such as hydraulic cylinders 71, 72, 126, 127 and 128 and electromagnetic valves 67, 68, 119, 120, 121, 122 and 123, and fluid after lubricating lubricated section 159 and clutches 58 and 59 (hydraulic cylinders 71 and 72) fall down along the inside wall surface of transmission casing 8, and are collected into the fluid sump in chamber 162 through only opening 169.

Further, a drain port 164 provided with a strainer is opened at a side wall of fluid sump chamber 162 in transmission casing 8, and connected to pump 213 through a pipe 165. Pump 213 is connected through a pipe 166 to an inlet 201a provided at a top portion of tank 201. Tank 201 is provided at a bottom portion thereof with an outwardly (downward) opened outlet 201b covered with an oil filter 220 disposed inside tank 201. Outlet 201b is connected to pump 214 through a pipe 167. Pump 214 is connected through passages 154 and 155 to various hydraulic devices such as hydraulic cylinders 71, 72, 126, 127, 128 and electromagnetic valves 67, 68, 119, 120, 121, 122 and 123.

Due to this structure, during traveling of vehicle 1, pump 213 driven by engine 5 sucks fluid from the fluid sump in chamber 162, so as to forcibly drain the fluid through pipe 166 into tank 201 disposed outside transmission casing 8. Therefore, even while engine 5 is driven for traveling of vehicle 1, tank 201 absorbs fluid from the inside of transmission casing 8 so as to keep a level of fluid surface 163 in transmission casing 8 lower than the lowest end of considerably high-speed rotated gears of multi-speed transmission 19. Pump 214 absorbs fluid from tank 201 through pipe 167, and supplies the fluid through passages 154 and 155 to multi-speed transmission 19 in transmission casing 8, thereby driving the hydraulic devices and lubricating various components and portions.

In this way, tank 201 is fluidly connected to transmission casing 8 so as to store fluid serving as lube for first and second clutches 58 and 59 and multi-speed transmission 19. Tank 201 absorbs fluid from transmission casing 8 so that a level of fluid surface 163 in transmission casing 8 becomes lower than a predetermined height during activation of engine 5. Due to such a lowered level of fluid surface 163, power loss caused by resistance of fluid agitated by a high-speed rotating gear is reduced so as to ensure efficient and economic high-speed traveling of vehicle 1.

The fluid stored in tank 201 also serves as hydraulic pressure fluid for hydraulically controlled first and second clutches 58 and 59 and shifter shafts 116, 117 and 118, so as to require no additional device for supplying fluid to these hydraulic devices, thereby simplifying vehicle 1.

Even while traveling vehicle 1 is laterally tilted by a wrong ground condition, partition 160 prevents the high-speed rotating gears from being submerged into the fluid accumulated in chamber 162 which is tilted laterally following the tilt of vehicle 1, thereby reducing the resistance of fluid against the agitation by the gears. Incidentally, since traveling PTO shaft 56 is rotated slowly, opening 169 is disposed vertically downward (just below) traveling PTO shaft 56 so that, even if fluid overflows from chamber 162 through opening 169, only slowly rotating traveling PTO shaft 56 is submerged into the overflowing fluid so as to reduce the resistance of fluid against its agitation.

As mentioned above, pumps 213 and 214 are driven together by input shaft 18. Consequently, the quantity of fluid recovered from transmission casing 8 to tank 201 is proportional to the rotary speed of engine 5. Accordingly, even if the rotary speed of engine 5 is increased so as to increase fluid delivered from pump 214 into transmission casing 8, pump 213 increases the quantity of fluid recovered from transmission casing 8 into tank 201.

In this way, the quantity of fluid recovered from transmission casing 8 into tank 201 is increased according to increase of the rotary speed of engine 5, and larger than the quantity of fluid supplied from tank 201 into transmission casing 8 such as to serve as the lube and the hydraulic pressure fluid. Therefore, the level of fluid surface 163 in transmission casing is kept at a predetermined height for satisfactory reduction of power loss by the resistance of fluid against agitation.

Tank 201 is disposed sidewise from transmission casing 8, and a substantially horizontal pipe 168 is extended from a vertically intermediate side wall of tank 201 and opened into transmission casing 8 through an opening 168a above partition 160, so that excessive fluid stored in tank 201 overflows from tank 201 into transmission casing 8 through pipe 168 so as to lubricate gears of multi-speed transmission 19. Pipe 168 is considerably lower than inlet 201a so as to prevent fluid in tank 201 from closing (overflowing from) inlet 201a. Therefore, even if fluid drained from drain port 164 involves much air caused by the lowering of fluid level in transmission casing 8 during traveling of vehicle 1, fluid delivered from pump 213 is necessarily dropped down from inlet 201a to the fluid sump in tank 201, thereby separating the air from the dropped fluid. Consequently, the fluid supplied from tank 201 into transmission casing 8 involves no air so as to properly function as lube and hydraulic pressure fluid for multi-speed transmission 19. Alternatively, tank 201 may be formed in transmission casing 8 by partitioning the inside space of transmission casing 8.

Figure 10:
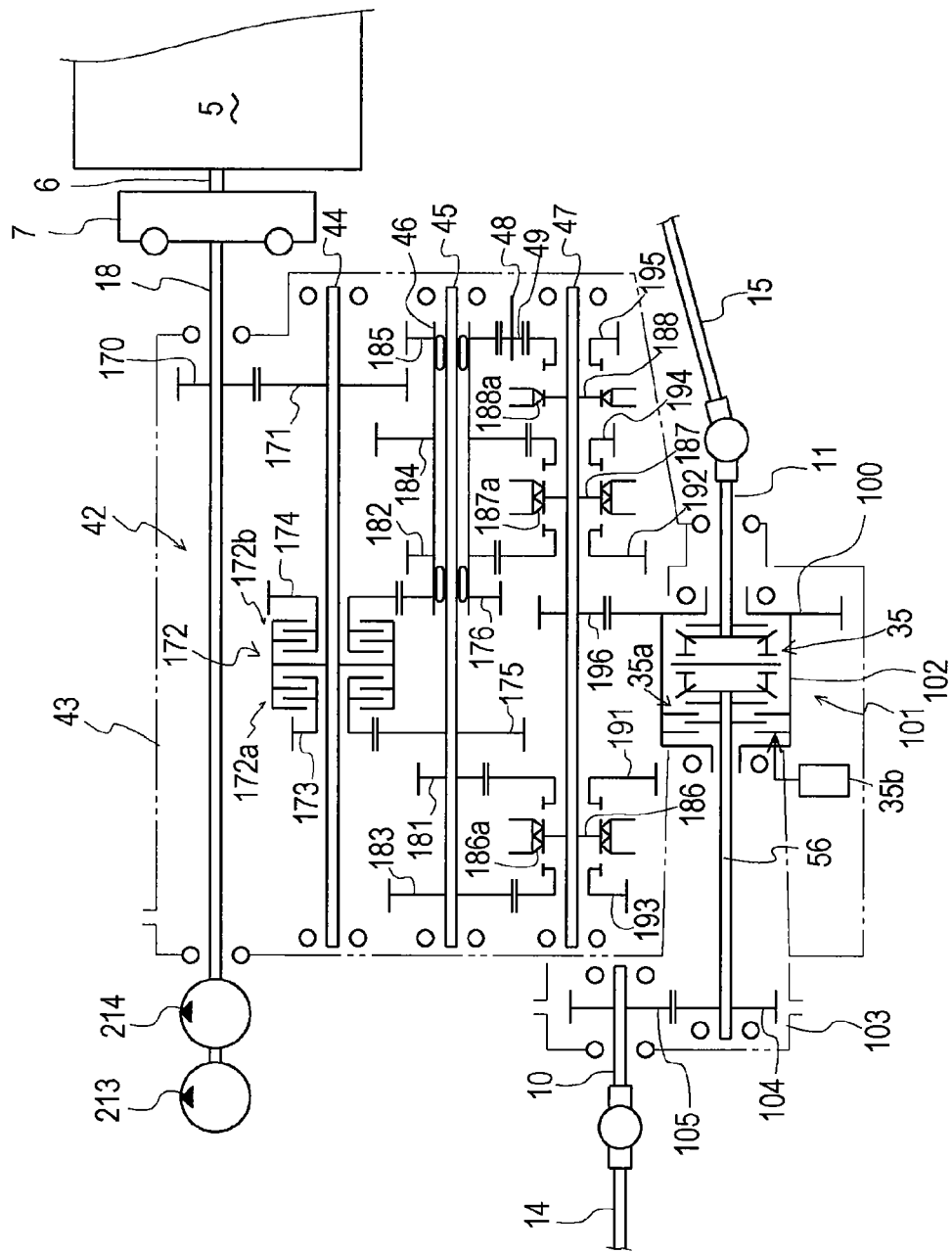
FIG. 10 is a skeleton diagram of an alternative multi-speed transmission according to a second embodiment.

A multi-speed transmission 42 shown in FIG. 10, serving as a second embodiment of the multi-speed transmission, will be described. The same components and portions as those in the first embodiment are designated by the same reference numbers. A transmission casing 43 incorporates multi-speed transmission 42, including input shaft 18, a clutch input shaft 44, a first traveling gearshift shaft 45, a second traveling gearshift shaft 46, a traveling output shaft 47, a counter shaft 48 and traveling PTO shaft 56. Shafts 18, 44, 45, 46, 47, 48 and 56 are disposed in parallel in transmission casing 8 and extended horizontally in the fore-and-aft horizontal direction of vehicle 1.

A gear 170 is fixed on input shaft 18, a gear 171 is fixed on clutch input shaft 44, and gears 170 and 171 constantly mesh with each other so as to transmit power from input shaft 18 to clutch input shaft 44. A first clutch 172a and a second clutch 172b are integrally assembled together so as to constitute a clutch 172 disposed on clutch input shaft 44 in front of gear 171.

A first clutch output gear 173 is relatively rotatably provided on clutch input shaft 44 in front of first clutch 172a. When first clutch 172a is engaged, first clutch output gear 173 is relatively unrotatably engaged with clutch input shaft 44 through engaged first clutch 172a. A second clutch output gear 174 is relatively rotatably provided on clutch input shaft 44 behind second clutch 172b. When second clutch 172b is engaged, second clutch output gear 174 is relatively unrotatably engaged with clutch input shaft 44 through engaged second clutch 172b.

First traveling gearshift shaft 45 is fixedly provided on a front portion thereof with an input gear 175, a first speed normal drive gear 181 disposed in front of input gear 175, and a third speed normal drive gear 183 disposed in front of first speed normal drive gear 181. Input gear 175 meshes with first clutch output gear 173 so as to transmit power from clutch input shaft 44 to first traveling gearshift shaft 45 through engaged first clutch 172a.

First traveling gearshift shaft 45 is relatively rotatably provided on a rear portion thereof with cylindrical second traveling gearshift shaft 46. Second traveling gearshift shaft 46 is fixed thereon with a reverse drive gear 185, a four speed normal drive gear 184 disposed in front of reverse drive gear 185, a second speed normal drive gear 182 disposed in front of fourth speed normal drive gear 184, and an input gear 176 disposed in front of second speed normal drive gear 182. Input gear 176 meshes with second clutch output gear 174 so as to transmit power from clutch input shaft 44 to second traveling gearshift shaft 46 through engaged second clutch 172b.

Due to the coaxial arrangement of cylindrical second traveling gearshift shaft 46 on the rear portion of first traveling gearshift shaft 45, the number of transmission shafts of multi-speed transmission 42 is reduced so as to minimize transmission casing 43, thereby lightening and minimizing vehicle 1. Transmission casing 43 is especially vertically minimized (vertically thinned) so as to be easily disposed under cargo 4 without reduction of the ground clearance of vehicle 1 or heightening of vehicle 1.

Traveling output shaft 47 is relatively rotatably provided thereon with a reverse driven gear 195, a fourth speed normal driven gear 194 disposed in front of reverse driven gear 195, a second speed normal driven gear 192 disposed in front of fourth speed normal driven gear 194, a first speed normal driven gear 191 disposed in front of second normal driven gear 192, and a third speed normal driven gear 193 disposed in front of first speed normal driven gear 191. First and third speed normal driven gears 191 and 193 mesh with respective first and third speed normal drive gears 181 and 183 fixed on first traveling gearshift shaft 45. Second and fourth speed normal driven gears 192 and 194 mesh with respective second and fourth speed normal drive gears 182 and 184 fixed on second traveling gearshift shaft 46. Counter shaft 48 is extended in the fore-and-aft direction of vehicle 1 between second traveling gearshift shaft 46 and traveling output shaft 47, and an idle gear 49 is provided on counter shaft 48 so as to mesh with reverse drive and driven gears 185 and 195.

In this way, gears 181 and 191 constitute a first speed normal (forward traveling) gear train, gears 182 and 192 constitute a second speed normal (forward traveling) gear train, gears 183 and 193 constitute a third speed normal (forward traveling) gear train, gears 184 and 194 constitute a fourth speed normal (forward traveling) gear train, and gears 185, 49 and 195 constitute a reverse (backward traveling) gear train.

Traveling output shaft 47 is fixedly provided thereon with a splined hub 186 disposed between first and third speed normal driven gears 191 and 193, a splined hub 187 disposed between second and fourth speed normal driven gears 192 and 194, and a splined hub 188 disposed in front of reverse driven gear 195 and behind fourth speed normal driven gear 194. Shifters 186a, 187a and 188a are axially slidably and relatively unrotatably fitted on respective splined hubs 186, 187 and 188.

The same shifter control mechanism as the above is provided for selectively engage any of shifters 186a, 187a and 188a with any of driven gear 191, 192, 193, 194 and 195, so as to relatively unrotatably connect the corresponding driven gear 191, 192, 193, 194 or 195 to traveling output shaft 47, thereby transmitting the rotary force of first or second traveling gearshift shaft 45 or 46 to traveling output shaft 47 through the selected gear train.

During the clutch-shift between first and second clutches 172a and 172b, both the first speed normal gear train and the reverse gear train can be simultaneously drivingly connected to traveling output shaft 47 because the first speed normal gear train, i.e., gears 181 and 191, is essentially connected to first clutch 172a, and the reverse gear train, i.e., gears 185, 49 and 195, is essentially connected to second clutch 172b.

In other words, before starting vehicle 1, the reverse (backward traveling) gear train can be drivingly connected to traveling output shaft 47 while one of the first and third speed normal (forward traveling) gear trains is drivingly connected to traveling output shaft 47. In this precondition, one of clutches 172a and 172b is selectively engaged so as to drivingly connect either the reverse (backward traveling) gear train or the one of the first and third speed normal (forward traveling) gear train to corresponding traveling gearshift shaft 45 or 46. Namely, first and second clutches 172a and 172b serve as a start-up clutch to be engaged for the starting of vehicle 1. When second clutch 172b is engaged, vehicle 1 starts backward traveling. When first clutch 172a is engaged, vehicle 1 starts forward traveling at the first or third speed. Multi-speed transmission 42 is advantageous for vehicle 1 traveling for work requiring frequent change of traveling direction between forward and backward, because it requires only the easy clutch-shift between first and second clutches 172a and 172b for changing the traveling direction of vehicle 1.

Description will now be given of a vehicle transmission system 521 including a multi-speed transmission 526 according to a third embodiment is configured so as to enable a prompt shift between a certain forward-traveling speed stage and a backward-traveling speed stage by use of the alternate shift between a first clutch for odd-numbered speed stages and a second clutch for even-numbered speed stage with reference to FIGS. 7, 8 and 11 to 17. First, an entire construction of vehicle transmission system 521 including multi-speed transmission 526 will be described with reference to FIG. 11. Vehicle transmission system 521 is provided with a four-wheel drive agricultural tractor. An engine 598 is mounted on a front portion of the tractor, and a transmission casing 522 of vehicle transmission system 521 is disposed in the tractor behind engine 598. Transmission casing 522 incorporates a multi-speed transmission 526 serving as a main transmission (hereinafter, referred to as "main transmission 526") and a sub transmission 527. The rotary power from engine 598 is determined in rotary speed and rotary direction by main transmission 526, then it is transmitted to sub transmission 527 so as to be further determined in rotary speed by sub transmission 527, and is transmitted to front and rear wheels (not shown) of the tractor.

Transmission casing 522 includes a front housing 523 and a rear housing 524 ranging front and rear. Front housing 523 is formed at a front portion thereof integrally with a partition wall 523a, and is provided at a rear end thereof with a bearing block 525. Rear housing 524 is formed therein integrally with a partition wall 524a and a bearing wall 524b behind partition wall 524a, and is covered at a rear open end thereof by a rear cover 524c.

A flywheel 529 of engine 598 is disposed in a flywheel chamber in front housing 523 in front of partition wall 523a, and is connected to an input shaft 531 through a damper 530. Input shaft 531 is journalled by partition wall 523a and bearing block 525 through respective bearings, and is extended rearward from bearing block 525 to be rotatably integrally connected to a front end of a coaxial transmission shaft 532.

To constitute a traveling transmission system for driving the rear and front wheels of the tractor, main transmission 526 driven by input shaft 531 is disposed in a main transmission chamber in front housing 523 between partition wall 523a and bearing block 525, and sub transmission 527 is disposed in a sub transmission chamber in rear housing 524 between bearing block 525 and partition wall 524a.

A differential gear unit for the rear wheels is disposed in a differential gear chamber in rear housing 524 between partition wall 524a and bearing wall 524b. An input bevel gear 547 of the differential gear unit meshes with a final bevel pinion 546 fixed on a rear end of a propeller shaft 545 serving as an output shaft of sub transmission 527, so as to transmit the output power of sub transmission 527 to the rear wheels of the tractor.

Further, vehicle transmission system 521 is provided with a front-wheel driving clutch 550, a PTO clutch 535 for a working device, a hydraulic lift device 544 for lifting up and down the working device, and so on. Detailed description of these components and relevant structures is omitted because they are as usual.

Construction and activation of main transmission 526 and sub transmission 527 will be described with reference to FIGS. 11 to 13. Referring to main transmission 526, in the main transmission chamber of front housing 523, input shaft 531 is relatively rotatably fitted on a rear half portion thereof with a hollow first clutch output shaft 555, and on a front half portion thereof with a hollow second clutch output shaft 556. A main transmission clutch unit 553, which includes a first clutch C1, a second clutch C2 and a clutch cylinder 553a shared between first and second clutches C1 and C2, is disposed around input shaft 531 between shafts 555 and 556.

Clutch cylinder 553a is fixed at a center boss thereof onto input shaft 531 between shafts 555 and 556 so as to be rotatable integrally with input shaft 531. First clutch C1 is interposed between clutch cylinder 553a and first clutch output shaft 555, and second clutch C2 is interposed between clutch cylinder 553a and second clutch output shaft 556, so that first clutch C1 and second clutch C2 are aligned symmetrically with respect to clutch cylinder 553a.

Clutches C1 and C2 of main transmission clutch unit 553 are hydraulically-activated clutches. Referring to FIG. 12, clutch cylinder 553a is formed with a partition wall extended radially outward from a fore-and-aft middle portion of the center boss thereof, and is formed with outer peripheral walls extended forward and rearward from the outer peripheral edge of the partition wall thereof. A rear chamber of clutch cylinder 553a between the rearwardly extended outer peripheral wall and the center boss incorporates first clutch C1. A front chamber of clutch cylinder 553a between the forwardly extended outer peripheral wall and the center boss incorporates second clutch C2.

A first piston 557 is fore-and-aft slidably fitted in the rear chamber of clutch cylinder 553a, and a second piston 558 is fore-and-aft slidably fitted in the front chamber of clutch cylinder 553a. Return springs 554 are disposed in the respective rear and front chambers of clutch cylinder 553a, and bias respective pistons 557 and 558 toward the partition wall of clutch cylinder 553a.

First clutch output shaft 555 is inserted at a front end thereof into the rear chamber of clutch cylinder 553a around return spring 554, so as to compress return spring 554 in the rear chamber between piston 557 and first clutch output shaft 555. In the rear chamber of clutch cylinder 553a behind piston 557, friction discs are relatively unrotatably and axially slidably fitted to the outer peripheral wall of clutch cylinder 553a, and other friction discs are relatively unrotatably and axially slidably fitted to the front end of first clutch output shaft 555, so that the friction discs fitted to clutch cylinder 553a and the friction discs fitted to first clutch output shaft 555 are alternately aligned so as to serve as first clutch C1. By supplying fluid into a fluid chamber 559 in the rear chamber of clutch cylinder 553a between the partition wall of clutch cylinder 553a and piston 557, the fluid supplied in fluid chamber 559 pushes piston 557 rearward against spring 554 to press the friction discs of first clutch C1 against one another, thereby engaging first clutch C1.

Also, in the front chamber of clutch cylinder 553a in front of piston 558, multi friction discs of second clutch C2 are interposed between the outer peripheral wall of clutch cylinder 553a and a rear end of second clutch output shaft 556. Fluid supplied into a fluid chamber 560 in the front chamber between piston 558 and the partition wall of clutch cylinder 553a slides piston 558 forward so as to press the friction discs against one another, thereby engaging second clutch C2.

A fluid passage 561 is formed in the center boss of clutch cylinder 553a and input shaft 531 and is opened to fluid chamber 559. Fluid chamber 559 is fluidly connected through fluid passage 561 to an electromagnetic proportional reduction valve 565 serving as a control valve for controlling a pressure of operation fluid to first clutch C1, as shown in FIG. 13. Also, a fluid passage 562 is formed in the center boss of clutch cylinder 553a and input shaft 531 and is opened to fluid chamber 560. Fluid chamber 560 is fluidly connected through fluid passage 562 to an electromagnetic proportional reduction valve 566, serving as a control valve for controlling a pressure of operation fluid to second clutch C2, as shown in FIG. 13.

Further, lubricating fluid passages 563 are formed in input shaft 531 so as to supply lubricating fluid for lubricating first and second clutches C1 and C2 to gaps between the outer peripheral surface of input shaft 531 and the inner peripheral surfaces of pistons 557 and 558, and to gaps between the outer peripheral surface of input shaft 531 and the inner peripheral surfaces of clutch output shafts 555 and 556. A valve may be provided for controlling the fluid supply to fluid passages 563.

In this regard, a plate 593 is fixed to a front surface of partition wall 523a, and a hydraulic gear pump 591 is mounted onto a front surface of plate 593 so that input shaft 531 serves as a pump shaft of pump 591. Pump 591 sucks fluid from a fluid tank, such as an external reservoir tank out of transmission casing 522 or a fluid sump in transmission casing 522, and supplies the fluid to valves 565 and 566 for supplying operation fluid of first and second clutches C1 and C2, and to fluid passages 563 (through a valve for supplying lubrication fluid, if it is provided) for supplying lubrication fluid for lubricating first and second clutches C1 and C2.

Electromagnetic proportional reduction valves 565 and 566 have respective solenoids which are excited/unexcited by commands from a controller 567 based on an operation position of a main gearshift lever 564 provided on the tractor. When controller 567 detects the position of main gearshift lever 564 and decides first clutch C1 to be engaged, the solenoid of valve 565 is excited to gradually supply operation fluid to fluid chamber 559 of first clutch C1 through fluid passage 561 so as to push first piston 557 against spring 554, thereby gradually pressing the friction discs of first clutch C1 against one another, i.e., gradually engaging first clutch C1. On the contrary, when controller 567 detecting the position of main gearshift lever 564 decides first clutch C1 to be disengaged, the solenoid of valve 565 is unexcited to stop the fluid supply to fluid chamber 559 so that spring 554 pushes first piston 557 away from the friction discs of first clutch C1, thereby gradually separating the friction discs of first clutch C1 from one another, i.e., gradually disengaging first clutch C1. Similarly, since controller 567 detecting the position of main gearshift lever 564 decides whether second clutch C1 needs to be engaged or disengaged, the solenoid of valve 566 is excited or unexcited so as to control the fluid supply to fluid chamber 560 of second clutch C2, thereby gradually moving second piston 558 and gradually engaging or disengaging second clutch C2.

Speed gear trains of main transmission 526 will now be described. First clutch output shaft 555 is fixedly provided thereon with a third speed forward traveling driving gear 573 and a first speed forward traveling driving gear 571. Second clutch output shaft 556 is fixedly provided thereon with a second speed forward traveling driving gear 572, a fourth speed forward traveling driving gear 574 and a backward traveling driving gear 575. A main transmission output shaft 576 is extended in parallel to input shaft 531, and is relatively rotatably provided thereon with a third speed forward traveling driven gear 583, a first speed forward traveling driven gear 581, a second speed forward traveling driven gear 582, a fourth speed forward traveling driven gear 584 and a backward traveling driven gear 585.

First speed driving and driven gears 571 and 581 directly mesh with each other so as to serve as a first speed forward traveling gear train. Second speed driving and driven gears 572 and 582 directly mesh with each other so as to serve as a second speed forward traveling gear train. Third speed driving and driven gears 573 and 583 directly mesh with each other so as to serve as a third speed forward traveling gear train. Fourth speed driving and driven gears 574 and 584 directly mesh with each other so as to serve as a fourth speed forward traveling gear train. Backward traveling driving and driven gears 575 and 585 mesh with each other through an idle gear 592 so as to serve as a backward-traveling gear train.

Main transmission output shaft 576 is fixedly provided with a spline hub 568 between third and first speed driven gears 583 and 581, with a spline hub 569 between second and fourth speed driven gears 582 and 584, and with a spline hub 570 between fourth speed driven gear 584 and forward-traveling driven gear 585. Shifters 568a, 569a and 570a are axially slidably and relatively unrotatably spline-fitted on respective spline hubs 568, 569 and 570.

First and third speed driven gears 581 and 583 are formed with respective clutch-toothed portions 581a and 583a on ends thereof facing spline hub 568 therebetween. Second and fourth speed driven gears 582 and 584 are formed with respective clutch-toothed portions 582a and 584a on ends thereof facing spline hub 569 therebetween. Backward traveling driven gear 585 is formed with a clutch-toothed portion 585a on an end thereof facing spline hub 570.

When any one of the first to fourth speed forward traveling gear trains or the backward traveling gear train is selected to be activated, the driven gear of the selected gear train is relatively unrotatably (i.e., rotatably integrally) engaged to main transmission output shaft 576 by meshing corresponding one of shifters 568a, 569a and 570a with corresponding one of clutch toothed portions 581a, 582a, 583a, 584a and 585a. When first or second clutch C1 or C2 corresponding to the gear train selected to be activated is engaged, the power of engine 598 transmitted to input shaft 531 is transmitted to main transmission output shaft 576 through the gear train selected to be activated, so that the rotary power of main transmission output shaft 576 is a main transmission output power, which is one of the first to fourth speed forward traveling rotary powers or the backward traveling rotary power, so as to be outputted to sub transmission 527.

Figure 13:
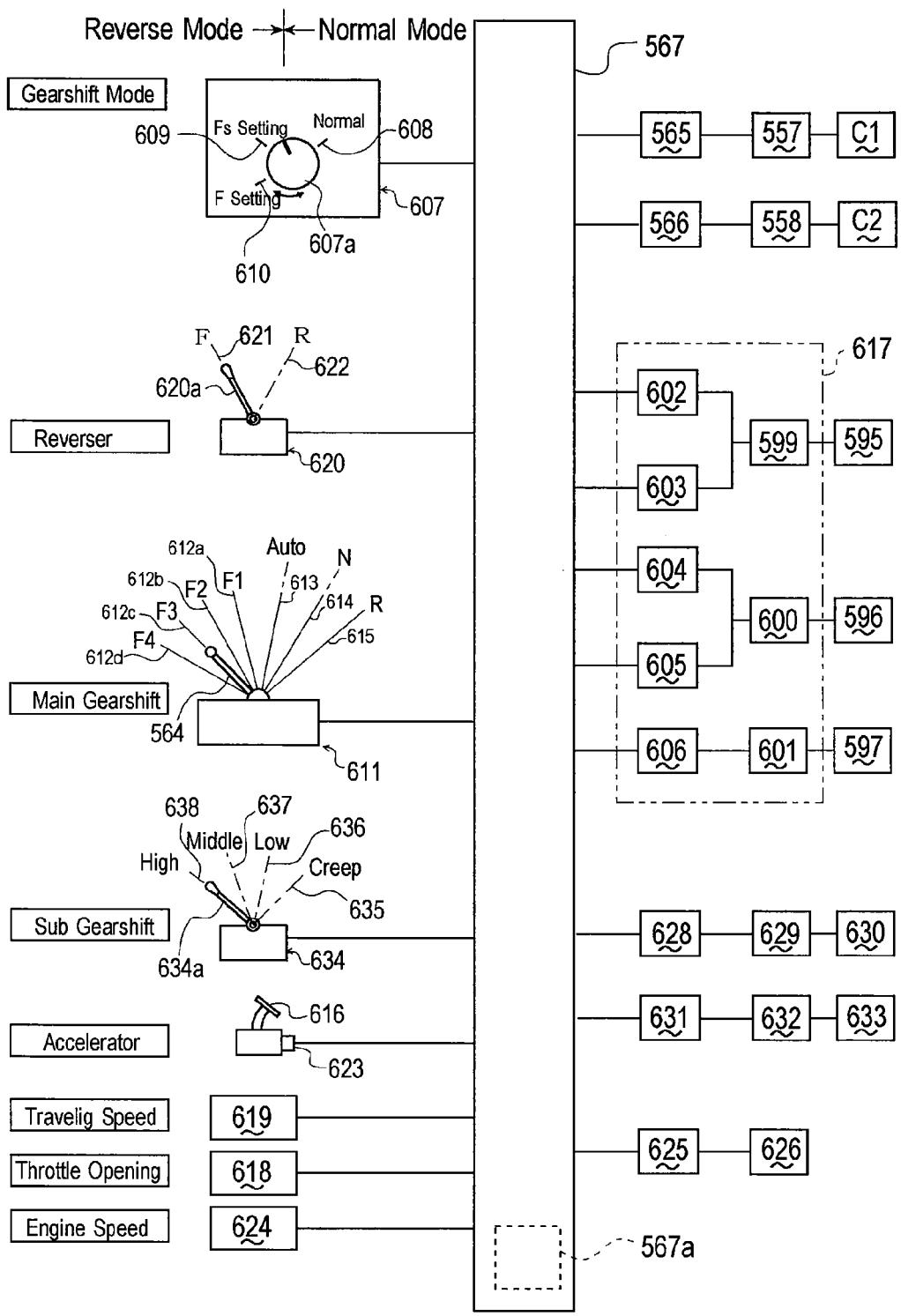
FIG. 13 is a block diagram of a control system used for the third embodiment.

Shifters 568a, 569a and 570a of main transmission 526 are connected through respective forks 595, 596 and 597 to piston rods of respective hydraulic cylinders 599, 600 and 601, as shown in FIG. 13. Each of double-action hydraulic cylinders 599 and 600 has two fluid chambers with a piston therebetween. Electromagnetic switching valves 602 and 603 are fluidly connected to the respective fluid chambers of hydraulic cylinder 599. Electromagnetic switching valves 604 and 605 are fluidly connected to the respective fluid chambers of hydraulic cylinder 600. Single-action hydraulic cylinder 601 has a fluid chamber on one side of a piston thereof, the fluid chamber being fluidly connected to electromagnetic switching valve 606, and hydraulic cylinder 601 has a returning spring on the other side of the piston.

Hydraulic cylinders 599, 600 and 601 and valves 602, 603, 604, 605 and 606 constitute a shifter control system 617. According to detection of the operation position of main gearshift lever 564, controller 567 commands to excite/unexcite the solenoids of valves 565 and 566 for first and second clutches C1 and C2, and commands to excite/unexcite solenoids of valves 602, 603, 604, 605 and 606 so as to control the pistons of hydraulic cylinder 599, 600 and 601, thereby controlling shifters 568a, 569a and 570a for selecting any one of the first to fourth forward traveling gear trains or the backward traveling gear train to be activated.

Figure 11:
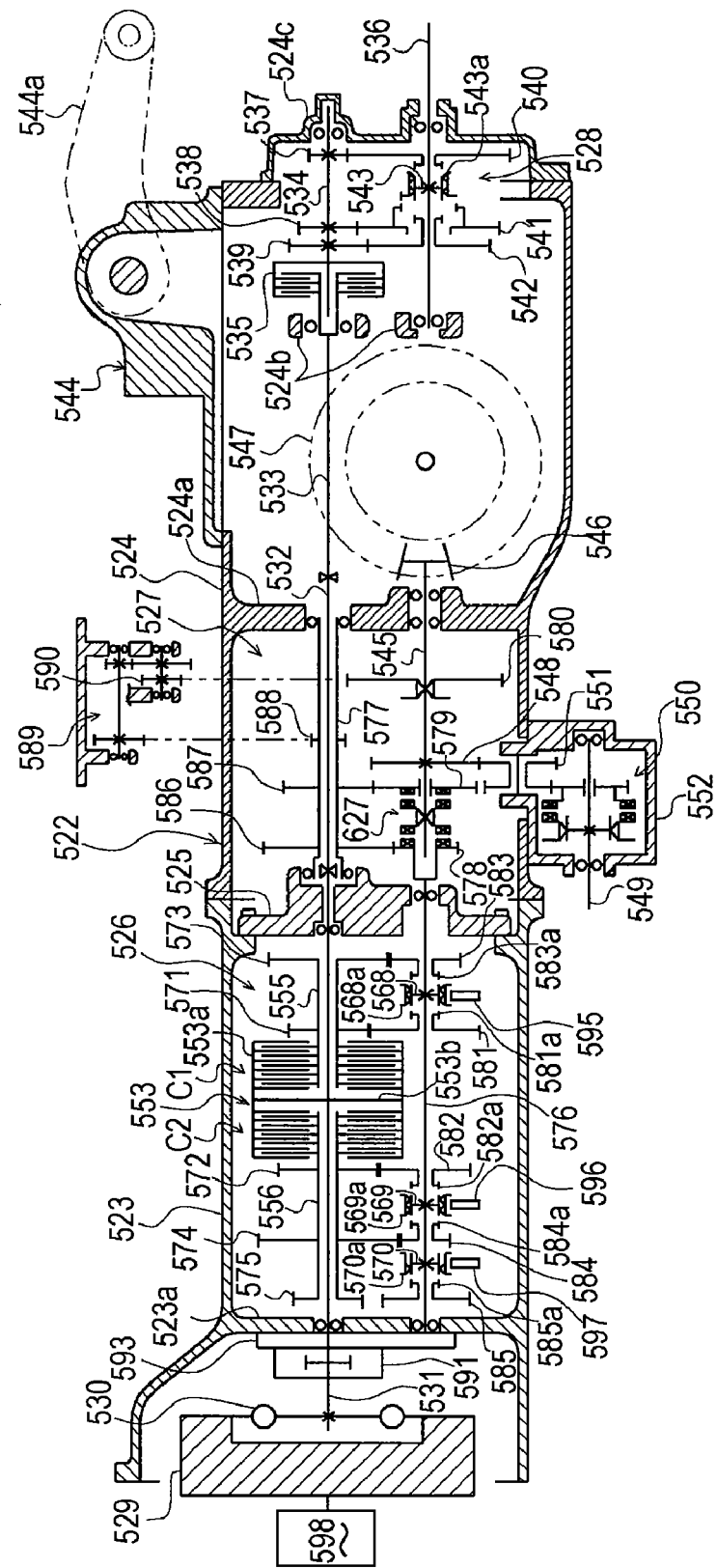
FIG. 11 is a skeleton diagram of a vehicle transmission system including an alternative multi-speed transmission according to a third embodiment.
Figure 12:
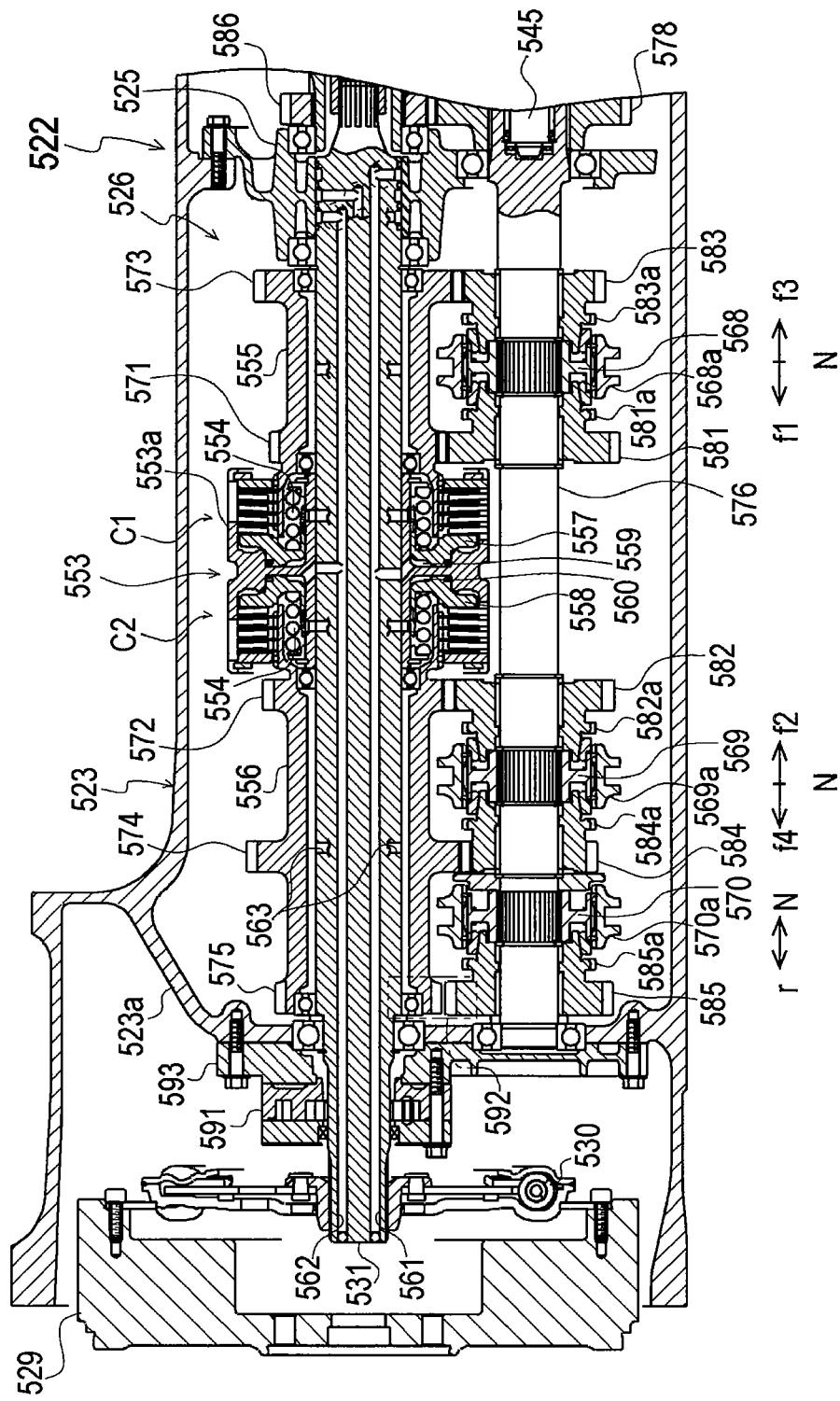
FIG. 12 is a side view partly in section of a front housing used for the vehicle transmission system of the third embodiment.

Referring to FIG. 11, in the sub transmission chamber of rear housing 524, sub transmission 527 includes propeller shaft 545 and a hollow counter shaft 577 extended in parallel to propeller shaft 545. Counter shaft 577 is relatively rotatably provided on transmission shaft 532. A diametrically large gear 586, a diametrically middle gear 587 and a diametrically small gear 588 are aligned rearward, and are fixed on counter shaft 577. A creeping deceleration gear train 589 and a creep gear 590 serving as an output gear of creeping deceleration gear train 589 are supported in the sub transmission chamber outside of counter shaft 577 and propeller shaft 545. Diametrically small gear 588 is constantly drivingly connected to creep gear 590 through creeping deceleration gear train 589.

A slidable gear 580 is axially slidably and relatively unrotatably fitted on propeller shaft 545 so that the position of slidable gear 580 on propeller shaft 545 is selected to mesh with either diametrically small gear 588 or creep gear 590 or none of gears 588 and 590. That is, gear 580 is shiftable among a low-speed position for meshing with diametrically small gear 588, a creep position for meshing with creep gear 590, and a neutral position for meshing with none of gears 588 and 590.

A deceleration gear 579 is relatively rotatably fitted on propeller shaft 545 in front of power take-off gear 548, and directly meshes with diametrically middle gear 587. A deceleration gear 578 is fixed on a rear end of main transmission output shaft 576, is relatively rotatably fitted onto a front end portion of propeller shaft 545 in front of deceleration gear 579, and directly meshes with diametrically large gear 586.

A double clutch 627 is disposed on propeller shaft 545 between gears 578 and 579. Clutch 627 is shiftable among a high speed position for meshing with gear 578 instead of gear 579, a middle speed position for meshing with gear 579 instead of gear 578, and a neutral position for meshing with none of gears 578 and 579.

When clutch 627 is set at the high speed position, propeller shaft 545 is directly connected to coaxial main transmission output shaft 576 rotatably integrally with main transmission output shaft 576, that is, the rotation of main transmission output shaft 576 is transmitted to propeller shaft 545 without deceleration, whereby propeller shaft 545 is rotated at the high speed. Simultaneously, gear 580 is set at the neutral position thereof.

When clutch 627 is set at the middle speed position, propeller shaft 545 becomes rotatable relative to main transmission output shaft 576, and simultaneously, propeller shaft 545 is connected rotatably integrally with gear 579. Accordingly, the rotation of main transmission output shaft 576 is decelerated by gears 578 and 586, counter shaft 577 and gears 587 and 579, and then is transmitted to propeller shaft 545, whereby propeller shaft 545 is rotated at the middle speed. Simultaneously, gear 580 is set at the neutral position thereof.

When gear 580 is set at the low speed position, gear 580 rotatably integral with propeller shaft 545 meshes with gear 586 on counter shaft 577. Simultaneously, clutch 627 is set at the neutral position thereof.

When gear 580 is set at the creep position, gear 580 rotatably integral with propeller shaft 545 meshes with gear 590. Simultaneously, clutch 627 is set at the neutral position thereof.

In sub transmission 527, clutch 627 and gear 580 are shifted by respective hydraulic cylinders 629 and 632 as shown in FIG. 13 through respective forks 630 and 633. Hydraulic cylinders 629 and 632 are controlled by respective electromagnetic switching valves 628 and 631 which are electrically connected to controller 567.

Referring to FIG. 13, a sub gearshift lever 634a is provided on the tractor and is shiftable among a creep position 635, a low speed position 636, a middle speed position 637 and a high speed position 638. A sub gearshift switch 634 is provided for detecting the operation position of sub gearshift lever 634a, and is electrically connected to controller 567. Controller 567 decides to excite/unexcite solenoids of electromagnetic switching valves 628 and 631 based on the detection of the position of lever 634a by switch 634, so as to control hydraulic cylinders 629 and 632, whereby clutch 627 and gear 580 are set so as to rotate propeller shaft 545 at the speed determined by sub gearshift lever 634a.

Various actions of vehicle transmission system 521 by use of manipulators (607a, 620a, 564, 634a and 616) and sensors (619, 618 and 624) as shown in FIG. 13, which are provided on the tractor, will be described with reference to FIGS. 7, 8 and 11 to 15.

As shown in FIG. 13, the tractor is provided with manipulators manually operated by an operator, i.e., a gearshift mode setting dial 607a, a reverser lever 620a, main gearshift lever 564, sub gearshift lever 634a and an accelerator pedal 616.

Gearshift mode setting dial 607a is shiftable among a normal mode position 608, an automatic reverse mode position 609 and a manual reverse mode position 610. A switch 607 serving as detection means for detecting the position of dial 607a is electrically connected to controller 567.

Reverser lever 620a is shiftable between a forward-traveling position 621 and a backward-traveling position 622. A switch 620 serving as detection means for detecting the position of lever 620a is electrically connected to controller 567.

Main gearshift lever 564 is shiftable among a first speed forward-traveling position 612a, a second speed forward-traveling position 612b, a third speed forward-traveling position 612c, a fourth speed forward-traveling position 612d, an automatic gearshift position 613, a neutral position 614 and a backward-traveling position 615. A switch 611 serving as detection means for detecting the position of lever 564 is electrically connected to controller 567.

Sub gearshift lever 634a is shiftable among four speed positions 635, 636, 637 and 638 as mentioned above. Switch 634 serving as detection means for detecting the position of lever 564 is electrically connected to controller 567 as mentioned above.

Accelerator pedal 616 is provided so that the throttle valve opening degree of engine 598 is adjusted according to the depression degree of accelerator pedal 616 so as to control the rotary speed of engine 598. An accelerator sensor 623 for detecting the depression degree of accelerator pedal 616 is electrically connected to controller 567. Controller 567 controls an actuator 625 such as an electric motor for controlling an opening degree of an engine throttle valve 626. Further, to provide a later-discussed engine-cooperated speed-change, controller 567 also controls actuator 625 according to detection signals from a vehicle traveling speed sensor 619, a throttle valve opening sensor 618 and an engine rotary speed sensor 624.

When gearshift mode setting dial 607a is set at normal mode position 608, whether or not the tractor travels backward is decided depending on whether or not main gearshift lever 564 is disposed at backward-traveling position 615. A backward-traveling speed R of main transmission 526 is only one speed for backward-traveling, so that the backward traveling speed of the tractor varies according to the variation of speed stages of sub transmission 527 one of which is selected by operating sub gearshift lever 634a before traveling of the tractor, and according to the variation of rotary speed of engine 598 that is based on the depression degree of accelerator pedal 616 and so on.

When gearshift mode setting dial 607a is set at normal position 608, the forward-traveling speed of the tractor is determined according to the speed stage of sub transmission 527 that is predetermined by sub gearshift lever 634a before traveling of the tractor, according to the engine rotary speed that is based on the depression degree of accelerator pedal 616 and so on, and according to the speed stage of main transmission 526 that is automatically or manually shifted during traveling of the tractor. When main gearshift lever 564 is set at automatic gearshift position 613, one of the forward traveling speeds of main transmission 526, i.e., a forward traveling first speed F1, a forward traveling second speed F2, a forward traveling third speed F3 and a forward traveling fourth speed F4, is automatically selected so as to correspond to the engine rotary speed, the actual traveling speed of the tractor or so on. Otherwise, the speed of main transmission 526 is manually determined by setting main gearshift lever 564 to one of positions 612a, 612b, 612c and 612d.

Consequently, when gearshift mode setting dial 607a is set at normal mode position 608, the variation of speed ratios established by main and sub transmissions 526 and 527 of vehicle transmission system 521 provides sixteen forward-traveling speeds and four backward-traveling speeds.

On the assumption that gearshift mode setting dial 607a is set at normal position 608 and main gearshift lever 564 is set at automatic gearshift position 613, description will now be given of the automatic gearshift control of main transmission 526 corresponding to the depression degree of accelerator pedal 616 and the traveling speed of the vehicle during traveling will now be described. Referring to FIGS. 12 and 14, when forward traveling first speed F1 of main transmission 526 is established, shifter control system 617 is controlled to set shifter 568a at a position f1 so as to engage shifter 568a to first speed driven gear 581, first clutch C1 is engaged, and second clutch C2 is disengaged, so that power from engine 598 is transmitted from input shaft 531 to main transmission output shaft 576 through engaged first clutch C1, first clutch output shaft 555 and gears 571 and 581 of the first speed gear train, so as to be outputted to sub transmission 527.

When forward traveling second speed F2 of main transmission 526 is established, shifter control system 617 is controlled to set shifter 569a at a position f2 so as to engage shifter 569a to second speed driven gear 582, first clutch C1 is disengaged, and second clutch C2 is engaged, so that power from engine 598 is transmitted from input shaft 531 to main transmission output shaft 576 through engaged second clutch C2, second clutch output shaft 556 and gears 572 and 582 of the second speed gear train, so as to be outputted to sub transmission 527.

When forward-traveling third speed F3 of main transmission 526 is established, shifter control system 617 is controlled to set shifter 568a at a position f3 so as to engage shifter 568a to third speed driven gear 583, first clutch C1 is engaged, and second clutch C2 is disengaged, so that power from engine 598 is transmitted from input shaft 531 to main transmission output shaft 576 through engaged first clutch C1, first clutch output shaft 555 and gears 573 and 583 of the third speed gear train, so as to be outputted to sub transmission 527.

When forward-traveling fourth speed F4 of main transmission 526 is established, shifter control system 617 is controlled to set shifter 569a at a position f4 so as to engage shifter 569a to fourth speed driven gear 584, first clutch C1 is disengaged, and second clutch C2 is engaged, so that power from engine 598 is transmitted from input shaft 531 to main transmission output shaft 576 through engaged second clutch C2, second clutch output shaft 556 and gears 574 and 584 of the fourth speed gear train, so as to be outputted to sub transmission 527.

While the forward speed of main transmission 526 is shifted among first to fourth speeds F1 to F4 for forward traveling, shifter 570a is constantly set at its neutral position N, so as to disengage gears 575, 592 and 585 of the backward traveling gear train from main transmission output shaft 576.

During either shift-up or shift-down of the forward-traveling speed of main transmission 526, the clutch pressures of first and second clutches C1 and C2, i.e., the fluid pressures in fluid chambers 559 and 560, are controlled according to the cross wave control as shown in FIG. 7 and as mentioned above in the description of the first embodiment. That is, while one speed of main transmission 526 is shifted to another speed of main transmission 526, one of first and second clutches C1 and C2, which has been engaged, is gradually disengaged by reducing its clutch pressure, and the other of clutches C1 and C2, which has been disengaged, is gradually engaged by increasing its clutch pressure, so that the disengagement action of the one clutch C1 or C2 and the engagement action of the other clutch C1 or C2 overlap each other. That is, both clutches C1 and C2 are half-clutched on during the shift-up or shift-down of forward-traveling speed of main transmission 526.

During the overlapping engagement/disengagement process of clutches C1 and C2 for either the shift-up or shift-down of forward-traveling speed of main transmission 526, the odd-numbered or even-numbered speed gear train having been selected before the gearshift is kept selected to be activated until the next target even-numbered or odd-numbered speed gear train is selected to be activated. In other words, the engagement of shifter 568*a* for odd-numbered speeds with either first or third speed driven gear 581 or 583 overlaps the engagement of shifter 569*a* for even-numbered speeds with either second or fourth speed driven gear 582 or 584. In this way, while both of shifters 568*a* and 569*a* engage with any speed driven gears, the engagement of one of clutches C1 and C2 and the disengagement of the other of clutches C1 and C2 are performed to overlap each other, thereby smoothening the gearshift.

For example, for the shift-up from forward traveling first speed F1 to forward traveling second speed F2, shifter 569*a* is moved from its neutral position N to position f2 while the first speed gear train remains selected to be activated, i.e., while shifter 568*a* is held at position f1. Then, first clutch C1 having been engaged is disengaged, and meanwhile, second clutch C2 having been disengaged is engaged. Shifter 568*a* is shifted to its neutral position N after the disengagement of first clutch C1 and the engagement of second clutch C2 are completed. On the other hand, for example, for the shift-down from forward-traveling second speed F2 to forward-traveling first speed F1, shifter 568*a* is moved from its neutral position N to position f1 while the second speed gear train remains selected to be activated, i.e., while shifter 569*a* is held at position f2. Then, second clutch C2 having been engaged is disengaged, and meanwhile, first clutch C1 having been disengaged is engaged. Shifter 569*a* is shifted to its neutral position N after the engagement of first clutch C1 and the disengagement of second clutch C2 are completed.

Further, in the automatic gearshift mode, controller 567 determines timings for issuing commands to valves 602 to 606 for main transmission 526 based on a map of gearshift characteristic curves such as those shown in FIG. 8, detection of the actual throttle valve opening degree of engine 5 by throttle valve opening sensor 618 (or the depression degree of accelerator pedal 616 by accelerator sensor 623), and detection of the actual traveling speed of the tractor by vehicle traveling speed sensor 619.

On the assumption that gearshift mode setting dial 607*a* is set at normal mode position 608, main gearshift lever 564 is manually shifted to a target speed position for establishing the target speed unless main gearshift lever 564 is set at automatic gearshift position 613. This gearshift mode is referred to as a manual gearshift mode. When main gearshift lever 564 is set at any one of forward-traveling speed positions 612*a*, 612*b*, 612*c* and 612*d*, switch 611 transmits a detection signal corresponding to the set position of main gearshift lever 564 to controller 567, and controller 567 commands to disengage both of clutches C1 and C2, and then controls shifter control system 617 so as to move corresponding shifter 568*a* or 569*a*, thereby selecting the target speed gear train to be activated. Afterward, corresponding clutch C1 or C2 is engaged so as to actually activate the speed gear train selected to be activated.

In this way, any one of forward-traveling first to fourth speeds F1, F2, F3 and F4 of main transmission 526 is established by the manual operation. Power passages of main transmission 526 for respective forward-traveling speeds are the same as those mentioned above in the description of the automatic gearshift control.

When main gearshift lever 564 is set at neutral position 614, both of clutches C1 and C2 are disengaged so as to neutralize the portion of main transmission 526 downstream of clutches C1 and C2 and sub transmission 527. Further, when main gearshift lever 564 is rotated from neutral position 614 to backward-traveling position 615, controller 567 controls shifter control system 617 so as to set shifter 570*a* to a position r for engaging with backward traveling driven gear 585, and then, only second clutch C2 is engaged. Accordingly, the power from engine 598 is transmitted from input shaft 531 to main transmission output shaft 576 through engaged second clutch C2, second clutch output shaft 556 and gears 575, 592 and 585 of the backward-traveling gear train, so that the rotary power of main transmission output shaft 576 at a backward traveling speed R is outputted to sub transmission 527.

When gearshift mode setting dial 607*a* is set at either an automatic gearshift reverse mode position 609 or a manual gearshift reverse mode position 610, the forward/backward traveling direction can be switched only by switching manipulation of reverser lever 620*a* between forward traveling position 621 and backward traveling position 622 without manipulation of main gearshift lever 564. This operation mode is referred to as a reverse mode. An example of works requesting the reverse mode is a loading work by use of a front loader equipped on the tractor requiring frequent switching of the forward/backward traveling direction.

When gearshift mode setting dial 607*a* is set at automatic gearshift reverse mode position 609 and main gearshift lever 564 is set at any one of forward traveling speed positions 612*a*, 612*b*, 612*c* and 612*d*, the forward traveling speed corresponding to the set forward traveling speed position of main gearshift lever 564 is determined as a rated forward traveling speed Fs that is the maximum (highest) forward traveling speed for the work in the reverse mode.

On this assumption, when reverser lever 620*a* is set at forward traveling position 621, main transmission 526 is automatically gearshifted among rated forward traveling speed Fs and the forward traveling speeds lower than rated forward traveling speed Fs continuously, i.e., without intermission of engine power transmission, according to the cross wave control based on the programmed gearshift characteristic curves and the detection by sensors 618 (623) and 619, similar to the forward traveling gearshift in the automatic gearshift mode. During the forward traveling of the tractor, when reverser lever 620*a* is rotated from forward traveling position 621 to backward traveling position 622, the last forward traveling speed selected to be activated before the shift of reverser lever 620*a* is promptly changed to the backward traveling speed. The reverse mode established by setting dial 607*a* at position 609 is referred to as an automatic reverse mode, where main transmission 526 is automatically gearshifted among rated forward traveling speed Fs and the forward traveling speeds lower than rated forward traveling speed Fs during the forward traveling of the tractor, i.e., when reverser lever 620*a* is set at forward traveling position 621.

It is now assumed that an average of a deceleration ratio of gears 571 and 581 for forward traveling first speed F1 and a deceleration ratio of gears 574 and 584 for forward traveling fourth speed F4 is referred to as an average forward traveling deceleration ratio. Main transmission 526 is configured so that a deceleration ratio of gears 575, 592 and 585 for backward traveling speed R is larger than the average forward traveling deceleration ratio. In other words, backward traveling speed R is lower than a speed created by the average forward traveling deceleration ratio if the speed stage of sub transmission 527, the depression of accelerator pedal 616 and the rotary speed of engine 598 are constant.

The automatic gearshift reverse mode when main gearshift lever 564 is set at third speed forward-traveling position 612c is now supposed as an example. In this case, switch 607 issues a gearshift mode signal indicating that gearshift mode setting dial 607a is set at automatic gearshift reverse mode position 609, switch 611 issues a speed stage signal indicating that main gearshift lever 564 is set at third speed forward traveling position 612c, and switches 607 and 611 transmit the respective detection signals to controller 567. Accordingly, controller 567 determines forward traveling third speed F3 as rated forward traveling speed Fs.

When reverser lever 620a is set at forward traveling position 621 and switch 620 transmits a signal indicating position 621 of reverser lever 620a to controller 567, controller 567 outputs command signals to valves 565 and 566 for clutches C1 and C2 and to valves 602, 603, 604, 605 and 606 for shifters 568a, 569a and 570a. Therefore, during the forward traveling of the tractor, main transmission 526 is automatically gearshifted among the three forward traveling speeds, i.e., forward traveling first speed F1, forward traveling second speed F2 and forward traveling third speed F3. Then, when reverser lever 620a is rotated to backward traveling position 622, controller 567 outputs command signals to valves 565, 566, 602, 603, 604, 605 and 606 so that the tractor travels backward at backward traveling speed R created by gears 575, 592 and 585 having the deceleration ratio that is larger than the average forward traveling deceleration ratio. As far as the engine rotary speed and the speed stage of sub transmission 527 are constant, the traveling speed created by backward traveling speed R of main transmission 526 is lower than the traveling speed created by forward traveling third speed F3 of main transmission 526, because the average forward traveling deceleration ratio is larger than the deceleration ratio of gears 573 and 583 for forward traveling third speed F3. In this way, when reverser lever 620a is set at backward traveling position 622, the tractor traveling backward is sufficiently slowed by setting backward traveling speed R of main transmission 526, thereby being prevented from suddenly starting backward.

Description will be given of a control process of first and second clutches C1 and C2 during the switching of the forward/backward traveling direction when setting the automatic gearshift reverse mode. As shown in FIGS. 11 and 15, in main transmission 526, the backward traveling gear train and the even-numbered speed forward traveling gear trains are arranged on the downstream of second clutch C2. In this regard, gears 575, 592 and 585 serve as the backward-traveling gear train. The second speed forward-traveling gear train including gears 572 and 582 and the fourth speed forward-traveling gear train including gears 574 and 584 are the even-numbered speed gear trains. Thus, if the last forward traveling speed before turning reverser lever 620a to backward traveling position 622 is the even-numbered speed F2 or F4, the cross wave control for overlapping the engagement and disengagement of clutches C1 and C2 based on the assumption of the gearshift between an odd-numbered speed and an even-numbered speed is not adaptable when reverser lever 620a is turned from forward traveling position 621 to backward traveling position 622. Also, the cross wave control is not adaptable for changing the selection of a gear train to be activated from the backward traveling gear train (gears 575, 592 and 585) to either the second or fourth speed forward traveling gear train (gears 572 and 582 or gears 574 and 584) when reverser lever 620a is turned from backward traveling position 622 to forward traveling position 621.

For the gearshift of main transmission 526 between forward traveling even-numbered speed F2 or F4 and backward traveling speed R, instead of the cross wave control, the clutch control used for the manual gearshift mode is adapted. That is, both of clutches C1 and C2 are disengaged once, and then, one of shifters 569a and 570a that has engaged with the corresponding driven gear is returned to its neutral position, the other of shifters 569a and 570a that has been disposed at its neutral position is moved to engage with the target driven gear, and afterward, only second clutch C2 is engaged.

For example, it is assumed that the last forward traveling speed before the rotation of reverser lever 620a from forward traveling position 621 to backward traveling position 622 is forward traveling second speed F2. According to the rotation of reverser lever 620a to backward traveling position 622, second clutch C2 having been engaged is disengaged in addition to first clutch C1 having been disengaged. Then, shifter 569a having been set at position f2 to engage with second speed driven gear 582 is moved to its neutral position N to be separated from both driven gears 582 and 584, and shifter 570a having been set at its neutral position N is moved to position r to engage with backward-traveling driven gear 585. Afterward, second clutch C2 is engaged to activate gears 575, 592 and 585 of the backward traveling gear train, thereby generating an output rotation of main transmission 526 at backward traveling speed R.

On the other hand, for example, it is assumed that backward traveling speed R has to be promptly changed to forward traveling second speed F2 by rotating reverser lever 620a from backward traveling position 622 to forward traveling position 621. According to the rotation of reverser lever 620a to forward traveling position 621, second clutch C2 having been engaged is disengaged in addition to first clutch C1 having been disengaged. Then, shifter 570a having been set at position r to engage with backward traveling driven gear 585 is moved to its neutral position N to be separated from backward traveling driven gear 585, and shifter 569a having been set at its neutral position N is moved to position f2 to engage with second speed driven gear 582. Afterward, second clutch C2 is engaged to activate gears 572 and 582 of the second speed forward traveling gear train, thereby generating an output rotation of main transmission 526 at forward traveling second speed F2.

When the reverse mode is used for switching between odd-numbered forward traveling speed F1 or F3 and backward-traveling speed R, the cross wave control is adapted as the control of clutches C1 and C2 and shifters 568a and 570a for switching the forward/backward traveling direction, similar to the automatic gearshift mode.

For example, it is assumed that the last forward traveling speed before the rotation of reverser lever 620a from forward traveling position 621 to backward traveling position 622 is forward traveling first speed F1. When reverser lever 620a is rotated to backward traveling position 622, shifter 568a having engaged with first speed driven gear 581 at position f1 is held at position f1, i.e., conditions of valves 602 and 603 are kept, and valve 606 is switched so that shifter 570a having been disposed at its neutral position N is moved to position r so as to engage with backward traveling driven gear 585. Then, valves 565 and 566 are controlled so that the clutch pressure of first clutch C1 (i.e., the pressure of fluid in fluid chamber 559) is reduced to disengage first clutch C1 having been engaged, and the clutch pressure of second clutch C2 (i.e., the pressure of fluid in fluid chamber 560) is increased to engage second clutch C2 having been disengaged. When the disengagement action of clutch C1 and the engagement action of clutch C2 are competed, gears 575, 592 and 585 of the backward traveling gear train are properly activated so as to generate the output rotation of main transmission 526 at backward traveling speed R. Afterward, valves 602 and 603 are switched so as to move shifter 568a to its neutral position N. Alternatively, shifter 568a may be held at position f1 during the output rotation of main transmission 526 at backward traveling speed R so as to generate the output rotation of main transmission 526 at forward traveling first speed F1 immediately after the next turn of reverser lever 620a to forward traveling position 621.

On the other hand, for example, it is assumed that forward traveling first speed F1 is needed by turning reverser lever 620a from backward traveling position 622 to forward traveling position 621. When reverser lever 620a is rotated to forward traveling position 621, shifter 570a having engaged with backward traveling driven gear 585 at position r is held at position r, i.e., the condition of valve 606 is kept, and valves 602 and 603 are switched so that shifter 568a having been disposed at its neutral position N is moved to position f1 so as to engage with first speed driven gear 581. Then, valves 565 and 566 are controlled so that the clutch pressure of second clutch C2 (i.e., the pressure of fluid in fluid chamber 560) is reduced to disengage second clutch C2 having been engaged, and the clutch pressure of first clutch C1 (i.e., the pressure of fluid in fluid chamber 559) is increased to engage first clutch C1 having been disengaged. When the engagement action of clutch C1 and the disengagement action of clutch C2 are competed, gears 571 and 581 of the first speed forward traveling gear train is properly activated so as to generate the output rotation of main transmission 526 at forward traveling first speed F1. Afterward, valve 606 is switched so as to move shifter 570a to its neutral position N. Alternatively, shifter 570a may be held at position r during the output rotation of main transmission 526 at forward traveling first speed F1 so as to generate the output rotation of main transmission 526 at backward traveling speed R immediately after the next turn of reverser lever 620a to backward traveling position 622.

As mentioned above, when the reverse mode is adapted for switching between forward traveling odd-numbered speed F1 or F3 and backward traveling speed R, the cross wave control is used so as to ensure smooth switching of forward/backward traveling direction with little shock, that does not carry out the disengagement of both of clutches C1 and C2, i.e., intermission of power transmission, when the switching of forward traveling even-numbered speed F2 or F4 and backward traveling speed R.

Alternatively, when the automatic gearshift reverse mode is set, both of a certain odd-numbered forward traveling gear train and the backward traveling gear train may be constantly selected to be activated regardless of engagement/disengagement of clutches C1 and C2. In other words, the setting of shifter 568a at position f1 or f3 and the setting of shifter 570a at position r may be kept constant. For example, when gearshift mode setting dial 607a is set at automatic gearshift reverse mode position 609 and main gearshift lever 564 is set at forward traveling first speed position 612a, forward traveling first speed F1 is determined as rated forward traveling speed Fs. This means that only forward traveling first speed F1 can be set as the forward traveling speed of main transmission 526. In this case, while shifter 568a is held at position f1 and shifter 570a is held at position r, only the engagement/disengagement control of clutches C1 and C2 is performed (without movement of either shifter 568a or 570a), thereby enabling further prompt switching of forward/backward traveling direction. In this way, main transmission clutch unit 553 also serves as a reverser clutch for switching the forward/backward traveling direction.

Incidentally, when the automatic gearshift reverse mode is established, the output power of engine 598 to be transmitted to input shaft 531 is controlled so as to prevent the tractor from suddenly starting backward. This engine control is referred to as "engine-cooperation" with the reversing, i.e., forward/backward traveling direction switching. For the engine-cooperation, as mentioned above referring to FIG. 13, controller 567 controls actuator 625 for engine throttle valve 626 based on detection signals from throttle valve opening sensor 618, vehicle traveling speed sensor 619, accelerator sensor 623 and engine rotary speed sensor 624, thereby controlling the output rotary speed of engine 598.

The purpose of the engine-cooperation will be described. In the automatic gearshift reverse mode, the maximum forward traveling speed of the tractor is defined as a forward traveling speed V(Fs) of the tractor based on rated forward traveling speed Fs of main transmission 526 during the maximum depression of accelerator pedal 616, and the maximum backward traveling speed of the tractor is defined as a backward traveling speed V(R) of the tractor based on rated backward traveling speed R of main transmission 526 during the maximum depression of accelerator pedal 616. Here, it is assumed the rotary speed of engine 598 uniformly reaches the maximum when the depression of accelerator pedal 616 reaches the maximum. If maximum vehicle backward traveling speed V(R) is higher than maximum vehicle forward traveling speed V(Fs), it means that the backward acceleration per unit variation of depression of accelerator pedal 616 is larger than the forward acceleration per unit variation of depression of accelerator pedal 616. In this situation, when reverser lever 620a is set to backward traveling position 622, an operator feels the backward acceleration too rapid in comparison with the forward acceleration. Thus, during the backward traveling, the engine-cooperation is performed so that the engine rotary speed during the maximum depression of accelerator pedal 616 is set to a value lower than the maximum, and that the engine rotary speed variation, i.e., throttle valve opening variation, per unit variation of depression of accelerator pedal 616 during the backward traveling is less than that during the forward traveling. Whereby, the backward acceleration is equal to or less than the forward traveling, so as to reduce an operator's shock or puzzlement.

Figure 16:
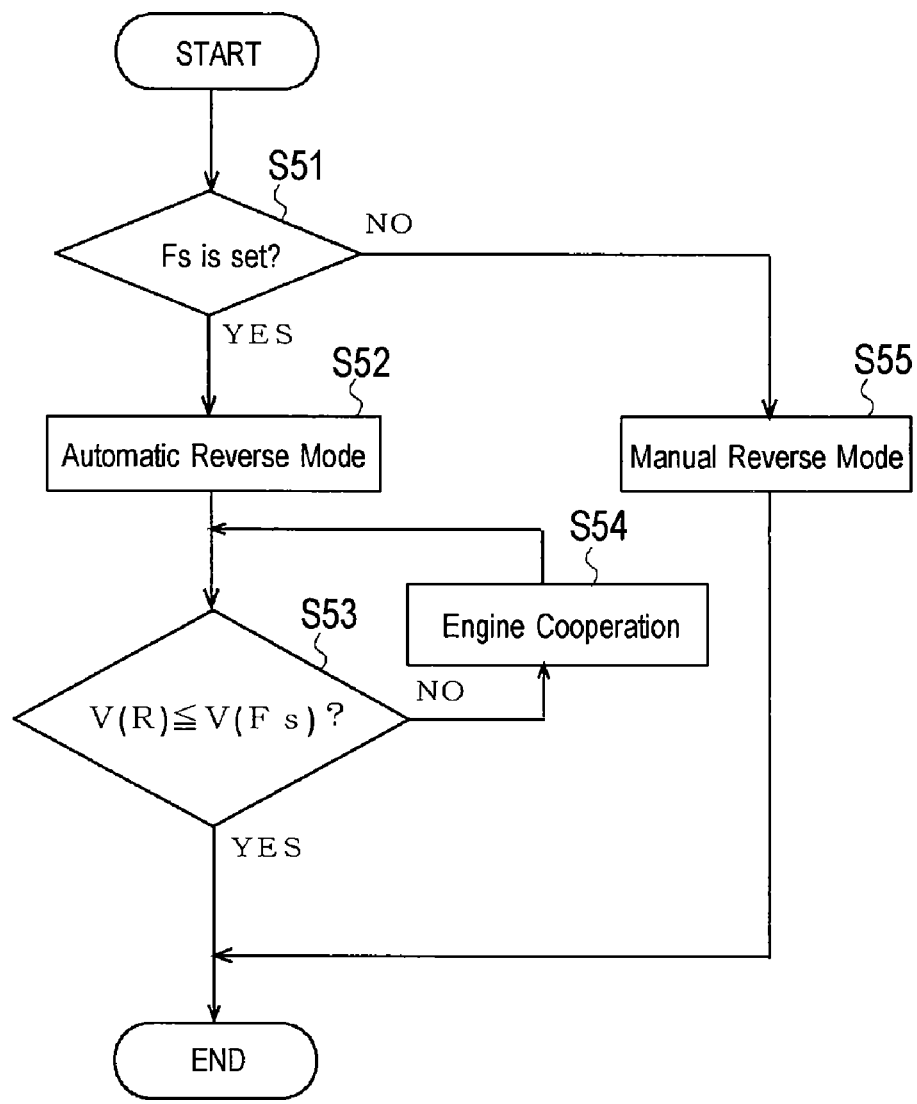
FIG. 16 is a flow chart showing an engine cooperation control process according to the third embodiment.

A traveling speed control flow in the reverse mode employing the engine-cooperation will be described with reference to FIG. 16. On the basis of the gearshift mode signal from switch 607 and the main gearshift lever position signal from switch 611, controller 567 judges whether or not rated forward traveling speed Fs is determined (a step S51). Unless rated forward traveling speed Fs is determined, the tractor is operated in the manual gearshift reverse mode as discussed later (a step S55). When rated forward traveling speed Fs is determined, the tractor is operated in the automatic gearshift reverse mode (a step S52). In the automatic gearshift reverse mode, main transmission 526 is automatically gearshifted among rated forward traveling speed Fs and forward traveling speeds lower than rated forward traveling speed Fs when reverser lever 620a is set at forward traveling position 621, and backward traveling speed R of main transmission 526 is established when reverser lever 620a is set at backward traveling position 622.

In the automatic gearshift reverse mode, maximum traveling speeds V(Fs) and V(R) are determined, and are compared with each other (a step S53). To determine maximum traveling speeds V(Fs) and V(R), detection values of sensor 619 when accelerator sensor 623 detects the maximum depression of accelerator pedal 616 may be memorized. Even if accelerator pedal 616 does not actually reach the maximum depression, maximum traveling speeds V(Fs) and V(R) can be calculated based on the detection signal from sub gearshift switch 634, the detection signal from engine rotary speed sensor 624 or so on. Alternatively, preset maximum traveling speeds corresponding to the maximum depression of accelerator pedal 616 can be previously allotted to the respective lever position detection signals from sub gearshift switch 634 and main gearshift switch 611.

When maximum backward traveling speed V(R) is higher than maximum forward traveling speed V(Fs), the engine-cooperation is performed, i.e., the engine rotary speed is controlled so as to reduce maximum backward traveling speed V(R) to a value lower than or equal to traveling speed V(Fs) (a step S54). For example, during the backward traveling, i.e., when reverser lever 620*a* is set at backward-traveling position 622, a ratio of variation of throttle valve opening degree (detected by throttle valve opening sensor 618) to variation of depression of accelerator pedal 616 (detected by accelerator sensor 623) is reduced. Unless maximum backward traveling speed V(R) is higher than maximum forward traveling speed V(Fs), the engine-cooperation is not performed.

For example, it is assumed that the average forward traveling deceleration ratio is less than the deceleration ratio for forward traveling third speed F3, and is more than the deceleration ratio for forward traveling fourth speed F4. When forward traveling second speed F2 is determined as rated forward traveling speed Fs, maximum vehicle backward traveling speed V(R) becomes more than maximum vehicle forward traveling speed V(Fs). Maximum vehicle forward traveling speed V(Fs) when forward traveling second speed F2 is rated forward traveling speed is referred to as maximum forward traveling speed V(F2). The same rule will apply hereinafter. Thus, when reverser lever 620*a* is rotated from forward traveling position 621 to backward traveling position 622, the engine-cooperation is performed to so as to reduce the backward acceleration to a level equal to or less than the forward acceleration. On the assumption of the same average forward traveling deceleration ratio, if forward traveling fourth speed F4 is defined as rated forward-traveling speed Fs, maximum vehicle backward traveling speed V(R) is less than maximum vehicle forward traveling speed V(Fs), i.e., V(F4), so that the backward acceleration is less than the forward acceleration, whereby the engine-cooperation is unnecessary.

Referring to a table of FIG. 15, the raw about the engine-cooperation indicates whether or not the engine-cooperation is applied depending on which of forward traveling speeds F1, F2, F3 and F4 of main transmission 526 is defined as rated forward traveling speed Fs. The engine-cooperation is applied unless rated forward traveling speed Fs is fourth speed F4.

Further, in the automatic gearshift reverse mode, as mentioned above and referring to FIG. 15, the cross wave control cannot be performed when the last forward traveling speed of main transmission 526 is even-numbered speed F2 or F4 before shift of reverser lever 620*a* to backward-traveling position 622. At this reversing, i.e., switching of forward/backward traveling direction, the intermission of power transmission by disengaging both of clutches C1 and C2 must occur so as to cause a shock in backward starting. Therefore, preferably, if the present forward traveling speed of main transmission 526 is even-numbered speed F2 or F4 when reverser switch 620 detects the switching of reverser lever 620*a* from forward traveling position 621 to backward traveling position 622, the forward traveling speed of main transmission 526 is shifted down to the next lower odd-numbered forward traveling speed F1 or F3, and then the gearshift to backward traveling speed R is actually performed. In this way, the gearshift to backward traveling is performed by the cross wave control so as to reduce a shock in backward starting.

Additionally, the last odd-numbered forward traveling speed F1 or F3 (it may be obtained by shift-down from even-numbered speed F2 or F4 as mentioned above) before the shift of reverser lever 620*a* from forward traveling position 621 to backward traveling position 622 is memorized, and afterward, when reverser switch 620 detects the shift of reverser lever 620*a* from backward-traveling position 622 to forward-traveling position 621, main transmission 526 is gearshifted from backward-traveling speed R to memorized odd-numbered forward traveling speed F1 or F3 according to the cross wave control, thereby reducing a shock in forward starting.

Further, during the forward traveling in the automatic gearshift reverse mode, rated forward traveling speed Fs is shifted down when it is detected that the engine is overloaded. For example, during the forward traveling by setting fourth speed F4 as rated forward traveling speed Fs, rated forward traveling Fs is shifted down to the next lower forward traveling speed of main transmission 526, i.e., third speed F3, if a detected engine load Lo exceeds a standard load Ls. In this way, when the depression of accelerator pedal 616 is the maximum, the forward traveling speed of main transmission 526 becomes third speed F3 so as to create a high torque that cannot be created by fourth speed F4. If engine load Lo still exceeds standard load Ls after the shifting-down of rated forward traveling speed Fs to the next lower speed, rated forward traveling speed Fs is shifted down the further next lower speed.

In this regard, engine load Lo is represented as a ratio of engine rotary speed (detected by engine rotary speed sensor 624) or vehicle traveling speed (detected by vehicle traveling speed sensor 619) to depression of accelerator pedal 616 (detected by accelerator sensor 623) or throttle valve opening degree (detected by throttle valve opening 618). However, calculation of the engine load is not limited to this. It is enough if the calculated value surely indicates a degree of load applied from a ground surface onto engine 598 during traveling of the tractor.

Figure 17:
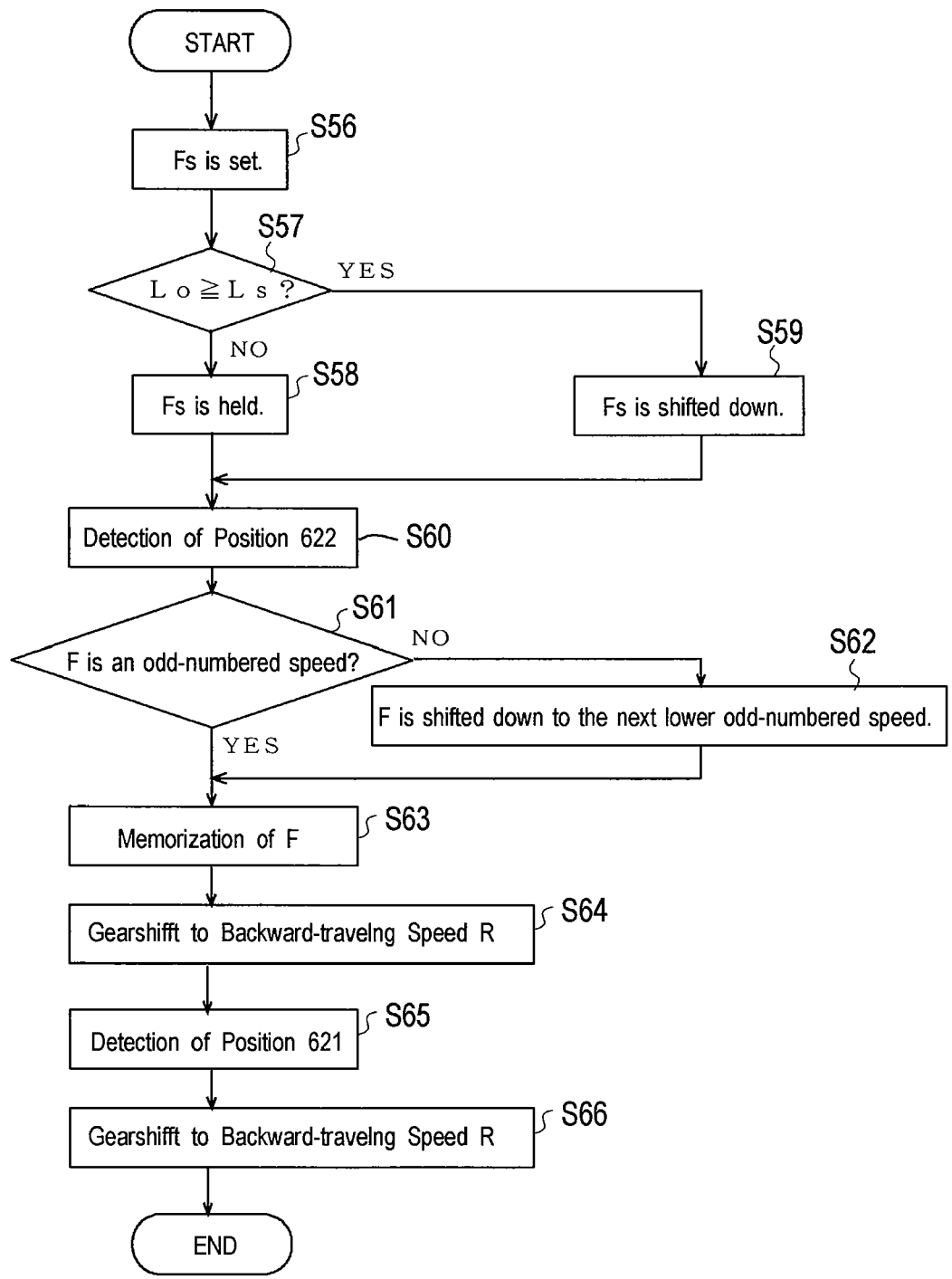
FIG. 17 is a flow chart showing an automatic overload-shift down control according to the third embodiment.

FIG. 17 shows a control flow of main transmission 526 in the automatic gearshift reverse mode so as to perform the above-mentioned shift-down of rated forward traveling speed Fs in correspondence to overload on engine 598 and to surely perform the cross wave control during the switching of forward/backward traveling direction. Firstly, dial 607*a* is set at position 609, and main transmission lever 564 is set at one of positions 612*a*, 612*b*, 612*c* and 612*d*, thereby determining rated forward traveling speed Fs (a step S56). Then, engine load Lo is calculated based on detection signals from accelerator sensor 623, throttle valve opening sensor 618, vehicle traveling speed sensor 619 and so on, and calculated engine load Lo is compared with standard load Ls stored in a memory 567*a* (see FIG. 13) in controller 567 (a step S57).

When engine load Lo is less than standard load Ls, rated forward traveling speed Fs is kept as it is (a step S58). When engine load Lo is not less than standard load Ls, i.e., when it is detected that engine 598 is overloaded), rated forward traveling speed Fs is shifted down to the next lower speed of main transmission 526 (a step S59). If the overload on engine 598 is still detected, rated forward traveling speed Fs is shifted down to the further next lower speed of main transmission 526. When detected engine load Lo becomes less than standard load Ls, rated forward traveling speed Fs is settled, and main transmission 526 is automatically gearshifted during forward traveling so as to have settled rated forward traveling speed Fs as the maximum forward traveling speed.

When reverser switch 620 detects the shift of reverser lever 620a to backward traveling position 622 (a step S60), it is judged whether or not a current forward traveling speed F at this time is odd-numbered speed F1 or F3 (a step S61). When current forward traveling speed F is odd-numbered speed F1 or F3, current forward traveling speed F is memorized (a step S63). When current forward traveling speed F is even-numbered speed F2 or F4, main transmission 526 is shifted down to the next lower odd-numbered speed F1 or F3 (a step S62), and odd-numbered forward traveling speed F1 or F3 as a result of the shift-down from even-numbered forward traveling speed F2 or F4 is memorized (step S63). Then, current forward traveling speed F is actually shifted to backward traveling speed R by the cross wave control (a step S64).

Afterward, when reverser switch 620 detects the shift of reverser lever 620a to forward-traveling position 621 (a step S65), main transmission 526 is gearshifted by the cross wave control from backward-traveling speed R to memorized odd-numbered forward traveling speed F1 or F3.

The gearshift of main transmission 526 in the manual gearshift reverse mode will be described. On the assumption that dial 607a is set at position 610, during the forward traveling by setting reverser lever 620a at forward traveling position 621, main gearshift lever 564 is manually shifted among positions 612a, 612b, 612c and 612d so as to gearshift main transmission 526 among first to fourth speeds F1, F2, F3 and F4. When reverser lever 620a is rotated to backward-traveling position 622, main transmission 526 is gearshifted to backward-traveling speed R from one of forward-traveling speed F1, F2, F3 and F4 corresponding to the present position 612a, 612b, 612c or 612d of main gearshift lever 564. Afterward, when reverser lever 620a is returned to forward-traveling position 621, main transmission 526 is gearshifted from backward-traveling speed R to one of forward-traveling speed F1, F2, F3 and F4 corresponding to current position 612a, 612b, 612c or 612d of main gearshift lever 564.

During any gearshift of main transmission 526 in the manual gearshift reverse mode, that is, during either the forward traveling gearshift by manual shift of main gearshift lever 564 among positions 612a, 612b, 612c and 612d or the switching of forward/backward traveling direction by manual shift of reverser lever 620a, both of clutches C1 and C2 are surely disengaged before shifters 568a, 569a and 570a are controlled to select a target speed gear train of main transmission 526 to be activated. After this movement of shifter 568a, 569a or 570a, only clutch C1 or C2 corresponding to the target speed gear train is engaged. In this regard, in the manual gearshift reverse mode, a target position of main gearshift lever 564 is undetermined when main gearshift lever 564 is removed from any position. This is the reason why both of clutches C1 and C2 are disengaged immediately after main gearshift lever 564 is removed from any position. Thus, in the manual gearshift reverse mode, the cross wave control is not applied even if it results in that the gearshift is performed between odd-numbered forward traveling speed F1 or F3 and even-numbered forward traveling speed F2 or F4 or between odd-numbered forward traveling speed F1 or F3 and backward traveling position R.

In this way, in the manual gearshift reverse mode, any forward traveling speed of main transmission 526 can be optionally selected, so that the tractor can travel by the desired forward-traveling speed of main transmission 526 as soon as reverser lever 620a turns to forward traveling position 621. On the contrary, in the automatic gearshift reverse mode, it may occur that, when reverser lever 620a is set to forward traveling position 621, an undesired forward traveling speed of main transmission 526 is set and must be shifted up or down to the desired forward traveling speed of main transmission 526, thereby delaying the setting of the desired forward traveling speed. In comparison with the automatic gearshift reverse mode, the manual gearshift reverse mode is disadvantageous in that the intermission of power transmission caused by disengaging both of clutches C1 and C2 may generate a shock or other problems and in that main gearshift lever 564 must be laboriously manipulated in addition to reverser lever 620a. However, in comparison with the automatic gearshift reverse mode, the manual gearshift reverse mode is advantageous in that the forward starting and the realization of desired forward traveling speed are prompt. Thus, the manual gearshift reverse mode is convenient for the tractor at work to repeat the switching of forward/backward traveling direction in a short distance.

Further, preferably, even if dial 607a is set at either position 609 or 610, the reverse mode (either the automatic gearshift reverse mode or the manual gearshift reverse mode) is applied only when the speed stage of sub transmission 527 is a certain speed stage. For example, if the low speed stage and the creep stage are determined as the certain speed stage, during setting of either the middle or high speed stage of sub transmission 527, main transmission 526 is necessarily gearshifted in the normal mode (essentially corresponding to position 608 of dial 607a) even if dial 607a is actually set at position 609 or 610. Therefore, the sudden forward or backward starting or rapid acceleration on turning of reverser lever 620a to position 621 or 622, and the excessively fast forward or backward traveling, that could occur by setting of the middle or high speed stage of sub transmission 527, are prevented.

Referring to FIGS. 18 to 31, some clutch amendment control patterns based on some parameters (especially, a tilt angle of vehicle 1 and a weight of vehicle 1 (i.e., weight of load on vehicle 1)) for the multi-speed transmission will be described.

Figure 3:
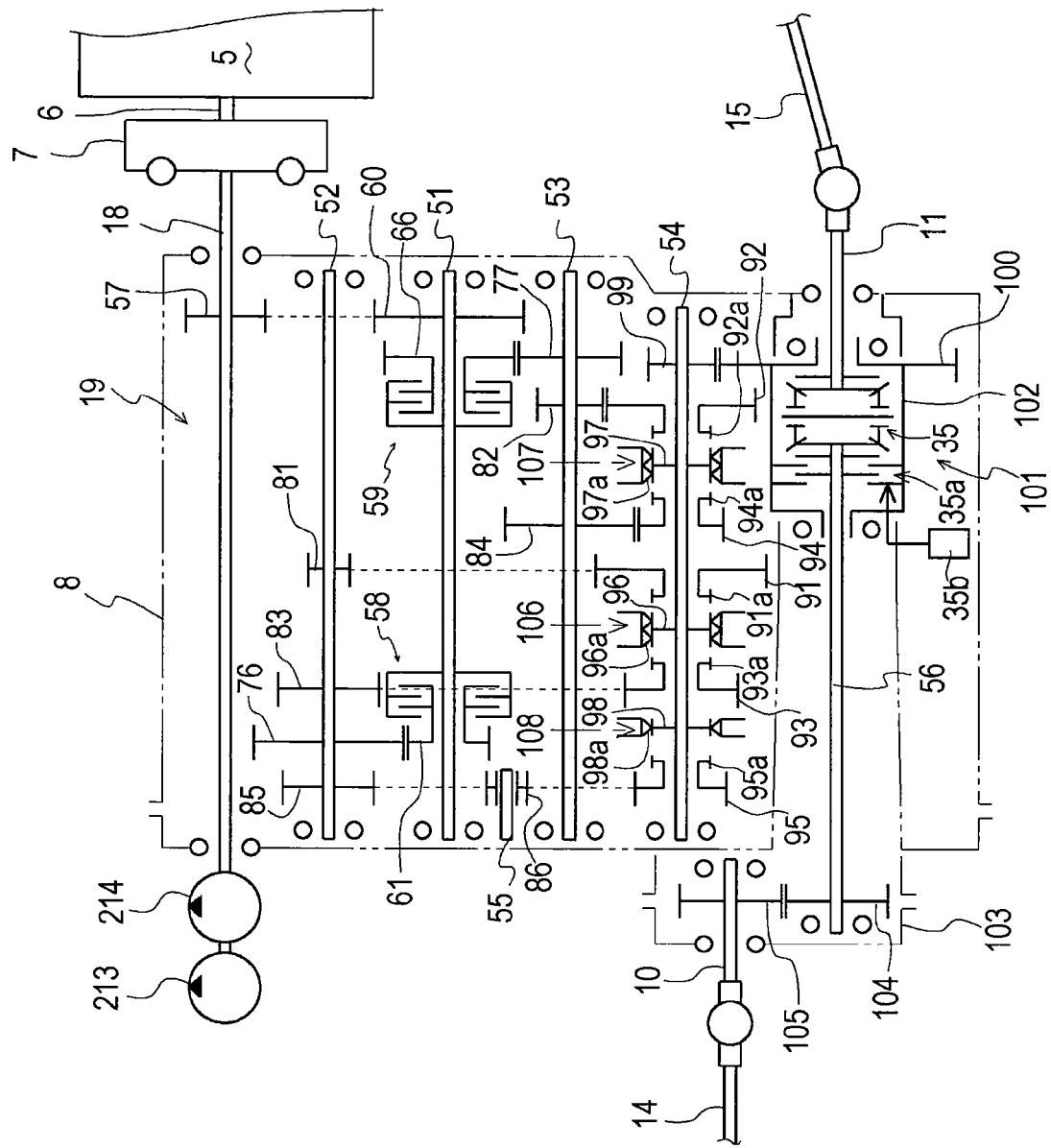
FIG. 3 is a skeleton diagram of a multi-speed transmission according to the first embodiment.

Detailed description of a basic structure of multi-speed transmission 19 adapted to the following control patterns will be omitted because it is the same as that best shown in FIG. 3. Basically, multi-speed transmission 19 includes the first clutch for the odd-numbered (i.e., first and third) speed gear trains and the second clutch for the even-numbered (i.e., second and fourth) speed gear trains. Description of a hydraulic circuit structure adapted to the following control patterns will also be omitted because it is the same as that shown in FIG. 6. The following control patterns can be provided for multi-speed transmission 42 shown in FIG. 10 or multi-speed transmission (main transmission) 526 shown in FIGS. 11 and 12 as far as it is adaptable. For example, in the hereinafter description, first clutch 58 for odd-numbered speeds may be replaced with first clutch 172a or C1, and second clutch 59 for even-numbered speeds may be replaced with second clutch 172b or C2.

Figure 18:
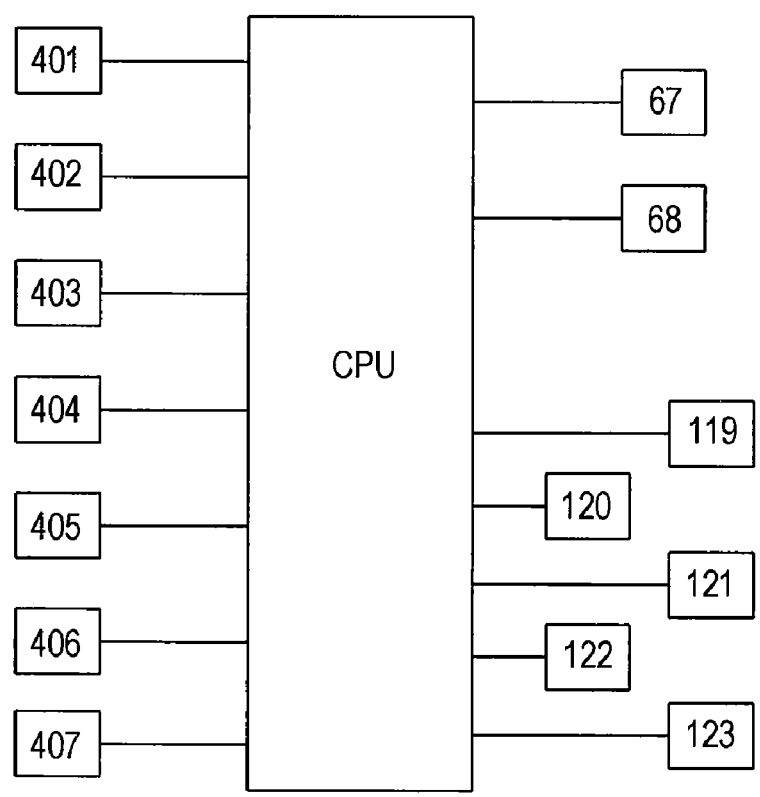
FIG. 18 is a block diagram of a control system for controlling clutches of the multi-speed transmission.

A control system for controlling the clutches will be described with reference to FIG. 18. With respect to parameters for controlling the clutches, inputted engine rotary speed detection means 401, such as an accelerator pedal angle sensor or a throttle valve opening sensor, issues a detection signal of inputted (set) engine rotary speed (or throttle valve opening degree). Outputted engine rotary speed detection means 402 issues a detection signal of engine output rotary speed (actual engine rotary speed). Accelerator pedal depression speed detection means 403 issues a detection signal of depression speed of the accelerator pedal. Engine load (axle torque) detection means 404 issues a detection signal of engine load (axle torque). Vehicle tilt angle detection means 405 issues a detection signal of tilt angle of vehicle 1. Vehicle weight detection means 406 issues a detection signal of weight of vehicle 1 (i.e., weight of load on vehicle 1). Brake pedal depression detection means 407 issues a detection signal about whether a brake pedal is depressed or not. These detection signals are inputted into a CPU. The CPU determines a timing for shifting the clutches among other things based on the detection signals, and issues command signals to electromagnetic valves 119, 120, 121, 122 and 123 for controlling shifters 96a, 97a and 98a, and to electromagnetic valves 67 and 68 for the respective first and second clutches. For example, hereinafter first clutch 58 and second clutch 59 serve as the first clutch for odd-numbered speeds and the second clutch for even-numbered speed, respectively. Alternatively, first clutch 172a or C1 may serve as the first clutch, and second clutch 172b or C2 may serve as the second clutch.

Vehicle 1 is provided with detection means 401 to 407, including a vehicle tilt sensor for detecting a tilt angle of vehicle 1 in the traveling direction thereof, serving as vehicle tilt angle detection means 405, and a vehicle weight sensor for detecting a weight of load on vehicle 1, serving as vehicle weight detection means 406. At least one of the vehicle tilt angle sensor and the vehicle weight sensor may be assembled into multi-speed transmission 19 (or 42).

Control of a gearshift clutch (first clutch 58 or second clutch 59) serving as a start-up clutch to be engaged for starring of vehicle 1 will be described with reference to FIGS. 19 to 24. To start vehicle 1, a series of operations for starting vehicle 1: previous depression of the brake pedal; engine-starting operation such as switching on of an ignition key; and releasing of the depressed brake pedal, are performed. The following clutch control is directed to control of the start-up clutch (and depression of the accelerator pedal) to be engaged in association with the releasing of the brake pedal.

A start-up clutch control shown in FIGS. 19 and 20 based on detection of vehicle tilt angle will be described. A clutch pressure increasing pattern is changed on the basis of detection of a vehicle tilt angle by the vehicle tilt angle sensor. Therefore, regardless of whether the ground is sloped or not (whether vehicle 1 ascends or descends a slope), vehicle 1 surely creeps on its traveling start, and the vehicle traveling speed change in reply to accelerator operation is kept substantially constant.

Figure 19:
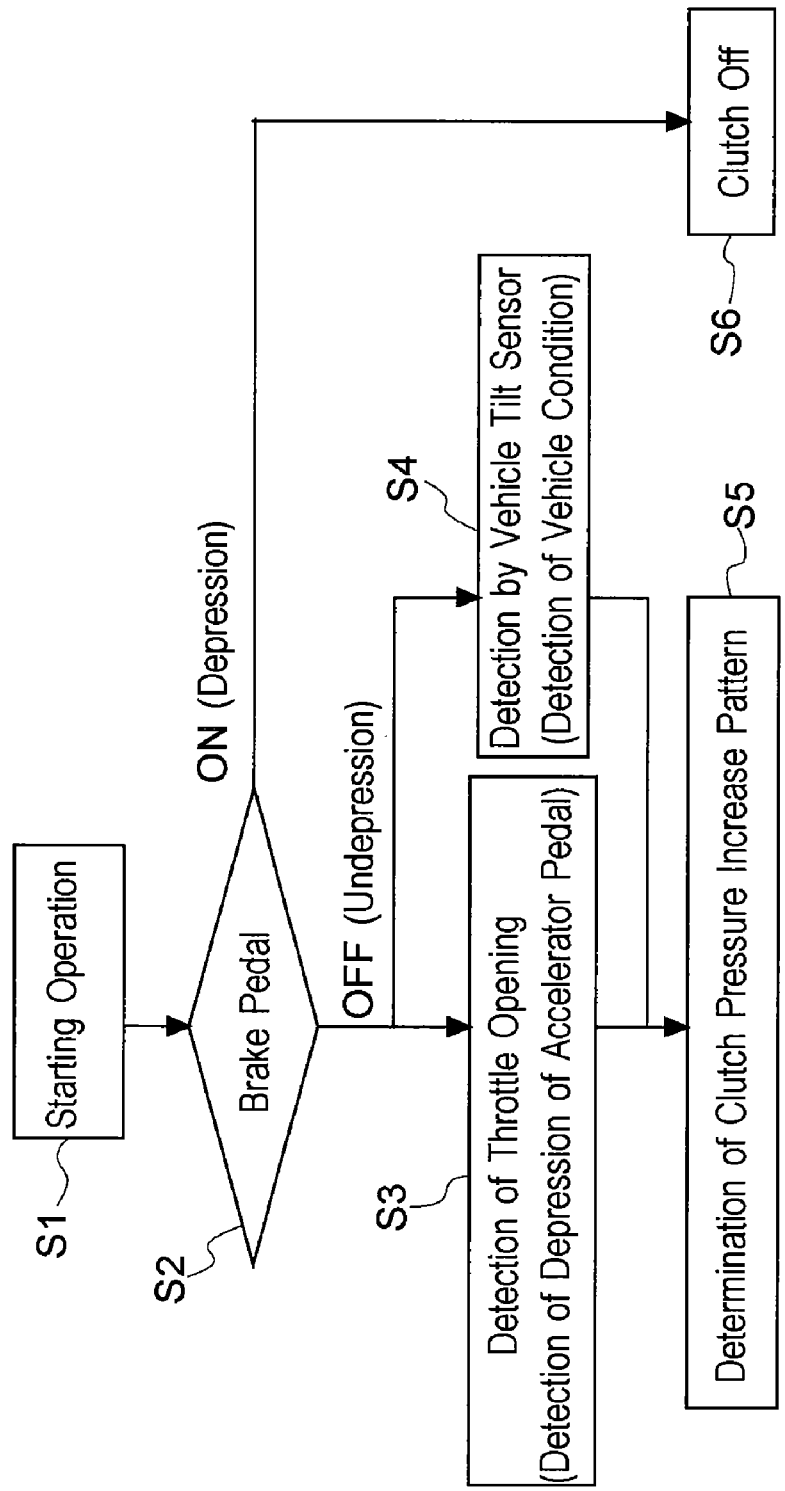
FIG. 19 is a flow chart for determining an increasing pattern of clutch pressure for start of the vehicle depending on detection by a tilt sensor.

As shown in FIG. 19, when an operation for starting vehicle 1, such as switching on of an ignition key switch, is performed (at a step S1), brake pedal depression detection means 407 detects whether the brake pedal is depressed or not (at a step S2). While depression of the brake pedal is detected, disengagement of the start-up clutch is kept (at a step S6) so as to prevent start of vehicle 1. If release of the depressed brake pedal is detected, detection signals from the throttle valve opening sensor and the vehicle tilt angle sensor are determined (at steps S3 and S4) so as to determine a clutch pressure condition of the start-up clutch (at a step S5).

Figure 20:
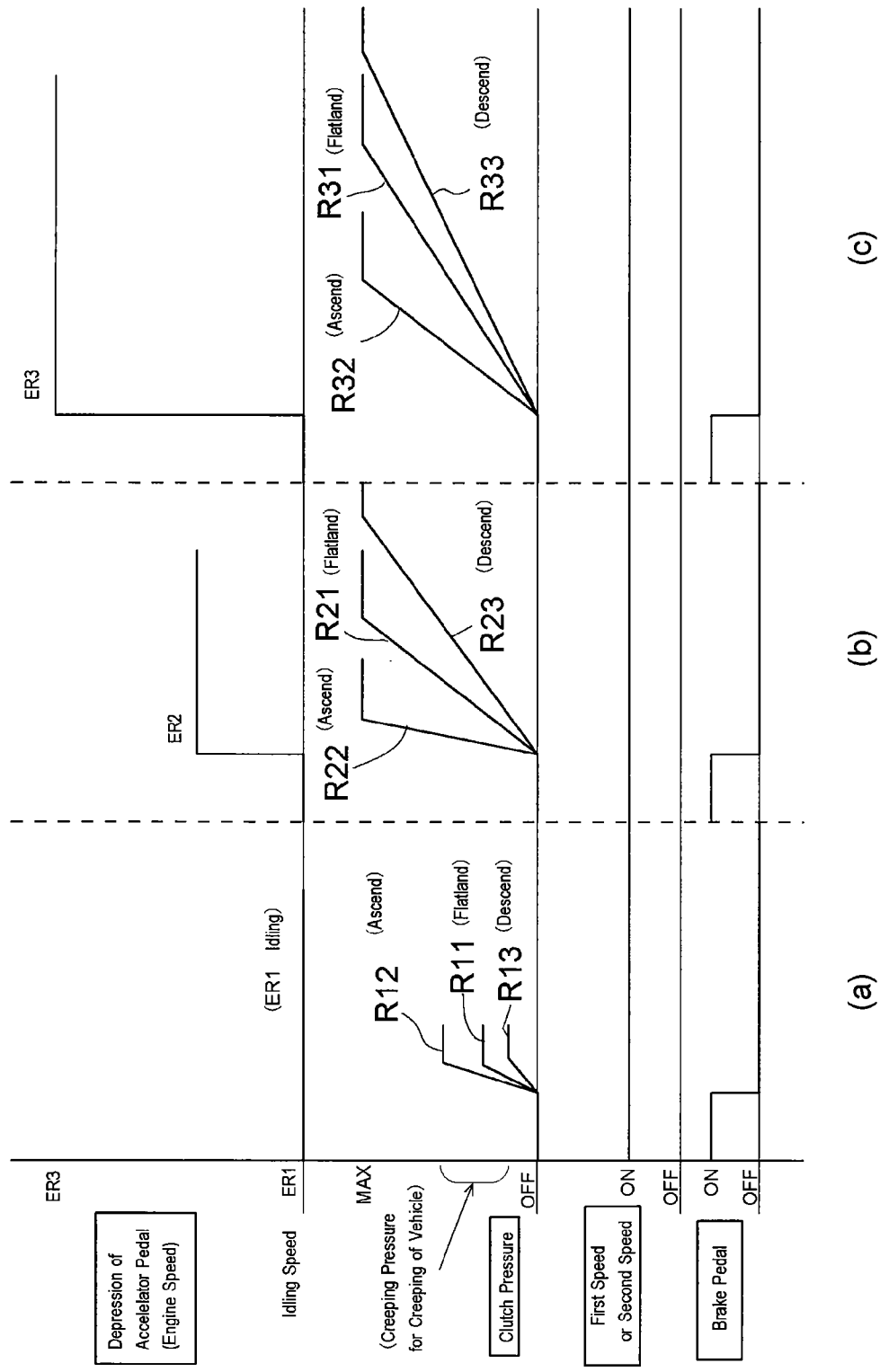
FIG. 20 is a timing chart for the starting of the vehicle depending on the detection by the tilt sensor.

FIG. 20 illustrates a simultaneous time chart of depression variation of the accelerator pedal, clutch pressure variation of the start-up clutch, selection of speed level, and depression variation of the brake pedal according to the control flow of FIG. 19. Three patterns shown respectively in FIGS. 20(a), 20(b) and 20(c) are classified by difference of depression of the accelerator pedal after the detection of the releasing of the depressed brake pedal.

FIG. 20(a) illustrates patterns of increase of clutch pressure of the start-up clutch without depression of the accelerator pedal after the depressed brake pedal in stationary vehicle 1 is released. An idling engine rotary speed ER1 is kept, and either the first or second forward traveling speed is preset, i.e., either the first or second normal driven gear 91 or 92 is previously drivingly connected to traveling output shaft 54 through corresponding shifter 96a or 97a. If the first forward traveling speed is preset, first clutch 58 serves as the start-up clutch to be engaged for starting of vehicle 1. If the second forward traveling speed is preset, second clutch 59 serves as the start-up clutch to be engaged for starting of vehicle 1. While the brake pedal is depressed, the clutch pressure of the start-up clutch is zero, i.e., the start-up clutch is disengaged.

A clutch pressure increase pattern R11 of the start-up clutch is established when vehicle 1 starts traveling on a flatland. The clutch pressure of the start-up clutch starts rising immediately after the release of the depressed brake pedal. Then, the clutch pressure reaches a predetermined creeping pressure for ensuring the creepage of vehicle 1, and afterward, the creeping pressure is kept so that vehicle 1 creeps on a flatland.

A clutch pressure increase pattern R12 of the start-up clutch is established when the vehicle tilt angle sensor detects that vehicle 1 is on an ascending slope. An inclination of pattern R12 is steeper than that of pattern R11, i.e., the increase of clutch pressure according to pattern R12 while vehicle 1 ascends a slope is quicker than that according to pattern R11 while vehicle 1 travels on a flatland. In pattern R12, the increased clutch pressure reaches a creeping pressure predetermined to be larger than the creeping pressure in pattern R11 for traveling on a flatland, and afterward, the larger creeping pressure is kept while vehicle 1 ascends a slope.

A clutch pressure increase pattern R13 of the start-up clutch is established when the vehicle tilt angle sensor detects that vehicle 1 is on a descending slope. An inclination of pattern R13 is gentler than that of pattern R11, i.e., the increase of clutch pressure according to pattern R13 while vehicle 1 descends a slope is slower than that according to pattern R11 while vehicle 1 travels on a flatland. In pattern R13, the increased clutch pressure reaches a creeping pressure predetermined to be smaller than the creeping pressure in pattern R11 for traveling on a flatland, and afterward, the smaller creeping pressure is kept while vehicle 1 descends a slope.

FIG. 20(b) illustrates patterns of increase of clutch pressure of the start-up clutch when the accelerator pedal is depressed so as to establish an engine rotary speed ER2 (e.g., 2300 rpm) immediately after the depressed brake pedal in stationary vehicle 1 is released. Each of patterns R21, R22 and R23 indicates that the increased clutch pressure reaches a fixed maximum (proper) clutch pressure of the start-up clutch beyond the larger creeping pressure. An inclination of clutch pressure increase pattern R22 for ascending a slope is steeper than that of clutch pressure increase pattern R21 for traveling on a flatland, and an inclination of clutch pressure increase pattern R23 for descending a slope is gentler than that of clutch pressure increase pattern R21 for traveling on a flatland. Consequently, the increase of clutch pressure according to pattern R22 while vehicle 1 ascends a slope is quicker than that according to pattern R21 while vehicle 1 travels on a flatland, and the increase of clutch pressure according to pattern R23 while vehicle 1 descends a slope is slower than that according to pattern R21 while vehicle 1 travels on a flatland.

FIG. 20(c) illustrates patterns of increase of clutch pressure of the start-up clutch when the accelerator pedal is depressed so as to establish an engine rotary speed ER3 (e.g., 3600 rpm) larger than engine rotary speed ER2 immediately after the depressed brake pedal in stationary vehicle 1 is released. Each of patterns R31, R32 and R33 indicates that the increased clutch pressure reaches the maximum clutch pressure of the start-up clutch. An inclination of each of clutch pressure increase patterns R31, R32 and R33 for getting engine rotary speed ER3 is gentler than that of each of clutch pressure increase patterns R21, R22 and R23 for getting lower engine rotary speed ER2. Consequently, the higher the set engine rotary speed on starting of vehicle 1 is, the slower the increase of clutch pressure of the start-up clutch becomes, so as to prevent unexpectedly sudden acceleration of vehicle 1.

Strictly referring to the depression of the accelerator pedal, the control patterns of FIG. 20(b) are established by a momentary small depression immediately after releasing of the brake pedal, and the control patterns of FIG. 20(c) are established by a momentary large depression immediately after releasing of the brake pedal. More strictly, the momentary small and large depressions are referred to as small and large depression degrees of the accelerator pedal for the same period. In this regard, the difference between the patterns of FIG. 20(a) and the patterns of FIG. 20(b) can be also associated with the difference of depression speed of the accelerator pedal. Therefore, the recognition of the throttle valve opening degree at step S3 may be replaced with recognition of depression speed of the accelerator pedal. The same can be told about a later-discussed control shown in FIGS. 21 and 22 and a later-discussed control shown in FIGS. 23 and 24.

A start-up clutch control shown in FIGS. 21 and 22 based on detection of vehicle weight will be described. A clutch pressure increasing pattern is changed on the basis of detection of a vehicle weight by the vehicle weight sensor. Therefore, even if vehicle 1 is heavily loaded, vehicle 1 surely creeps on its traveling start, and the vehicle traveling speed change in reply to accelerator operation is kept substantially the same as that when vehicle 1 is light-loaded.

Figure 21:
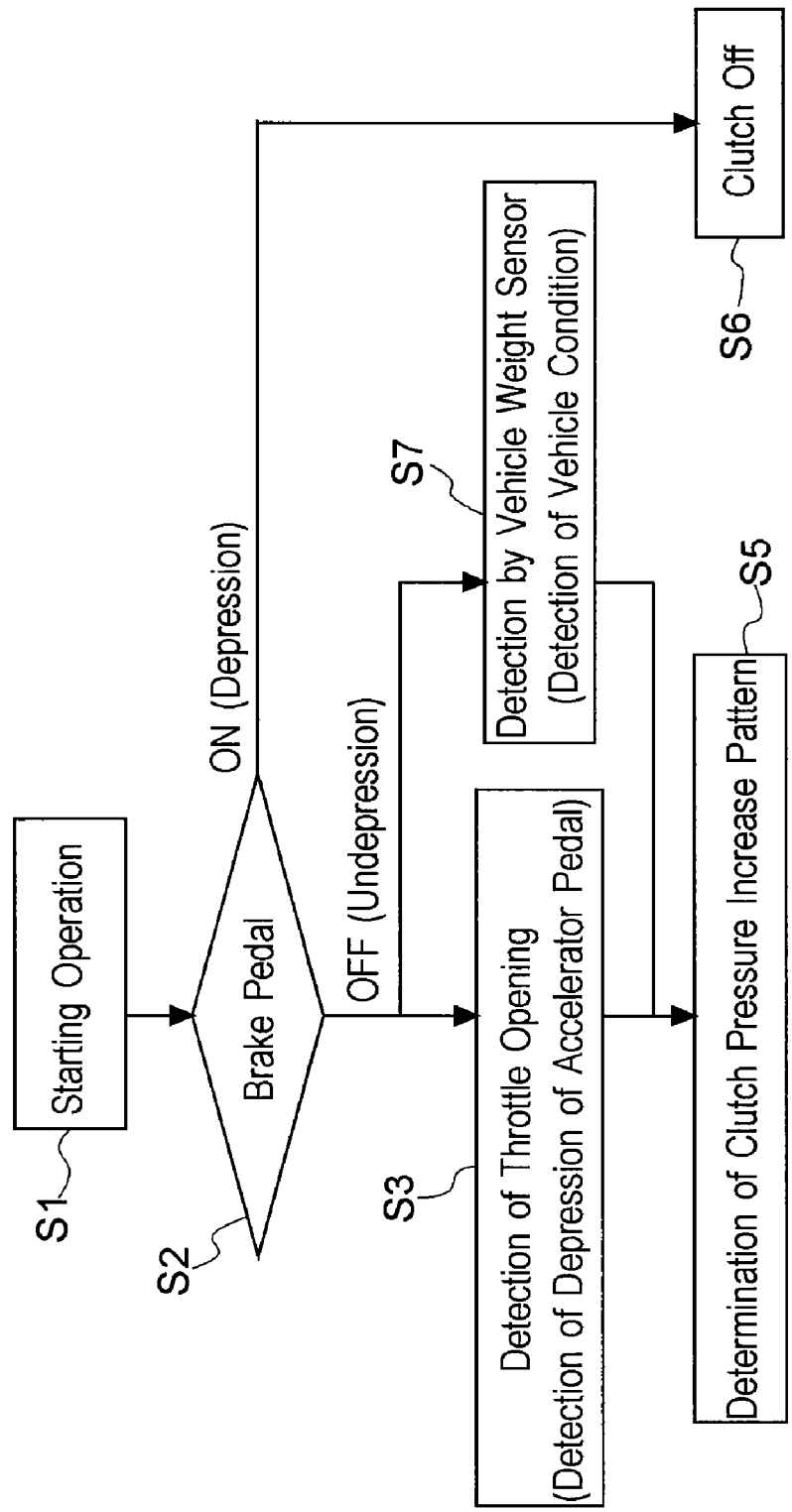
FIG. 21 is a flow chart for determining an increasing pattern of clutch pressure for the starting of the vehicle depending on detection by a weight sensor.

As shown in FIG. 21, when an operation for starting vehicle 1, such as switching on of an ignition key switch, is performed (at a step S1), brake pedal depression detection means 407 detects whether the brake pedal is depressed or not (at a step S2). While depression of the brake pedal is detected, disengagement of the start-up clutch is kept (at a step S6) so as to prevent start of vehicle 1. If release of the depressed brake pedal is detected, detection signals from the throttle valve opening sensor and the vehicle weight sensor are determined (at steps S3 and S7) so as to determine a clutch pressure condition of the start-up clutch (at a step S5).

Figure 22:
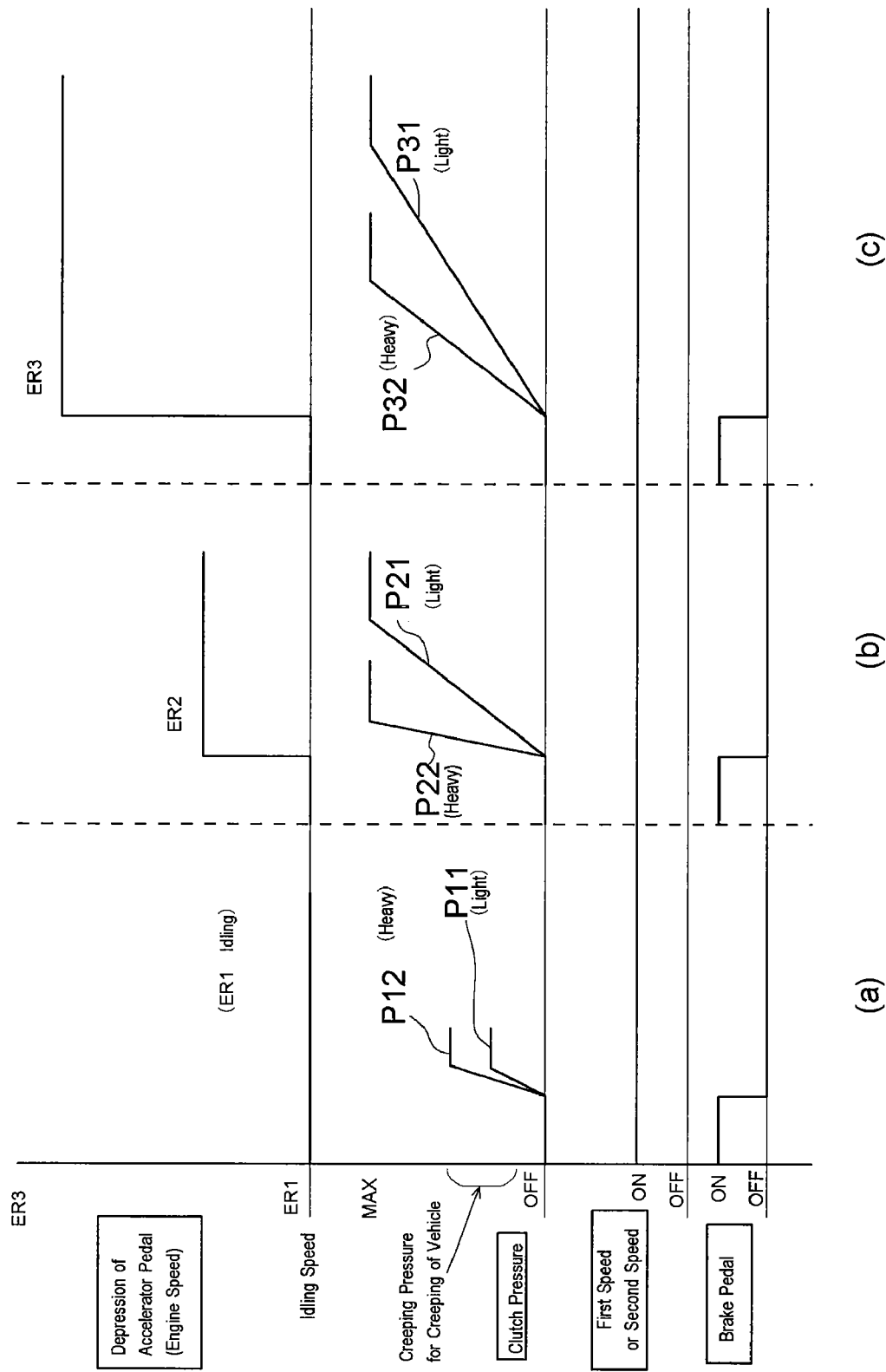
FIG. 22 is a timing chart for the starting of the vehicle depending on the detection by the vehicle sensor.

FIG. 22 illustrates a simultaneous time chart of depression variation of the accelerator pedal, clutch pressure variation of the start-up clutch, selection of speed level, and depression variation of the brake pedal according to the control flow of FIG. 21. Three patterns shown respectively in FIGS. 22(a), 22(b) and 22(c) are classified by the difference of depression of the accelerator pedal after the detection of the releasing of the depressed brake pedal.

FIG. 22(a) illustrates patterns of increase of clutch pressure of the start-up clutch without depression of the accelerator pedal after the depressed brake pedal in stationary vehicle 1 is released. An idling engine rotary speed ER1 is kept, and either the first or second forward traveling speed is preset, i.e., either the first or second normal driven gear 91 or 92 is previously drivingly connected to traveling output shaft 54 through corresponding shifter 96a or 97a. If the first forward traveling speed is preset, first clutch 58 serves as the start-up clutch to be engaged for starting of vehicle 1. If the second forward traveling speed is preset, second clutch 59 serves as the start-up clutch to be engaged for starting of vehicle 1. While the brake pedal is depressed, the clutch pressure of the start-up clutch is zero, i.e., the start-up clutch is disengaged.

A clutch pressure increase pattern P11 of the start-up clutch is established when light-weighed (light-loaded) vehicle 1 starts traveling. The clutch pressure of the start-up clutch starts rising immediately after the release of the depressed brake pedal. Then, the clutch pressure reaches a predetermined creeping pressure for ensuring the creepage of vehicle 1, and afterward, the creeping pressure is kept so that light-weighed (light-loaded) vehicle 1 creeps.

A clutch pressure increase pattern P12 of the start-up clutch is established when the vehicle weight sensor detects that a weight of vehicle 1 is large (i.e., vehicle 1 is heavily weighed (loaded)). An inclination of pattern P12 is steeper than that of pattern P11, i.e., the increase of clutch pressure according to pattern P12 when heavy-loaded vehicle 1 starts is quicker than that according to pattern P11 when light-loaded vehicle 1 starts. In pattern P12, the increased clutch pressure reaches a creeping pressure predetermined to be larger than the creeping pressure in pattern P11 for starting of light-loaded vehicle 1, and afterward, the larger creeping pressure is kept while heavy-loaded vehicle 1 creeps.

FIG. 22(b) illustrates patterns of increase of clutch pressure of the start-up clutch when the accelerator pedal is depressed so as to establish an engine rotary speed ER2 (e.g., 2300 rpm) immediately after the depressed brake pedal in stationary vehicle 1 is released. Each of patterns P21 and P22 indicates that the increased clutch pressure reaches a fixed maximum (proper) clutch pressure of the start-up clutch beyond the larger creeping pressure. An inclination of clutch pressure increase pattern P22 for heavy-loaded vehicle 1 is steeper than that of clutch pressure increase pattern P21 for light-loaded vehicle 1. Consequently, the increase of clutch pressure according to pattern P22 when heavy-loaded vehicle 1 starts and accelerates is quicker than that according to pattern P21 when light-loaded vehicle 1 starts and accelerates.

FIG. 22(c) illustrates patterns of increase of clutch pressure of the start-up clutch when the accelerator pedal is depressed so as to establish an engine rotary speed ER3 (e.g., 3600 rpm) larger than engine rotary speed ER2 immediately after the depressed brake pedal in stationary vehicle 1 is released. Each of patterns P31 and P32 indicates that the increased clutch pressure reaches the maximum clutch pressure of the start-up clutch. An inclination of clutch pressure increase pattern P32 for heavy-loaded vehicle 1 is steeper than that of clutch pressure increase pattern P31 for light-loaded vehicle 1, so that the increase of clutch pressure according to pattern P32 when heavy-loaded vehicle 1 starts and accelerates is quicker than that according to pattern P31 when light-loaded vehicle 1 starts and accelerates. An inclination of each of clutch pressure increase patterns P31 and R32 for getting engine rotary speed ER3 is gentler than that of each of clutch pressure increase patterns P21 and P22 for getting lower engine rotary speed ER2. Consequently, the higher the set engine rotary speed on starting of vehicle 1 is, the slower the increase of clutch pressure of the start-up clutch becomes, so as to prevent unexpectedly sudden acceleration of vehicle 1.

A start-up clutch control shown in FIGS. 23 and 24 based on detection of vehicle tilt angle and vehicle weight will be described. A clutch pressure increasing pattern is changed on the basis of detection of a vehicle tilt angle by the vehicle tilt angle sensor and detection of a vehicle weight by the vehicle weight sensor. Therefore, regardless of whether the ground is sloped or not (whether vehicle 1 ascend or descends a slope), and regardless of whether load on vehicle 1 is light or heavy, vehicle 1 surely creeps on its traveling start, and the vehicle traveling speed change ratio to accelerator operation degree is kept substantially constant.

Figure 23:
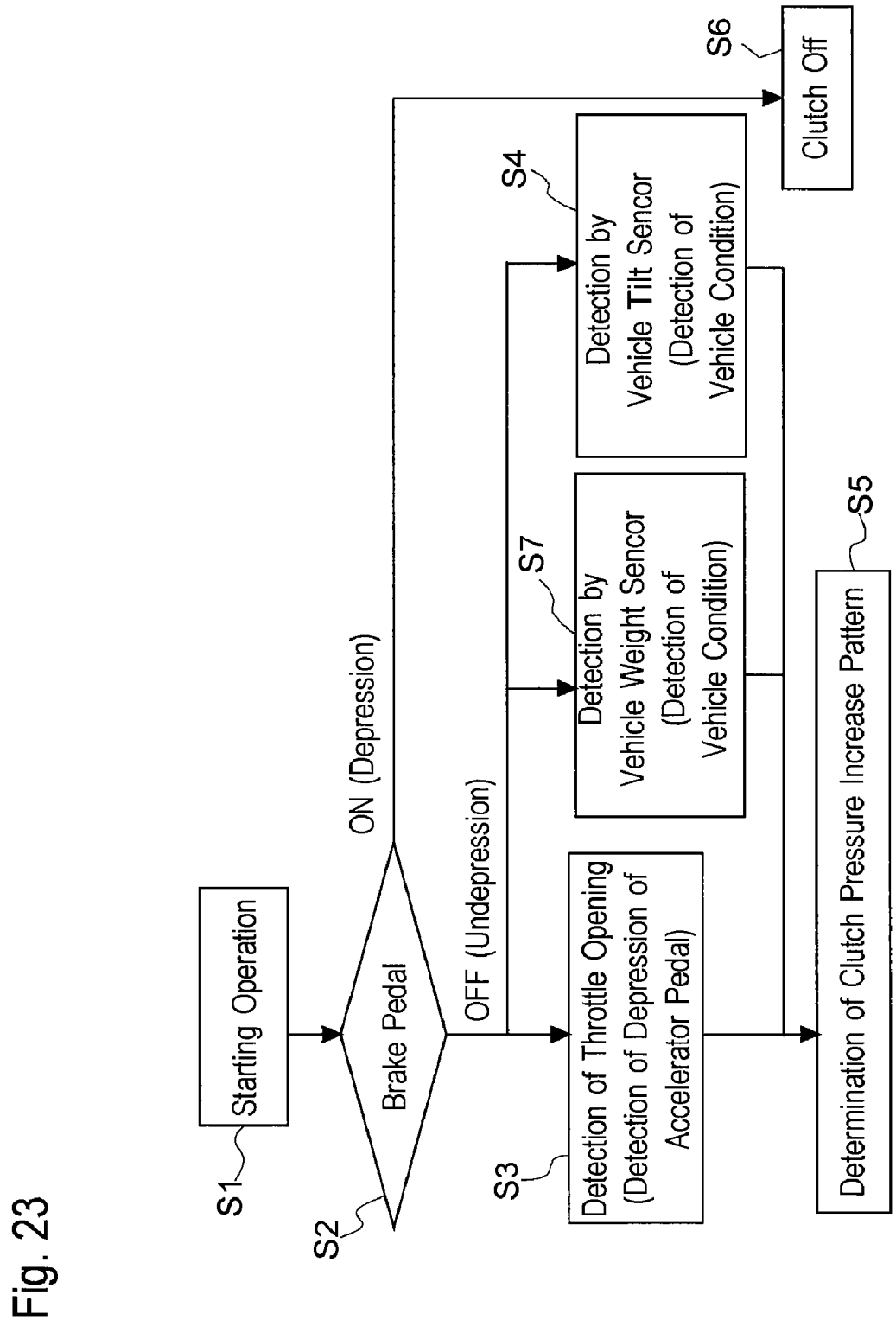
FIG. 23 is a flow chart for determining an increasing pattern of clutch pressure for the starting of the vehicle depending on detection by a tilt sensor and a weight sensor.

As shown in FIG. 23, when an operation for starting vehicle 1, such as switching on of an ignition key switch, is performed (at a step S1), brake pedal depression detection means 407 detects whether the brake pedal is depressed or not (at a step S2). While depression of the brake pedal is detected, disengagement of the start-up clutch is kept (at a step S6) so as to prevent start of vehicle 1. If release of the depressed brake pedal is detected, detection signals from the throttle valve opening sensor, the vehicle tilt angle sensor and the vehicle weight sensor are recognized (at steps S3, S4 and S7) so as to determine a clutch pressure condition of the start-up clutch (at a step S5).

Figure 24:
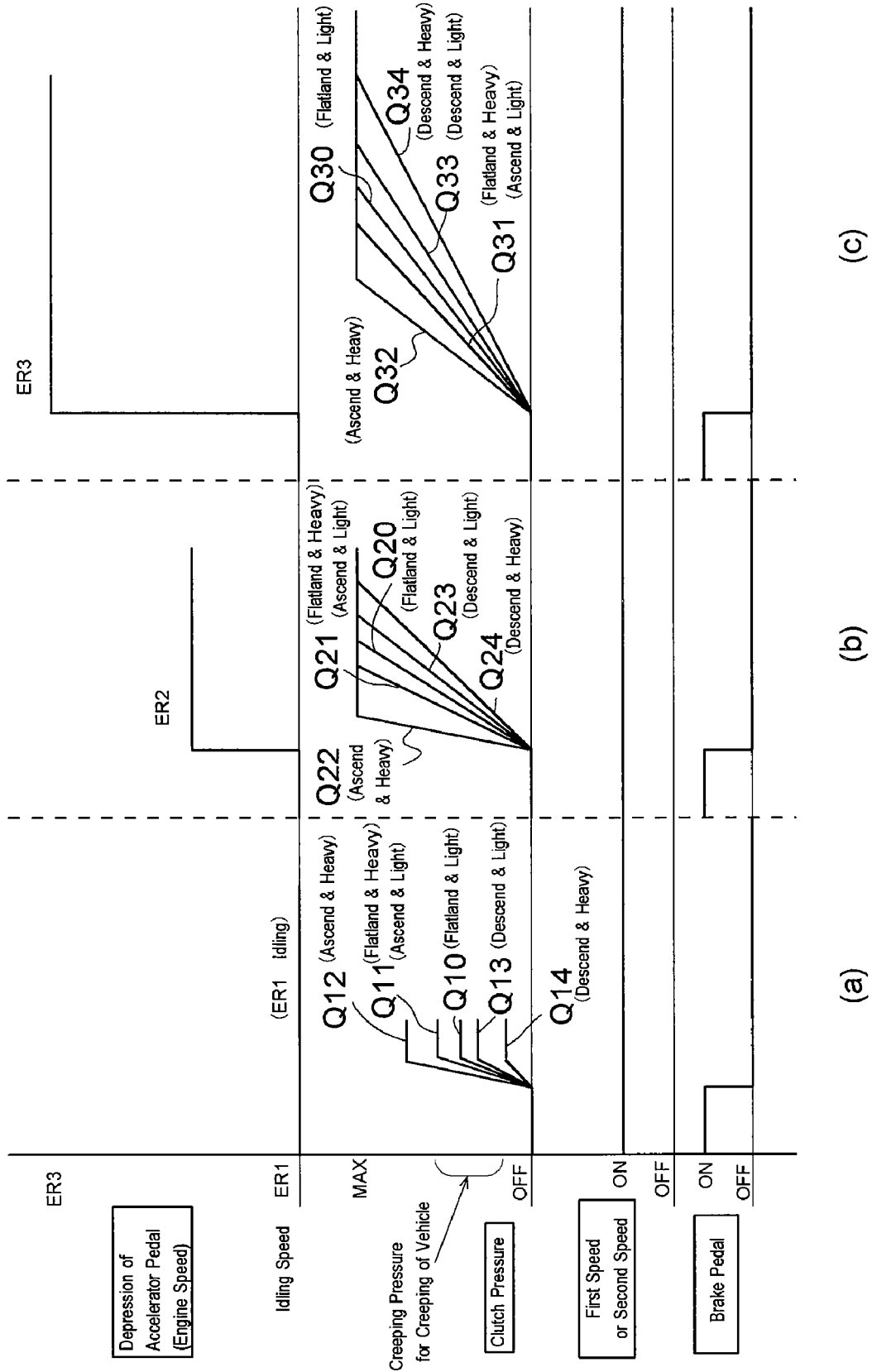
FIG. 24 is a timing chart for the starting of the vehicle depending on the detection by the tilt sensor and the weight sensor.

FIG. 24 illustrates a simultaneous time chart of depression variation of the accelerator pedal, clutch pressure variation of the start-up clutch, selection of speed level, and depression variation of the brake pedal according to the control flow of FIG. 23. Three patterns shown respective FIGS. 24(*a*), 24(*b*) and 24(*c*) are classified by difference of depression of the accelerator pedal after the detection of the releasing of the depressed brake pedal.

FIG. 24(*a*) illustrates patterns of increase of clutch pressure of the start-up clutch without depression of the accelerator pedal after the depressed brake pedal in stationary vehicle 1 is released. An idling engine rotary speed ER1 is kept, and either the first or second forward traveling speed is preset, i.e., either the first or second normal driven gear 91 or 92 is previously drivingly connected to traveling output shaft through corresponding shifter 96*a* or 97*a*. If the first forward traveling speed is preset, first clutch 58 serves as the start-up clutch to be engaged for starting of vehicle 1. If the second forward traveling speed is preset, second clutch 59 serves as the start-up clutch to be engaged for starting of vehicle 1. While the brake pedal is depressed, the clutch pressure of the start-up clutch is zero, i.e., the start-up clutch is disengaged.

A clutch pressure increase pattern Q10 of the start-up clutch is established when light-weighed (light-loaded) vehicle 1 starts traveling on a flatland. The clutch pressure of the start-up clutch starts rising immediately after the release of the depressed brake pedal. Then, the clutch pressure reaches a predetermined creeping pressure for ensuring the creepage of vehicle 1, and afterward, the creeping pressure is kept so that light-loaded vehicle 1 creeps on a flatland.

A clutch pressure increase pattern Q11 of the start-up clutch is established when it is detected that heavy-loaded vehicle 1 is on a flatland or that light-loaded vehicle 1 is on an ascending slope. An inclination of pattern Q11 is steeper than that of pattern Q10, i.e., the increase of clutch pressure according to pattern Q11 while light-loaded vehicle 1 ascends a slope or heavy-loaded vehicle 1 travels on a flatland is quicker than that according to pattern Q10 while light-loaded vehicle 1 travels on a flatland. In pattern Q11, the increased clutch pressure reaches a creeping pressure predetermined to be larger than the creeping pressure in pattern Q10 for traveling of fight-loaded vehicle 1 on a flatland, and afterward, the larger creeping pressure is kept while light-loaded vehicle 1 ascends a slope or while heavy-loaded vehicle 1 travels on a flatland.

A clutch pressure increase pattern Q12 of the start-up clutch is established when it is detected that heavy-loaded vehicle 1 is on an ascending slope. An inclination of pattern Q12 is steeper than that of pattern Q11, i.e., the increase of clutch pressure according to pattern Q12 while heavy-loaded vehicle 1 ascends a slope is quicker than that according to pattern Q11 while light-loaded vehicle 1 ascends a slope or heavy-loaded vehicle 1 travels on a flatland. In pattern Q12, the increased clutch pressure reaches a creeping pressure predetermined to be larger than the creeping pressure in pattern Q11, and afterward, the further larger creeping pressure is kept while heavy-loaded vehicle 1 ascends a slope.

A clutch pressure increase pattern Q13 of the start-up clutch is established when it is detected that light-loaded vehicle 1 is on a descending slope. An inclination of pattern Q13 is gentler than that of pattern Q10, i.e., the increase of clutch pressure according to pattern Q13 while light-loaded vehicle 1 descends a slope is slower than that according to pattern Q10 while light-loaded vehicle 1 travels on a flatland. In pattern Q13, the increased clutch pressure reaches a creeping pressure predetermined to be smaller than the creeping pressure in pattern Q10, and afterward, the smaller creeping pressure is kept while light-loaded vehicle 1 descends a slope.

A clutch pressure increase pattern Q14 of the start-up clutch is established when it is detected that heavy-loaded vehicle 1 is on a descending slope. An inclination of pattern Q14 is gentler than that of pattern Q13, i.e., the increase of clutch pressure according to pattern Q14 while heavy-loaded vehicle 1 descends a slope is slower than that according to pattern Q10 while light-loaded vehicle 1 descends a slope. In pattern Q14, the increased clutch pressure reaches a creeping pressure predetermined to be smaller than the creeping pressure in pattern Q13, and afterward, the further smaller creeping pressure is kept while heavy-loaded vehicle 1 descends a slope.

FIG. 24(*b*) illustrates patterns of increase of clutch pressure of the start-up clutch when the accelerator pedal is depressed so as to establish an engine rotary speed ER2 (e.g., 2300 rpm) immediately after the depressed brake pedal in stationary vehicle 1 is released. Each of patterns Q20, Q21, Q22, Q23 and Q24 indicates that the increased clutch pressure reaches a fixed maximum (proper) clutch pressure of the start-up clutch beyond the further larger creeping pressure. An inclination of clutch pressure increase pattern Q21 for light-loaded vehicle 1 to ascend a slope or for heavy-loaded vehicle 1 to travel on a flatland is steeper than that of clutch pressure increase pattern Q20 for light-loaded vehicle 1 to travel on a flatland, and an inclination of clutch pressure increase pattern Q22 for heavy-loaded vehicle 1 to ascend a slope is steeper than that of clutch pressure increase pattern Q21 for light-loaded vehicle 1 to ascend a slope or for heavy-loaded vehicle 1 to travel on a flatland. An inclination of clutch pressure increase pattern Q23 for light-loaded vehicle 1 to descend a slope is gentler than that of clutch pressure increase pattern Q20 for light-loaded vehicle 1 to travel on a flatland, and an inclination of clutch pressure increase pattern Q24 for heavy-loaded vehicle 1 to descend a slope is gentler than that of clutch pressure increase pattern Q23 for light-loaded vehicle 1 to descend a slope. Consequently, in comparison with the increase of clutch pressure according to pattern Q20 while light-loaded vehicle 1 travels on a flatland, the increase of clutch pressure according to pattern Q21 while heavy-loaded vehicle 1 travels on a flatland or light-loaded vehicle 1 ascends a slope is quicker, and the increase of clutch pressure according to pattern Q22 while heavy-loaded vehicle 1 ascends a slope is further quicker. On the other hand, in comparison with the increase of clutch pressure according to pattern Q20 while light-loaded vehicle 1 travels on a flatland, the increase of clutch pressure according to pattern Q23 while light-loaded vehicle 1 descends a slope is slower, and the increase of clutch pressure according to pattern Q24 while heavy-loaded vehicle 1 descends a slope is further slower.

FIG. 24(c) illustrates patterns of increase of clutch pressure of the start-up clutch when the accelerator pedal is depressed so as to establish an engine rotary speed ER3 (e.g., 3600 rpm) larger than engine rotary speed ER2 immediately after the depressed brake pedal in stationary vehicle 1 is released. Each of patterns Q30, Q31, Q32, Q33 and Q34 indicates that the increased clutch pressure reaches the maximum clutch pressure of the start-up clutch. An inclination of each of clutch pressure increase patterns Q30, Q31, Q32, Q33 and Q34 for getting engine rotary speed ER3 is gentler than that of each of clutch pressure increase patterns Q20, Q21, Q22, Q23 and Q24 for getting lower engine rotary speed ER2. Consequently, the higher the set engine rotary speed on starting of vehicle 1 is, the slower the increase of clutch pressure of the start-up clutch becomes, so as to prevent unexpectedly sudden acceleration of vehicle 1.

Clutch control patterns for gearshift between an odd-numbered speed and an even-numbered speed performed in multi-speed transmission 19 will now be described.

Figure 25:
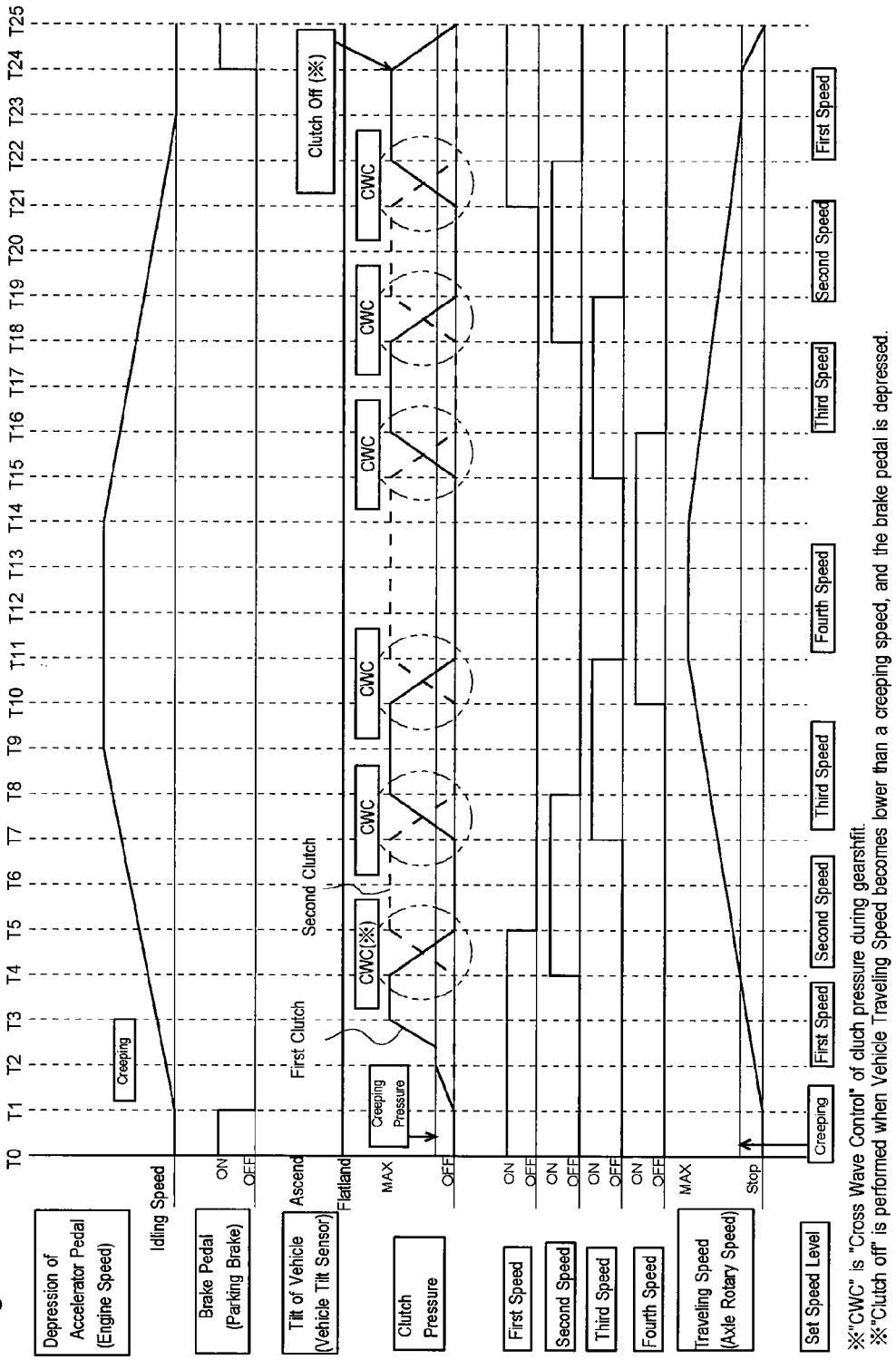
FIG. 25 is a timing chart of clutch control relative to accelerator operation (vehicle speed changing operation).

FIG. 25 is a time chart representing a series of gearshift processes of vehicle 1 traveling on a flatland. During the series of gearshift processes, first, vehicle 1 is stationary with the depressed brake pedal, then, the depressed brake pedal is released and the accelerator pedal is depressed for accelerating vehicle 1, i.e., for shift-up from the first forward traveling speed to the fourth forward traveling speed, and then, the depression of the accelerator pedal is loosened for decelerating vehicle 1, i.e., for shift-down from the fourth speed to the first speed, and finally, the brake pedal is depressed to stop vehicle 1. The shift-up (increasing the speed level by one) or the shift-down (reducing the speed level by one) is performed according to the above-mentioned gearshift pattern (the map of characteristic curves for gearshift) for vehicle 1 traveling on a flatland as shown in FIG. 8.

The time chart of FIG. 25 will be described. First, a timing T0 when vehicle 1 is stationary with the depressed brake pedal is a start point of the time chart.

For a period between timing T0 and a timing T2, the above-mentioned operations for starting vehicle 1 (see FIG. 20(a)) are performed so that the clutch pressure of first clutch 58 is increased to the creeping pressure (for ensuring creepage of vehicle 1) while the first speed normal gear train is drivingly connected to traveling output shaft 54. For a period between timing T2 and a timing T3, as the accelerator pedal is depressed (as the throttle valve opening is increased), the clutch pressure of first clutch 58 is kept to be the creeping pressure for a while, and then, the clutch pressure rises again and reaches the maximum clutch pressure. The maximum clutch pressure is kept until a timing T4. The vehicle traveling speed (the rotary speed of axles 25 and 36) is continuously increased between timing T2 and timing T4.

At timing T4, the shift-up signal is issued according to shift-up graph U012 in the map of FIG. 8, so that the disengagement of first clutch 58 and the engagement of second clutch 59 overlap each other (i.e., the cross wave control is performed), thereby performing shift-up from the first speed to the second speed. Between timing T4 and a timing T5, the shift-up from the first speed to the second speed is performed by the cross wave control of first and second clutches 58 and 59 according to shift-up graph U012 in the map of FIG. 8.

Afterward, the vehicle traveling speed is further increased according to increase of the depression of the accelerator pedal (or the throttle vale opening degree). Between a timing T7 and a timing T8, the shift-up from the second speed to the third speed is performed by the cross wave control of first and second clutches 58 and 59 according to shift-up graph U023 in the map of FIG. 8.

At a timing T9, the depression of the accelerator pedal (or the throttle valve opening degree) reaches the maximum. Afterward, the maximum depression is kept while the vehicle traveling speed is increased. Between a timing T10 and a timing T11, the shift-up from the third speed to the fourth speed is performed by the cross wave control of first and second clutches 58 and 59 according to shift-up graph U034 in the map of FIG. 8. The vehicle traveling speed reaches the maximum at timing T11. Afterward, the maximum speed in the fourth speed level is kept as far as the accelerator pedal is kept at the maximum depression.

At a timing T14, the maximum depression of the accelerator pedal starts being reduced (the throttle valve opening degree starts being reduced) so that the vehicle traveling speed starts being reduced.

At a timing T15, the shift-down signal according to shift-down graph D043 in the map of FIG. 8 is issued so as to perform the cross wave control of the first and second clutches 58 and 59, thereby shifting-down from the fourth speed to the third speed.

Afterward, the vehicle traveling speed is further reduced according to reduction of the depression of the accelerator pedal (or the throttle vale opening degree). Between a timing T18 and a timing T19, the shift-down from the third speed to the second speed is performed by the cross wave control of first and second clutches 58 and 59 according to shift-down graph D032 in the map of FIG. 8.

Between a timing T21 and a timing T22, the shift-down from the second speed to the first (lowest) speed is performed by the cross wave control of first and second clutches 58 and 59 according to shift-down graph D021 in the map of FIG. 8.

At a timing T23, the depression of the accelerator pedal (or the throttle valve opening degree) reaches zero, so that the vehicle traveling speed reaches the creeping speed. At a timing T24, the brake pedal is depressed, and engaged clutch 58 (for the first speed) is disengaged so as to further reduce the vehicle traveling speed. At a timing T25, vehicle 1 completely stops.

The above-mentioned gearshift clutch control of vehicle 1 traveling on a flatland based on the timing chart of FIG. 25 and the map of FIG. 8 is amended as follows according to detection of a vehicle tilt condition and/or detection of a vehicle weight (load) condition.

An amended gearshift clutch control based on detection of a vehicle tilt condition will be described with reference to FIGS. 26 to 28. In this regard, the vehicle tilt angle sensor (i.e., vehicle tilt angle detection means 405 shown in FIG. 18) constantly detects a tilt angle of vehicle 1 in the forward or backward traveling direction thereof, and the gearshift patterns (i.e., the gearshift characteristic map) are changed based on the detected tilt angle.

Figure 26:
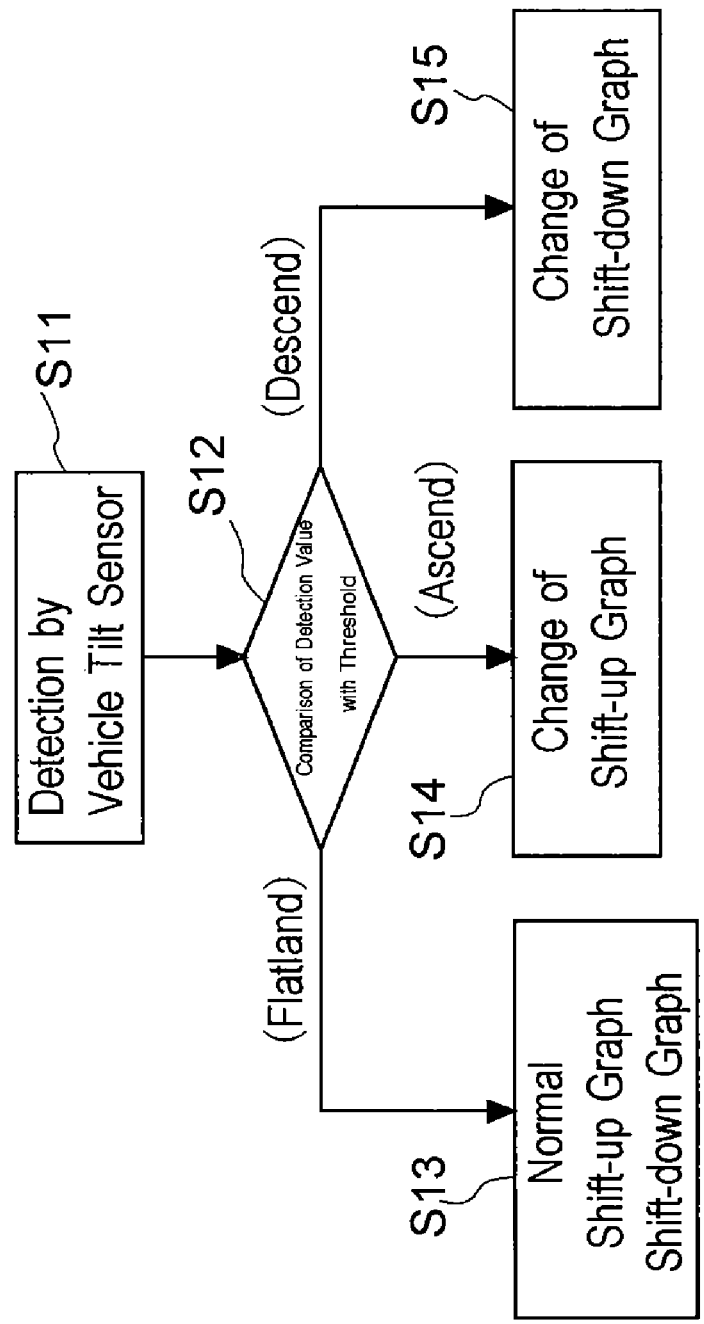
FIG. 26 is a flow chart for changing a gearshift pattern depending on detection by a tilt sensor.

As shown in FIG. 26, the vehicle tilt angle sensor detects a tilt angle of vehicle 1 in the forward or backward traveling direction (at a step S11), and the detected angle is compared with a predetermined tilt angle (at a step S12). As a result of the comparison, if vehicle 1 is determined to travel on a flatland, the normal shift-up and shift-down patterns (graphs in the map of FIG. 8) are maintained (at a step S13). If vehicle 1 is determined to ascend a slope, the normal shift-up patterns are automatically changed into amended shift-up patterns for recovery of lost traveling speed (at a step S14). If vehicle 1 is determined to descend a slope, the normal shift-down patterns are automatically changed into amended shift-down patterns for effecting engine braking (at a step S15).

The amendment of shift-up patterns for vehicle 1 ascending a slope will be described with reference to FIG. 27. In FIG. 27, normal shift-up graphs U012 (first-to-second speed shift-up), U023 (second-to-third speed shift-up) and U034 (third-to-fourth speed shift-up) are the same as those in FIG. 8 adapted for vehicle 1 traveling on a flatland, and amended shift-up graphs U112 (first-to-second speed shift-up), U123 (second-to-third speed shift-up) and U134 (third-to-fourth speed shift-up) are adapted for vehicle 1 ascending a slope. When vehicle 1 ascends a slope, the normal shift-up graphs are changed into the amended shift-up graphs drawn rightward from the respective normal shift-up graphs in FIG. 27. In other words, each amended shift-up replies to an actual vehicle traveling speed which is higher than the actual vehicle traveling speed to which the corresponding normal shift-up replies. However, when vehicle 1 ascends a slope, the shift-down graphs are unchanged, i.e., normal shift-down graphs D021, D032 and D043 for vehicle 1 traveling on a flatland are used as they are.

As a result of the change of the shift-up graphs, in the timing chart of FIG. 25, the periods between timings T4 and T5 for the first-to-second speed shift-up, between timings T7 and T8 for the second-to-third speed shift-up and between timings T10 and T11 for the third-to-fourth speed shift-up are shifted rightward, i.e., to the side of higher vehicle traveling speed (larger depression of the accelerator pedal or larger degree of the throttle valve opening). Namely, the shift-up timings for accelerating vehicle 1 ascending on a slope are later than the respective shift-up timings for accelerating vehicle 1 traveling on a flatland. The periods between timings T15 and T16 for the fourth-to-third speed shift-down, between timings T18 and T19 for the third-to-second speed shift-down and between timings T21 and T22 for the second-to-first speed shift-down are left as the respective normal timings for traveling of vehicle 1 on a flatland.

The amendment of shift-down patterns for vehicle 1 descending a slope will be described with reference to FIG. 28. In FIG. 28, normal shift-down graphs D021 (second-to-first speed shift-down), D032 (third-to-second speed shift-down) and D043 (fourth-to-third speed shift-down) are the same as those in FIG. 8 adapted for vehicle 1 traveling on a flatland, and amended shift-down graphs D121 (second-to-first speed shift-down), D132 (third-to-second speed shift-down) and D143 (fourth-to-third speed shift-down) are adapted for vehicle 1 descending a slope. When vehicle 1 descends a slope, the normal shift-down graphs are changed into the amended shift-down graphs disposed rightward from the respective normal shift-down graphs in FIG. 28. In other words, each amended shift-down replies to an actual vehicle traveling speed which is higher than the actual vehicle traveling speed to which the corresponding normal shift-down replies. However, when vehicle 1 descends a slope, the shift-up graphs are unchanged, i.e., normal shift-up graphs U012, U023 and U034 for vehicle 1 traveling on a flatland are used as they are.

As a result of the change of the shift-down graphs, in the timing chart of FIG. 25, the periods between timings T15 and T16 for the fourth-to-third speed shift-down, between timings T18 and T19 for the third-to-second speed shift-down and between timings T21 and T22 for the second-to-first speed shift-down are shifted leftward, i.e., to the side of higher vehicle traveling speed (larger depression of the accelerator pedal or larger degree of the throttle valve opening). Namely, the shift-down timings for decelerating vehicle 1 descending on a slope are earlier than the respective shift-down timings for decelerating vehicle 1 traveling on a flatland. The periods between timings T4 and T5 for the first-to-second speed shift-up, between timings T7 and T8 for the second-to-third speed shift-up and between timings T10 and T11 for the third-to-fourth speed shift-up are left as the respective normal timings for traveling of vehicle 1 on a flatland.

An amended gearshift clutch control based on detection of a vehicle weight condition will be described with reference to FIG. 29. In this regard, the vehicle weight sensor (i.e., vehicle weight detection means 406 shown in FIG. 18) constantly detects a weight of vehicle 1 (i.e., load weight on vehicle 1), and the gearshift patterns are changed based on the detected vehicle weight.

Figure 29:
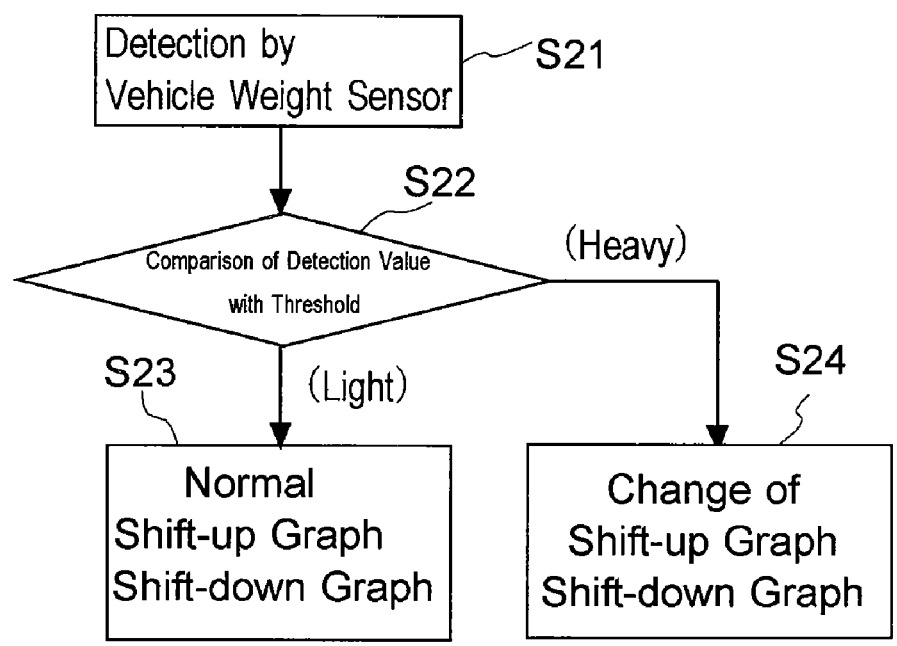
FIG. 29 is a flow chart for changing a gearshift pattern depending on detection by a weight sensor.

As shown in FIG. 29, the vehicle weight sensor detects a weight of vehicle 1 (weight of load on vehicle 1) (at a step S21), and the detected weight is compared with a predetermined weight (at a step S22). As a result of the comparison, if vehicle 1 is determined to be light weighed (loaded), the normal shift-up and shift-down patterns (graphs in the map of FIG. 8) are maintained (at a step S23). If vehicle 1 is determined to be heavily weighed (loaded), the normal shift-up patterns and normal shift-up patterns are automatically changed into amended shift-up patterns and amended shift-down patterns for recovery of lost traveling speed (at a step S24).

Figure 27:
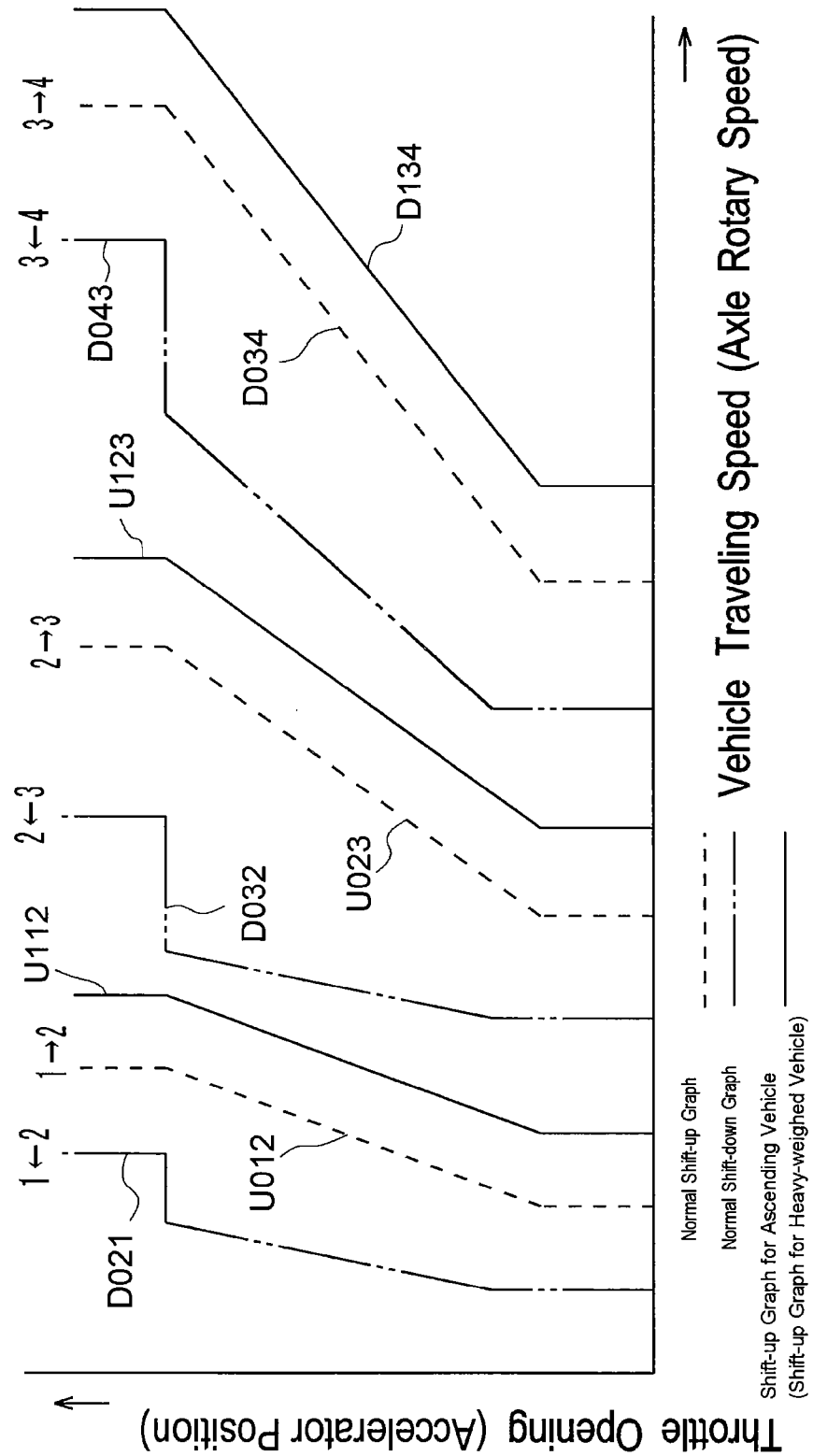
FIG. 27 is a map of characteristic curves showing change of a shift-up curve for the starting of the vehicle ascending a slope.
Figure 28:
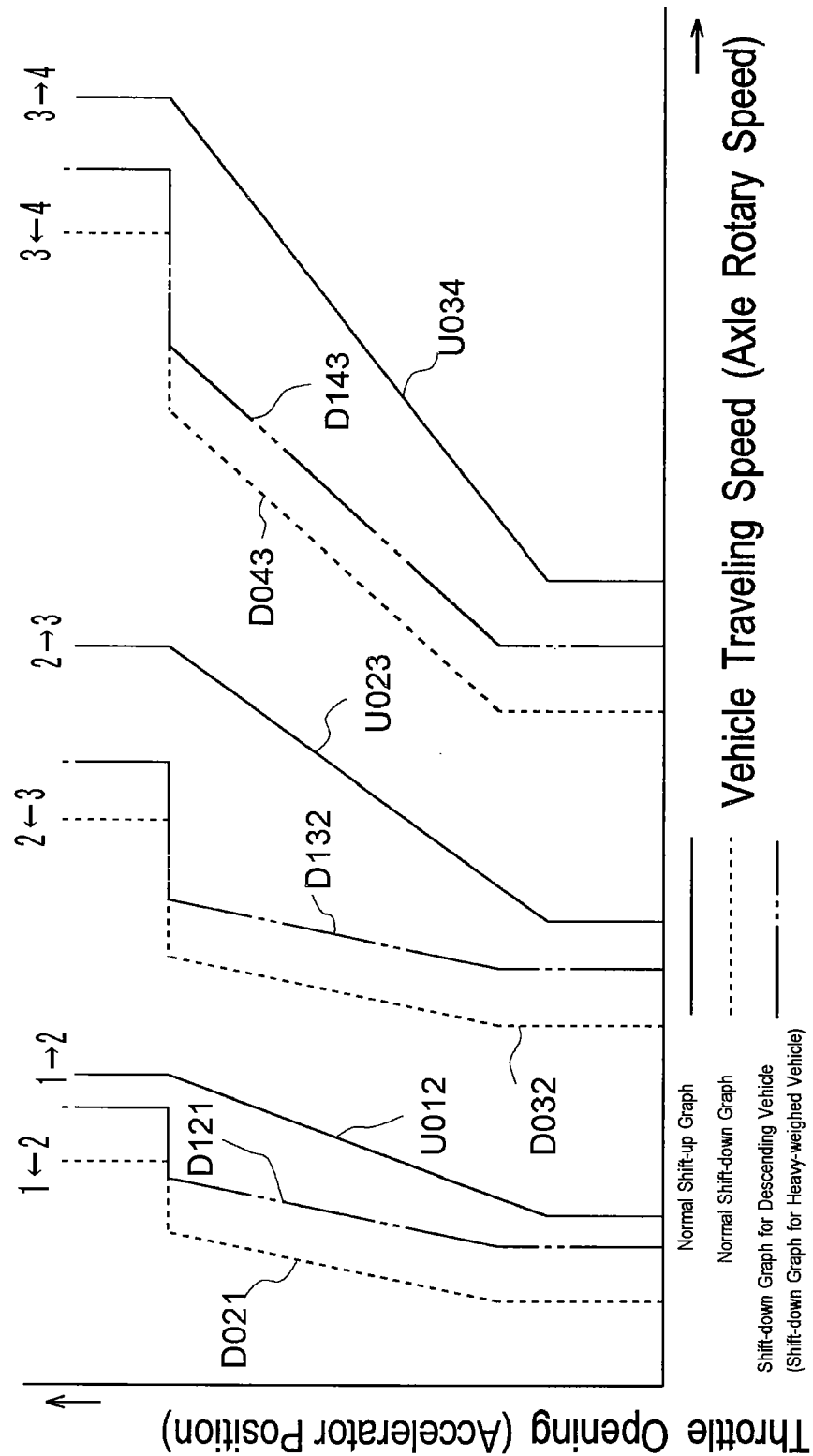
FIG. 28 is a map of characteristic curves showing change of a shift-down curve for the starting of the vehicle descending a slope.

The amendments of gearshift patterns shown in FIGS. 27 and 28 are adapted as the amendment of gearshift pattern when vehicle 1 is heavily weighed. That is, when it is detected that vehicle 1 is heavily weighed, multi-speed transmission 19 (42) adapts amended shift-up graphs U112 (first-to-second speed shift-up), U123 (second-to-third speed shift-up) and U134 (third-to-fourth speed shift-up) shown in FIG. 27, replying to respective actual vehicle traveling speeds that are higher than the actual vehicle traveling speeds to which respective normal shift-up graphs U012, U023 and U034 reply, and also, multi-speed transmission 19 (42) adapts amended shift-down graphs D121 (second-to-first speed shift-down), D132 (third-to-second speed shift-down) and D143 (fourth-to-third speed shift-down) shown in FIG. 28, replying to respective actual vehicle traveling speeds that are higher than the actual vehicle traveling speeds to which respective normal shift-down graphs D021, D032 and D043 reply.

As a result of the change of the shift-up and shift-down graphs, in the timing chart of FIG. 25, the periods between timings T4 and T5 for the first-to-second speed shift-up, between timings T7 and T8 for the second-to-third speed shift-up and between timings T10 and T11 for the third-to-fourth speed shift-up are shifted rightward, i.e., to the side of higher vehicle traveling speed (larger depression of the accelerator pedal or larger degree of the throttle valve opening). Namely, the shift-up timings for accelerating heavily weighed vehicle 1 are later than the respective shift-up timings for accelerating light weighed vehicle 1. The periods between timings T15 and T16 for the fourth-to-third speed shift-down, between timings T18 and T19 for the third-to-second speed shift-down and between timings T21 and T22 for the second-to-first speed shift-down are shifted leftward, i.e., to the side of higher vehicle traveling speed (larger depression of the accelerator pedal or larger degree of the throttle valve opening). Namely, the shift-down timings for decelerating heavily weighed vehicle 1 are earlier than the respective shift-down timings for decelerating light weighed vehicle 1.

An amended gearshift clutch control based on detection of a vehicle tilt condition and detection of a vehicle weight condition will be described with reference to FIGS. 30, 31 and 32. In this regard, the vehicle tilt angle sensor (i.e., vehicle tilt angle detection means 405) and the vehicle weight sensor (i.e., vehicle weight detection means 406) constantly detect a tilt angle of vehicle 1 in the forward or backward traveling direction thereof and a weight of vehicle 1, and the gearshift patterns are changed based on the detected tilt angle and the detected weight.

Figure 30:
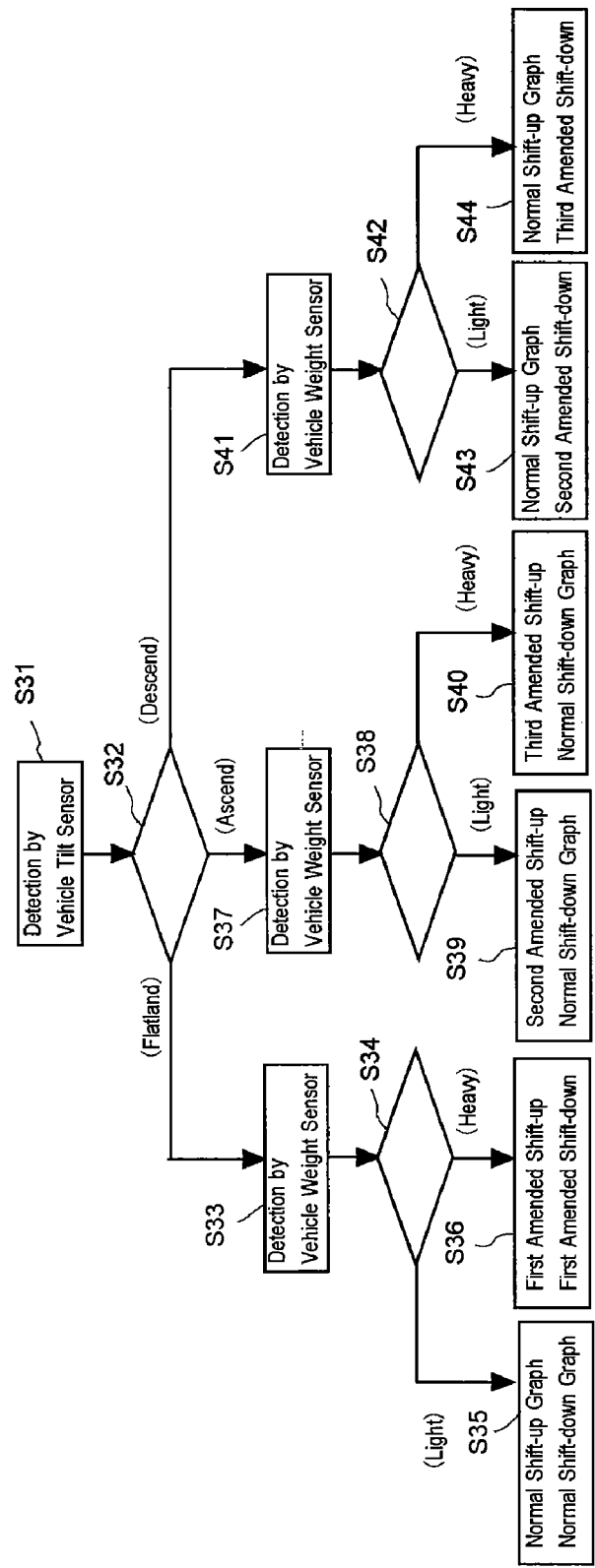
FIG. 30 is a flow chart for changing a gearshift pattern depending on detection by a tilt sensor and a weight sensor.

As shown in FIG. 30, the vehicle tilt angle sensor detects a tilt angle of vehicle 1 in the forward or backward traveling direction (at a step S31), and the detected angle is compared with a predetermined tilt angle (at a step S32), so as to determine on which of a flatland, an ascending slope and a descending slope vehicle 1 travels. After the determination of the slope state of vehicle 1, based on detection of a weight of vehicle 1 (load weight of vehicle 1) by the vehicle weight sensor (at a step S33, S37 or S41), the detected weight is compared with a predetermined weight (at a step S34, S38 or S42).

Figure 31:
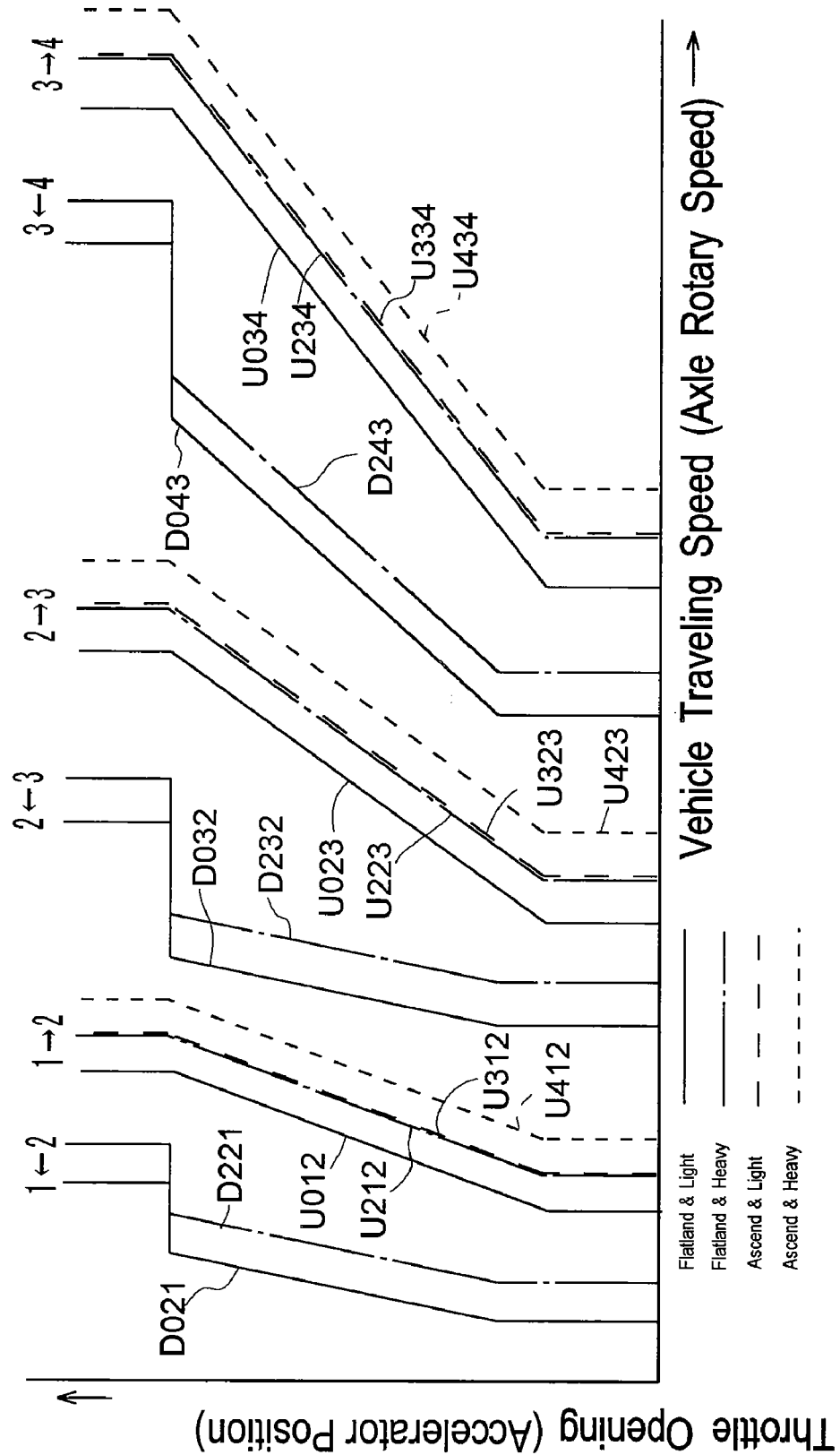
FIG. 31 is a map of characteristic curves showing change of gearshift patterns according to detection of the tilt sensor and the weight sensor between the state that the vehicle travels on a flat land and the state that the vehicle ascends a slope.
Figure 32:
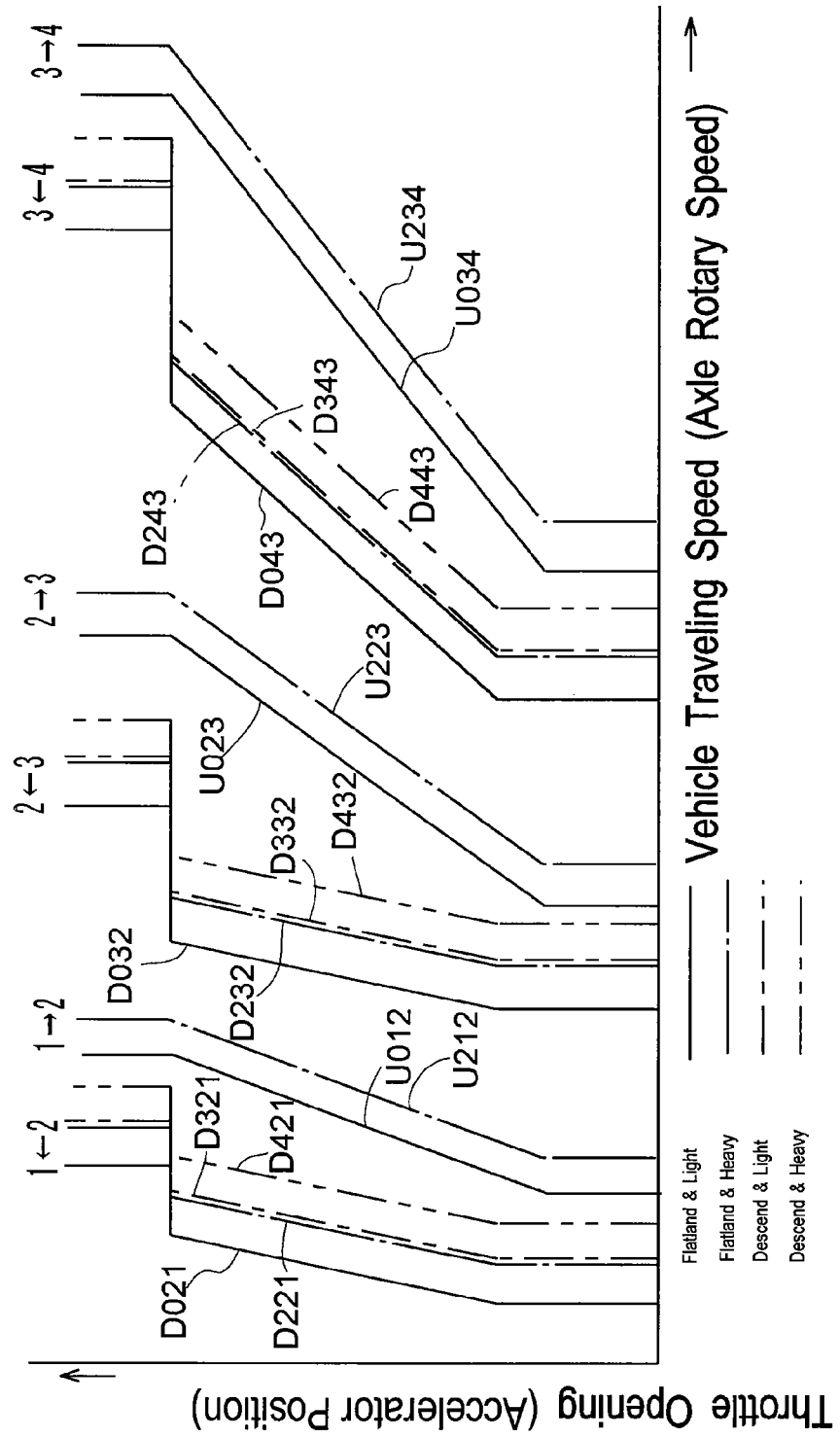
FIG. 32 is a map of characteristic curves showing change of gearshift patterns according to detection of the tilt sensor and the weight sensor between the state that vehicle travels on a flat land and the state that the vehicle descends a slope.

As a result of the comparison of the detected weight with the predetermined weight when vehicle 1 travels on a flatland (step S34), if vehicle 1 is determined to be light weighed (loaded), normal shift-up graphs U012, U023 and U034 and normal shift-down graphs D021, D032 and D043 shown in a map of FIG. 31 or 32 are adapted as they are (at a step S35).

If vehicle 1 traveling on a flatland is determined to be heavy weighed (loaded), multi-speed transmission 19 (42) adapts first amended shift-up graphs U212 (first-to-second speed shift-up), U223 (second-to-third speed shift-up) and U234 (third-to-fourth speed shift-up) shown in the map of FIG. 31 or 32, replying to respective actual vehicle traveling speeds that are higher than the actual vehicle traveling speeds to which respective normal shift-up graphs U012, U023 and U034 reply, and also, multi-speed transmission 19 (42) adapts first amended shift-down graphs D221 (second-to-first speed shift-down), D232 (third-to-second speed shift-down) and D243 (fourth-to-third speed shift-down) shown in FIG. 31 or 32, replying to respective actual vehicle traveling speeds that are higher than the actual vehicle traveling speeds to which respective normal shift-down graphs D021, D032 and D043 reply (at a step S36).

As a result of the change of the shift-up and shift-down graphs at step S36 in the control flow of FIG. 30, in the timing chart of FIG. 25, the shift-up periods between timings T4 and T5, between timings T7 and T8 and between timings T10 and T11 are shifted rightward, i.e., to the side of higher vehicle traveling speed (larger depression of the accelerator pedal or larger degree of the throttle valve opening) in comparison with the shift-up periods in the time chart created by the gearshift pattern determined at step S35 in the control flow of FIG. 30 when light weighed vehicle 1 travels on a flatland. Namely, the shift-up timings for accelerating heavily weighed vehicle 1 traveling on a flatland are later than the respective shift-up timings for accelerating light weighed vehicle 1 on a flatland. The shift-down periods between timings T15 and T16, between timings T18 and T19 and between timings T21 and T22 are shifted leftward, i.e., to the side of higher vehicle traveling speed (larger depression of the accelerator pedal or larger degree of the throttle valve opening) in comparison with the shift-down periods in the time chart created by the gearshift pattern determined at step S35 in the control flow of FIG. 30 when light weighed vehicle 1 travels on a flatland. Namely, the shift-down timings for decelerating heavily weighed vehicle 1 traveling on a flatland are earlier than the respective shift-down timings for decelerating light weighed vehicle 1 on a flatland. In this way, the shift-up timings are delayed, and the shift-down timings are advanced, similar to those in the timing chart changed by the flow chart of FIG. 29.

As a result of the comparison of the detected weight with the predetermined weight when vehicle 1 ascends a slope (step S38), if ascending vehicle 1 is determined to be light weighed (loaded), multi-speed transmission 19 (42) adapts second amended shift-up graphs U312 (first-to-second speed shift-up), U323 (second-to-third speed shift-up) and U334 (third-to-fourth speed shift-up) shown in the map of FIG. 31, replying to respective actual vehicle traveling speeds that are higher than the actual vehicle traveling speeds to which respective normal shift-up graphs U012, U023 and U034 reply, and also, multi-speed transmission 19 (42) adapts normal shift-down graphs D021, D032 and D043 shown in the map of FIG. 31 (at a step S39). As a result of the change of the shift-up graphs at step S39 in the control flow of FIG. 30, in the timing chart of FIG. 25, the shift-up periods between timings T4 and T5, between timings T7 and T8 and between timings T10 and T11 are shifted rightward, i.e., to the side of higher vehicle traveling speed (larger depression of the accelerator pedal or larger degree of the throttle valve opening) in comparison with the shift-up periods in the time chart created by the gearshift pattern determined at step S35 in the control flow of FIG. 30 when light weighed vehicle 1 travels on a flatland. Namely, the shift-up timings for accelerating light weighed vehicle 1 ascending a slope are later than the respective shift-up timings for accelerating light weighed vehicle 1 on a flatland. The shift-down periods between timings T15 and T16, between timings T18 and T19 and between timings T21 and T22 are not shifted, i.e., remain as them shown in FIG. 25. In this way, the shift-up timings are delayed while the shift-down timings remain as normal, similar to those in the timing chart changed by the flow chart of FIGS. 26 and 27.

If ascending vehicle 1 is determined to be heavily weighed (loaded), multi-speed transmission 19 (42) adapts third amended shift-up graphs U412 (first-to-second speed shift-up), U423 (second-to-third speed shift-up) and U434 (third-to-fourth speed shift-up) shown in the map of FIG. 31, replying to respective actual vehicle traveling speeds that are higher than the actual vehicle traveling speeds to which respective second amended shift-up graphs U312, U323 and U334 reply, and also, multi-speed transmission 19 (42) adapts normal shift-down graphs D021, D032 and D043 shown in the map of FIG. 31 (at a step S40). As a result of the change of the shift-up graphs at step S40 in the control flow of FIG. 30, in the timing chart of FIG. 25, the shift-up periods between timings T4 and T5, between timings T7 and T8 and between timings T10 and T11 are shifted further rightward, i.e., to the side of higher vehicle traveling speed (larger depression of the accelerator pedal or larger degree of the throttle valve opening) in comparison with the shift-up periods in the time chart created by the gearshift pattern determined at step S39 in the control flow of FIG. 30 when light weighed vehicle 1 ascends a slope. Namely, the shift-up timings for accelerating heavily weighed vehicle 1 ascending a slope are further later than the respective shift-up timings for accelerating light weighed vehicle 1 ascending a slope. The shift-down periods between timings T15 and T16, between timings T18 and T19 and between timings T21 and T22 are not shifted, i.e., remain as them shown in FIG. 25.

As a result of the comparison of the detected weight with the predetermined weight when vehicle 1 descends a slope (step S42), if descending vehicle 1 is determined to be light weighed (loaded), multi-speed transmission 19 (42) adapts second amended shift-down graphs D321 (second-to-first speed shift-down), D332 (third-to-second speed shift-down) and D343 (fourth-to-third speed shift-down) shown in the map of FIG. 32, replying to respective actual vehicle traveling speeds that are higher than the actual vehicle traveling speeds to which respective normal shift-down graphs D021, D032 and D043 reply, and also, multi-speed transmission 19 (42) adapts normal shift-up graphs U012, U023 and U034 shown in the map of FIG. 32 (at a step S43). As a result of the change of the shift-down graphs at step S43 in the control flow of FIG. 30, in the timing chart of FIG. 25, the shift-down periods between timings T15 and T16, between timings T18 and T19 and between timings T21 and T22 are shifted leftward, i.e., to the side of higher vehicle traveling speed (larger depression of the accelerator pedal or larger degree of the throttle valve opening) in comparison with the shift-down periods in the time chart caused by the gearshift pattern determined at step S35 in the control flow of FIG. 30 when light weighed vehicle 1 travels on a flatland. Namely, the shift-down timings for decelerating light weighed vehicle 1 on a flatland are earlier than the respective shift-down timings for decelerating light weighed vehicle 1 on a flatland. The shift-up periods between timings T4 and T5, between timings T7 and T8 and between timings T10 and T11 are not shifted, i.e., remain as them shown in FIG. 25. In this way, while the shift-up timings remains as normal, the shift-down timings is advanced.

If descending vehicle 1 is determined to be heavily weighed (loaded), multi-speed transmission 19 (42) adapts third amended shift-down graphs D421 (second-to-first speed shift-down), D432 (third-to-second speed shift-down) and D443 (fourth-to-third speed shift-down) shown in the map of FIG. 32, replying to respective actual vehicle traveling speeds that are higher than the actual vehicle traveling speeds to which respective second amended shift-down graphs D321, D332 and D343 reply, and also, multi-speed transmission 19 (42) adapts normal shift-up graphs U012, U023 and U034 shown in the map of FIG. 32 (at a step S44). As a result of the change of the shift-down graphs at step S44 in the control flow of FIG. 30, in the timing chart of FIG. 25, the shift-down periods between timings T15 and T16, between timings T18 and T19 and between timings T21 and T22 are shifted further leftward, i.e., to the side of higher vehicle traveling speed (larger depression of the accelerator pedal or larger degree of the throttle valve opening) in comparison with the shift-up periods in the time chart caused by the gearshift pattern determined at step S43 in the control flow of FIG. 30 when light weighed vehicle 1 descends a slope. Namely, the shift-down timings for decelerating heavily weighed vehicle 1 descending a slope are further earlier than the respective shift-down timings for decelerating light weighed vehicle 1 on the descending slope. The shift-up periods between timings T4 and T5, between timings T7 and T8 and between timings T10 and T11 are not shifted, i.e., remain as them shown in FIG. 25.

Control for decelerating vehicle 1 (shift-down control of multi-speed transmission 19) in association with a braking operation will now be described with reference to FIG. 33.

Basically, when the brake pedal is depressed in traveling vehicle 1 (while depression of the accelerator pedal is kept at a certain degree so as to keep a constant engine rotary speed ERf), the engaged one of the first and second clutches 58 and 59 is disengaged and the other of first and second clutches 58 and 59 is engaged for automatic shift-down. FIG. 33 illustrates three clutch pressure variation patterns for the shift-down.

In a timing chart of FIG. 33(a), according to a first clutch pressure variation pattern, the brake pedal is depressed in vehicle 1 traveling at the third speed so as to shift down transmission 19 to the second speed, then the depressed brake pedal is released, and vehicle 1 is accelerated so as to shift up transmission 19 to the third speed. In the first pattern, simultaneous with the depression of the brake pedal, the clutch pressure of first clutch 58 is reduced from the proper (maximum) clutch pressure to the predetermined creeping clutch pressure so as to half-engage first clutch 58, and the creeping clutch pressure is kept for a while so as to transmit power through half-engaged first clutch 58. After the while of keeping the creeping clutch pressure, the shift-down timing is reached, so that the clutch pressure of first clutch 58 starts being reduced, and simultaneously, the clutch pressure of second clutch 59 starts being increased from zero, thereby overlapping the reduction of clutch pressure of first clutch 58 with the increase of clutch pressure of second clutch 59 (i.e., performing the cross wave control). Then, the clutch pressure of second clutch 59 reaches a predetermined creeping clutch pressure so as to transmit power through half-engaged second clutch 59 instead of first clutch 58. In this way, according to the first pattern, the cross wave control of first and second clutches 58 and 59 is performed when both the clutch pressures of first and second clutches 58 and 59 are lower than the respective creeping clutch pressures.

While the brake pedal is depressed, the creeping clutch pressure of second clutch 59 is kept, i.e., second clutch 59 is kept half-engaged. Immediately after the depressed brake pedal is released, the clutch pressure of second clutch 59 starts increasing from the creeping pressure, and reaches the maximum (proper) pressure to establish the second speed travel of vehicle 1 (i.e., complete the shift down to the second speed). Then, the cross wave control is performed to increase the clutch pressure of first clutch 58 to the maximum and to simultaneously reduce the clutch pressure of second clutch 59 to zero, i.e., to engage first clutch 58 and to simultaneously disengage second clutch 59, thereby completing shift up to the third speed. In this way, according to the first pattern, after the releasing the brake, the clutch operation for completing the shift down to the second speed is performed before the return to the third speed.

According to the control pattern of FIG. 33(a), immediately after the depression of the brake pedal, the clutch pressure of engaged first or second clutch 58 or 59 is reduced while keeping the zeroed clutch pressure of disengaged clutch 58 or 59, so that a half clutch state is established before the vehicle traveling speed is zeroed. In this regard, the half clutch state is defined as the state where one of first and second clutches 58 and 59 is half-clutched and the other clutch 59 or 58 is disengaged or where the clutch pressures of both clutches 58 and 59 are less than the respective creeping pressures. Accordingly, vehicle 1 gently stops. Immediately after the depressed brake pedal, vehicle 1 gently starts to be accelerated because the half clutch state remains. The variation of vehicle traveling speed in the timing chart of FIG. 33(a) illustrates such gentle stopping and starting of vehicle 1.

In a timing chart of FIG. 33(b), according to a second clutch pressure variation pattern, the brake pedal is depressed in vehicle 1 traveling at the third speed so as to shift down transmission 19 to the second speed, then the depressed brake pedal is released, and vehicle 1 is accelerated so as to shift up transmission 19 to the third speed. In the second pattern, the reduction of clutch pressure of first clutch 58 does not start immediately after the depression of the brake pedal, but it starts after the reduced actual vehicle traveling speed reaches a certain value. In other words, the shift down is normally performed based on detection of the vehicle traveling speed. The clutch pressure of second clutch 59 starts to be increased from zero simultaneously to the start of reduction of clutch pressure of first clutch 58. In this way, the third-to-second shift-down is performed by the normal cross wave control of first and second clutches 58 and 59, so that both the clutch pressures of first and second clutches 58 and 59 can be simultaneously higher than respective creeping clutch pressures. Accordingly, the shift down effects as an engine brake so as to swiftly reduce the vehicle traveling speed.

While the brake pedal is depressed after the shift-down, the maximum (proper) clutch pressure of second clutch 59 is kept so as to transmit power through properly engaged second clutch 59. Therefore, when the depressed brake pedal is released, power is transmitted through engaged second clutch 59, thereby immediately starting increase of the vehicle traveling speed. Therefore, the traveling speed of unbraked vehicle 1 is quickly increased and reaches the proper value established by the second speed gear train soon. Afterward, according to an increase of the vehicle traveling speed, disengaged first clutch 58 is engaged and engaged second clutch 59 is disengaged, i.e., the cross wave control of clutches 58 and 59 is performed so that the clutch pressure of first clutch 58 is increased to the maximum and the clutch pressure of second clutch 59 is reduced to zero, so as to complete the shift up from the second speed to the third speed.

Figure 33:
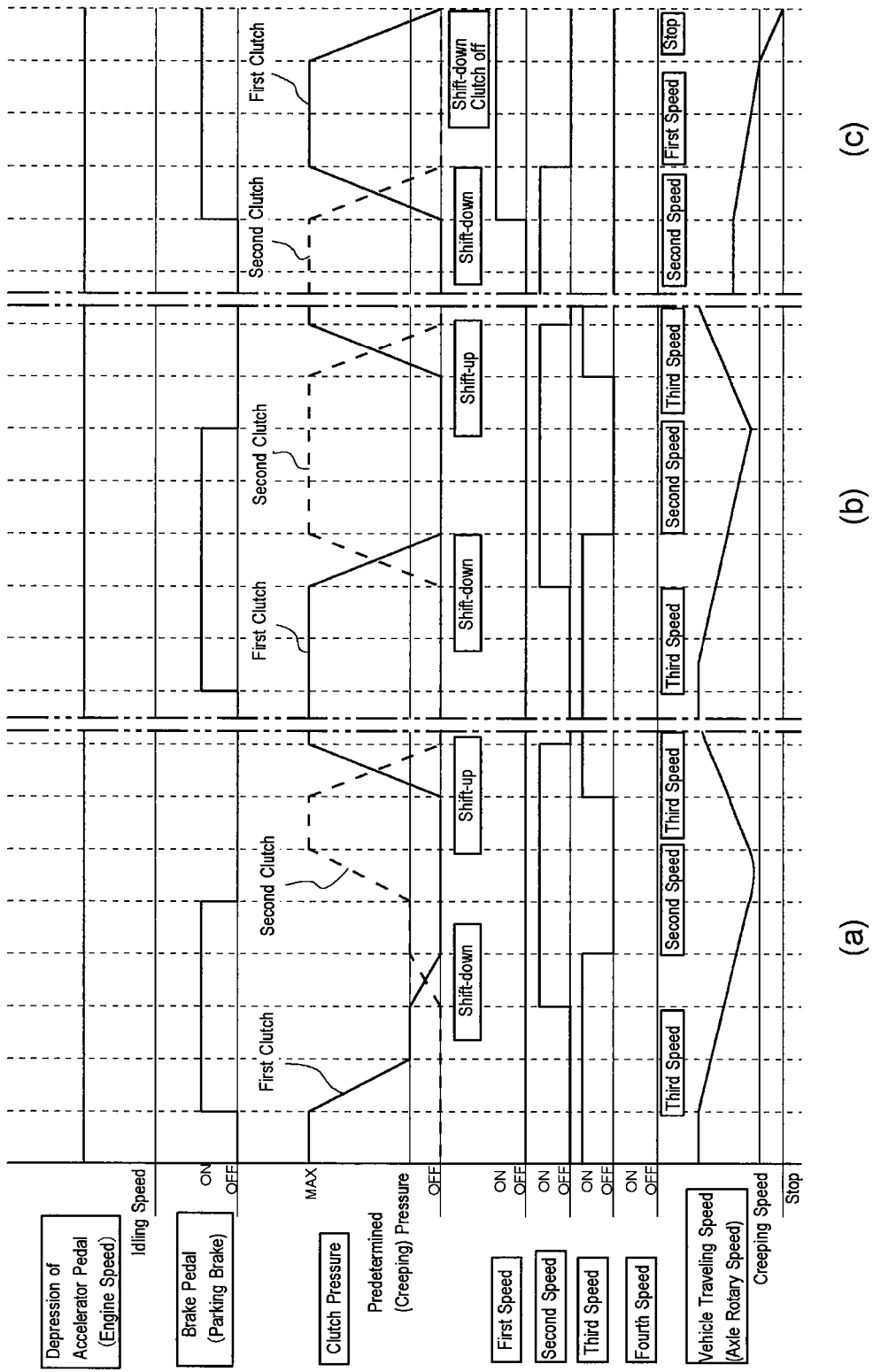
FIG. 33 is a timing chart of clutch control for reduction/stopping of the vehicle in association with operation of a brake.

In the control pattern of FIG. 33(*b*), both the clutch pressures of first and second clutches 58 and 59 are not kept to be the respective creeping pressures while vehicle 1 is braked. Strictly, a state of half-engagement of both first and second clutches 58 and 59 exists for the braking period. However, the state takes a very short time. Therefore, the shift-down effects sufficient engine braking, thereby swiftly stopping vehicle 1. Further, the depressed brake pedal is released while either first or second clutch 58 or 59 is engaged. Therefore, vehicle 1 starts to be accelerated immediately after releasing the depressed brake pedal. The variation of vehicle traveling speed in the timing chart of FIG. 33(*b*) illustrates such swift stopping and starting of vehicle 1.

Vehicle 1 may be provided with operation means, such as a switch, for selecting either the first or second shift-down control pattern (for example, from the third speed to the second speed as mentioned above) in association with the brake pedal operation.

In a timing chart of FIG. 33(*c*), vehicle 1 traveling at the second speed is completely stopped by depressing the brake pedal. When the brake pedal is depressed during the traveling of vehicle 1 at the second speed, reduction of the clutch pressure of second clutch 59 and increase of the clutch pressure of first clutch 58 start according to the corresponding shift-down graph, and the normal cross wave control of first and second clutches 58 and 59 is performed for shift-down from the second speed to the first speed.

After the first speed is established, the vehicle traveling speed becomes smaller and smaller as far as the brake pedal is kept depressed. Immediately after the reduced vehicle traveling speed reaches a predetermined stopping speed, the clutch pressure of first clutch 58 starts being reduced. Then, first clutch 58 is disengaged, i.e., both first and second clutches 58 and 59 are completely disengaged, thereby completely stopping vehicle 1.

Figure 34:
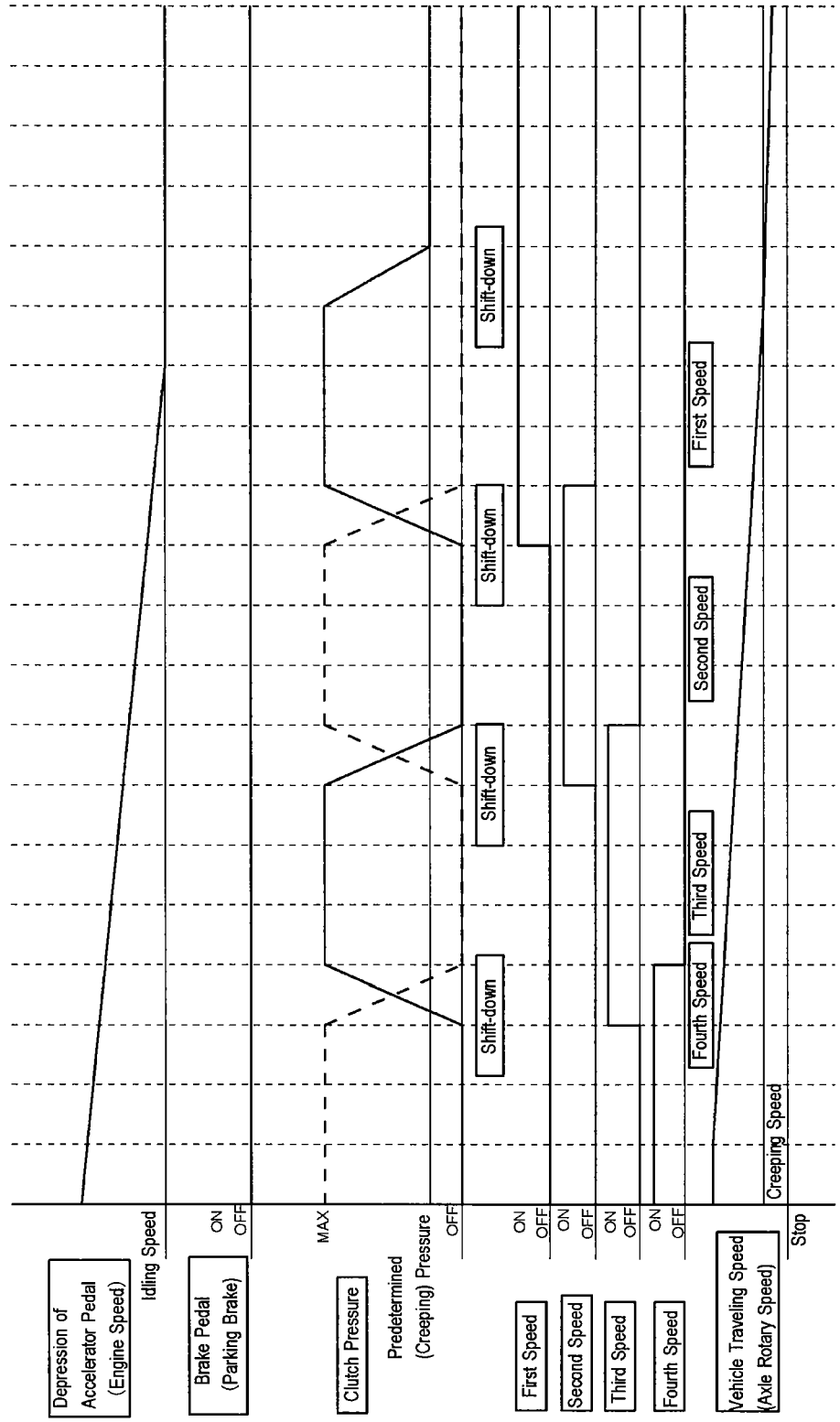
FIG. 34 is a timing chart of clutch control for reduction/stopping of the vehicle during inactivation of the brake.

Referring to FIG. 34, a shift-down control for natural deceleration of vehicle 1 by releasing the depressed accelerator pedal without depression of the brake pedal will be described.

In a timing chart of FIG. 34, the depression of the accelerator pedal in vehicle 1 traveling at the fourth speed is reduced. As the vehicle traveling speed is reduced, the normal cross wave controls of first and second clutches 58 and 59 are performed in series for respective shift-downs from the fourth speed to the third speed, from the third speed to the second speed, and from the second speed to the first speed.

After setting the first speed, when the vehicle traveling speed becomes lower than the predetermined stopping speed, the clutch pressure of first clutch 58 is reduced from the maximum (proper) pressure to the creeping pressure, whereby the reduced vehicle traveling speed naturally reaches the creeping speed. The creeping pressure of first clutch 58 is kept after the depression of the accelerator pedal becomes zero (or the engine rotary speed becomes idling rotary speed ER1). In other words, while the engine idles, the half-engagement of first clutch 58 (the creeping clutch pressure of first clutch 58), i.e., the half clutch state, is maintained as far as the brake pedal is undepressed. It is considerable that the half-engaged clutch is switched to be completely disengaged (the half clutch state is changed to the complete clutch off state) in association with depression of the brake pedal, for instance.

Two modifications of a dual-clutch type multi-speed transmission adaptable for the cross wave control of clutch pressure of the first and second clutches will be described with reference to FIGS. 35 and 36. Each modification is adaptable to any of multi-speed transmissions 19, 42 and 526. Hereinafter, reference numerals are referred on the assumption that each modification is adapted to multi-speed transmission 19 as shown in FIG. 6.

Figure 35:
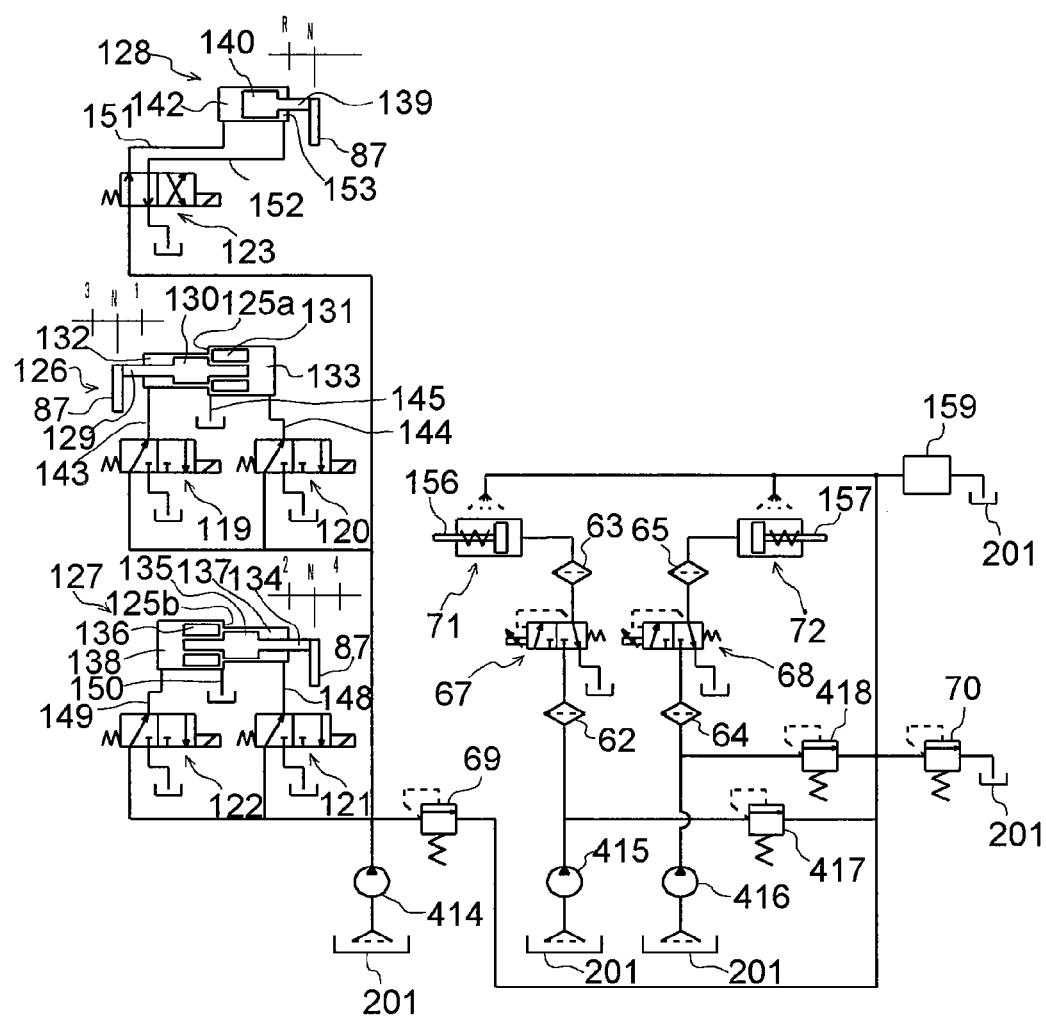
FIG. 35 is a hydraulic circuit diagram of the multi-speed transmission with the dual clutches, wherein a hydraulic circuit for gearshift is separated from another hydraulic circuit for operating clutches.

In a dual-clutch type multi-speed transmission shown in FIG. 35, a hydraulic circuit for supplying hydraulic pressure fluid for moving shifters 96*a*, 97*a* and 98*a* is separated from a hydraulic circuit for supplying hydraulic pressure fluid to hydraulic first and second clutches 58 and 59.

In the dual-clutch type multi-speed transmission shown in FIG. 35, separate hydraulic pressure fluid sources are provided for shifters 96*a*, 97*a* and 98*a* and for hydraulic clutches 58 and 59, respectively. Further, separate hydraulic pressure sources are provided for respective first and second clutches 58 and 59. In this regard, a pump 414 serves as the hydraulic pressure fluid source for the shifters. A relief valve 69 regulates hydraulic pressure supplied to the shifters. A pump 415 supplies fluid to electromagnetic proportional pressure reduction valve 67 for controlling first clutch 58, and relief valve 417 regulates hydraulic pressure supplied to first clutch 58. A pump 416 supplies fluid to electromagnetic proportional pressure reduction valve 68 for controlling second clutch 59, and relief valve 418 regulates hydraulic pressure supplied to second clutch 59.

Since hydraulic clutches 58 and 59 are supplied with fluid from the respective hydraulic pressure fluid sources which are separated from the hydraulic pressure fluid source to the shifters, the accuracy of cross wave control of first and second clutches 58 and 59 is improved.

Figure 36:
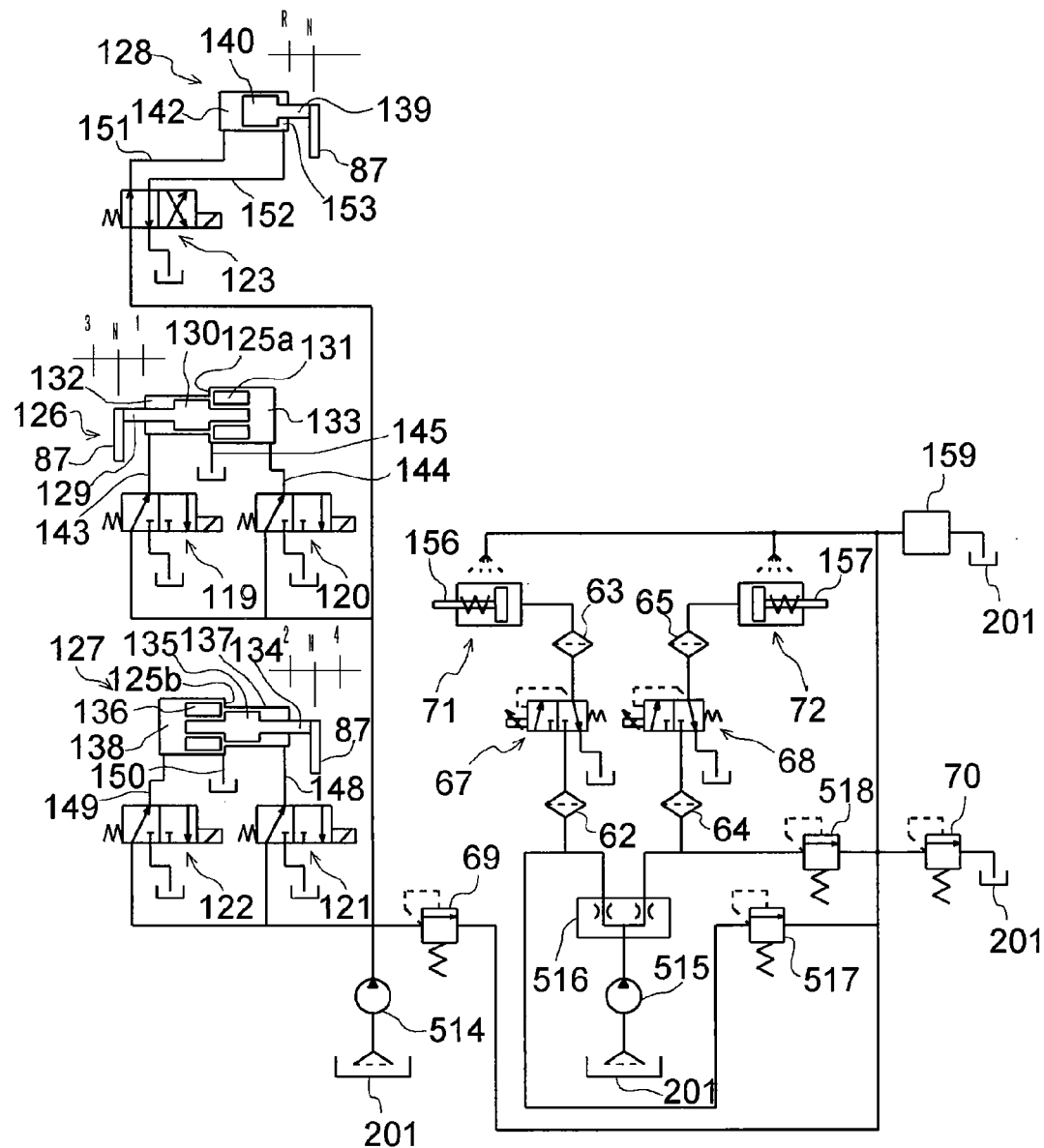
FIG. 36 is another hydraulic circuit diagram of the multi-speed transmission with the dual clutches, wherein a hydraulic circuit for gearshift is separated from another hydraulic circuit for operating clutches.

In a dual-clutch type multi-speed transmission shown in FIG. 36, a hydraulic circuit for supplying hydraulic pressure fluid for moving shifters 96*a*, 97*a* and 98*a* is separated from a hydraulic circuit for supplying hydraulic pressure fluid to hydraulic first and second clutches 58 and 59, similar to the multi-speed transmission of FIG. 35.

In the dual-clutch type multi-speed transmission shown in FIG. 36, separate hydraulic pressure fluid sources are provided for shifters 96*a*, 97*a* and 98*a* and for hydraulic clutches 58 and 59, respectively. In this regard, a pump 514 serves as the hydraulic pressure fluid source for the shifters. A relief valve 69 regulates hydraulic pressure supplied to the shifters. A common pump 515 is provided for supplying fluid to first and second clutches 58 and 59, and a distributing valve 516 distributes fluid from pump 515 between valves 67 and 68 for controlling respective first and second clutches 58 and 59. A relief valve 517 regulates hydraulic pressure supplied to first clutch 58, and a relief valve 518 regulates hydraulic pressure supplied to second clutch 59.

Since hydraulic clutches 58 and 59 are supplied with fluid from pump 515 independent of pump 514 for the shifters, the accuracy of cross wave control of first and second clutches 58 and 59 is improved.

A multi-speed transmission 199 according to a fourth embodiment will be described with reference to FIGS. 37 to 43. Transmission 199 includes multi-speed gear trains, consisting of plural speed (first to third speed) normal (forward traveling) gear trains and a reverse (backward traveling) gear train, a sub gear train, a main clutch 301 for the multi-speed gear trains and a sub clutch 302 for the sub gear train. Axles 25 and 36 are normally driven by one gear train selected among the multi-speed gear trains and by engaging main clutch 301. When a gearshift operation is performed, main clutch 301 is disengaged for one-to-another exchange of the gear train selected to be activated among the multi-speed gear trains, and simultaneously sub clutch 302 is engaged so as to transmit power of engine 5 to axles 25 and 36 through the sub gear train activated by engaging sub clutch 302 during the exchange of multi-speed gear trains.

Figure 2:
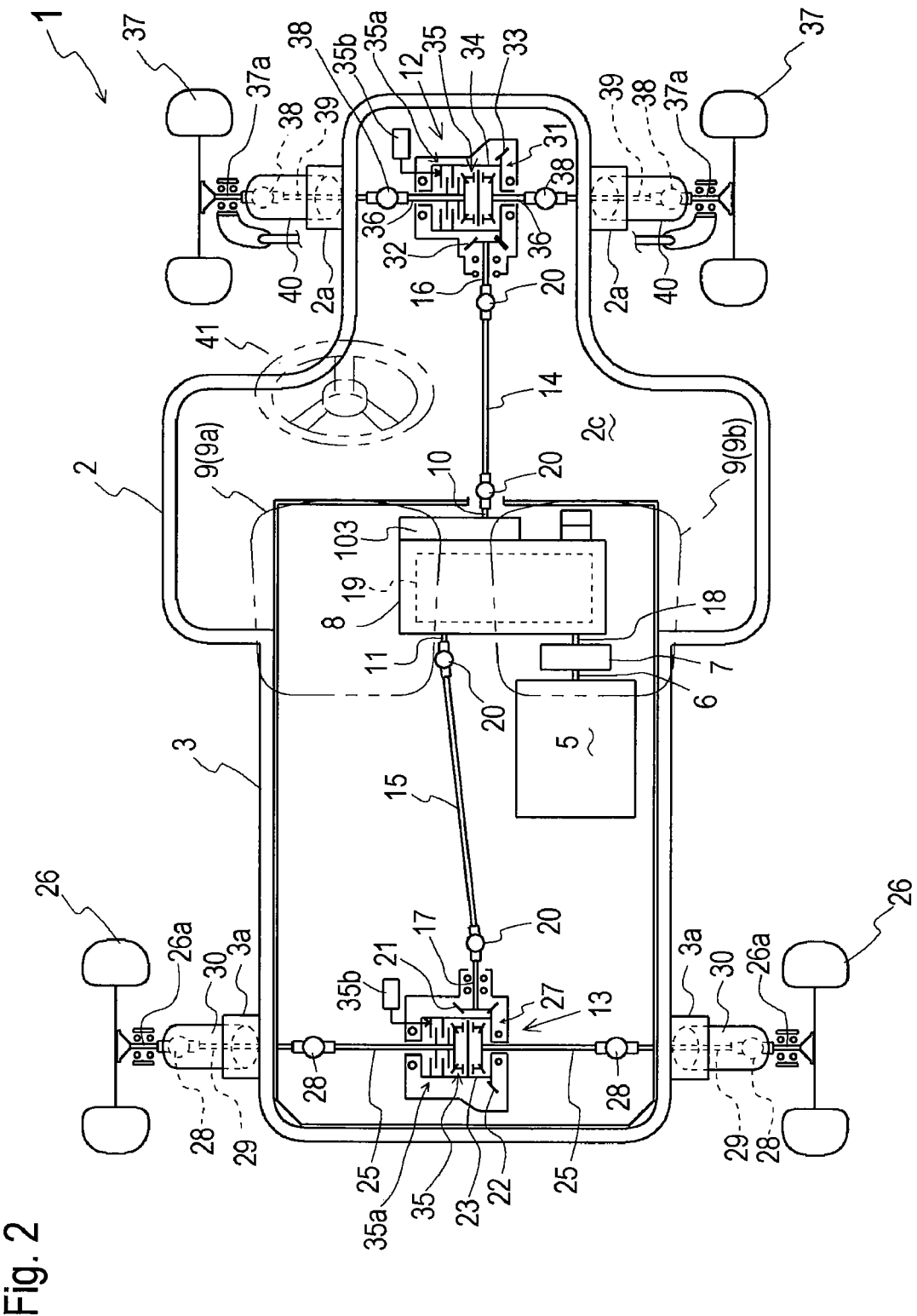
FIG. 2 is a schematic plan view of the utility vehicle.

In vehicle 1 as shown in FIGS. 1 and 2, engine 5 is disposed so as to orient its crankshaft in the fore-and-aft direction of vehicle 1. The left and right direction in the hereinafter description is based on the forward direction of vehicle 1 shown in FIGS. 1 and 2.

In transmission 199, input shaft 18 serves as an input member of transmission 199 for receiving power from engine 5, front and rear output shaft 346 and 11 serve as output members of transmission 199 for outputting the power of engine 5 to axles 25 and 36, and transmission shafts are interposed between the input and output members. The transmission shafts are a clutch input shaft 303, a counter shaft 308, a traveling gearshift drive shaft 311, and traveling gearshift driven shaft 316. Input shaft 18, front and rear output shafts 346 and 11, and transmission shafts 303, 308, 311 and 316 are fore-and-aft horizontally extended in parallel to one another.

Figure 37:
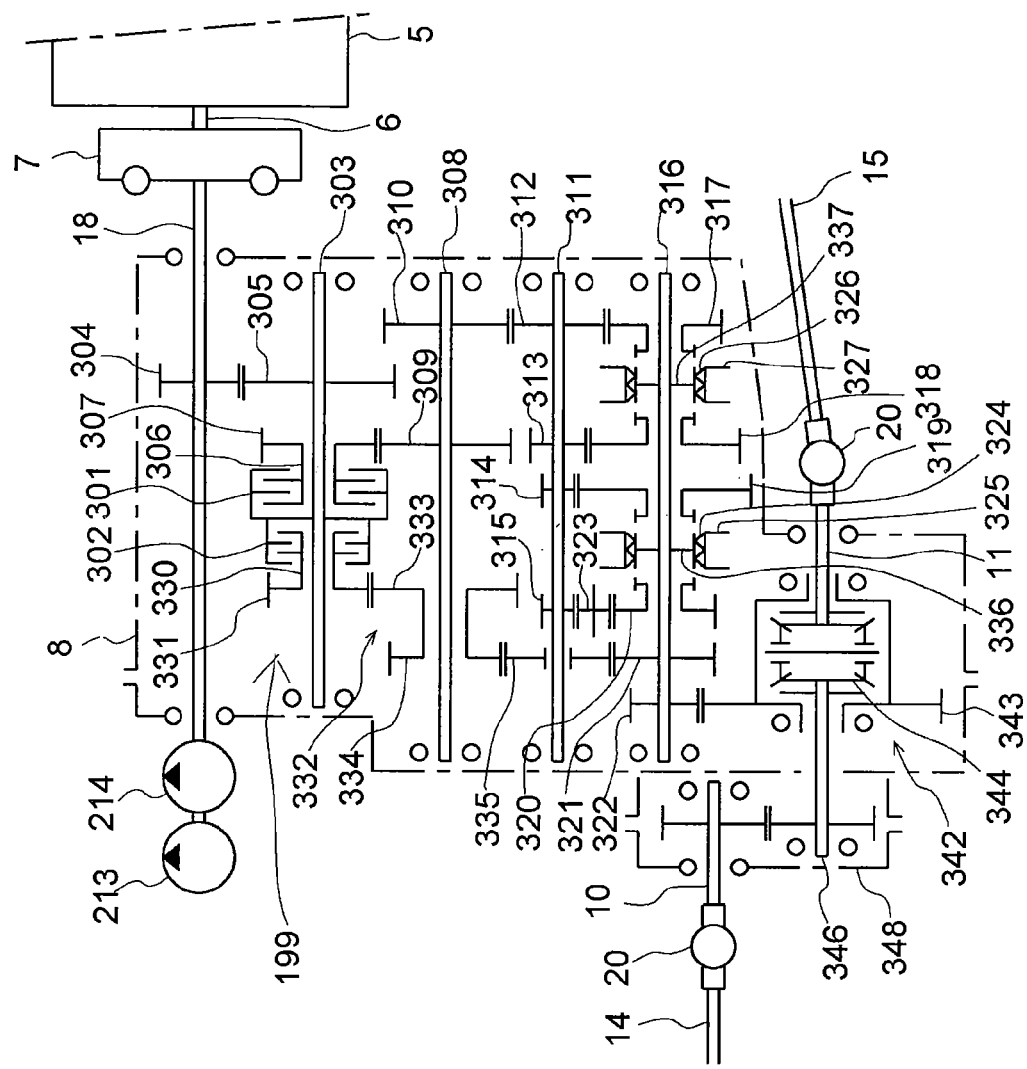
FIG. 37 is a skeleton diagram of a multi-speed transmission according to a fourth embodiment.
Figure 38:
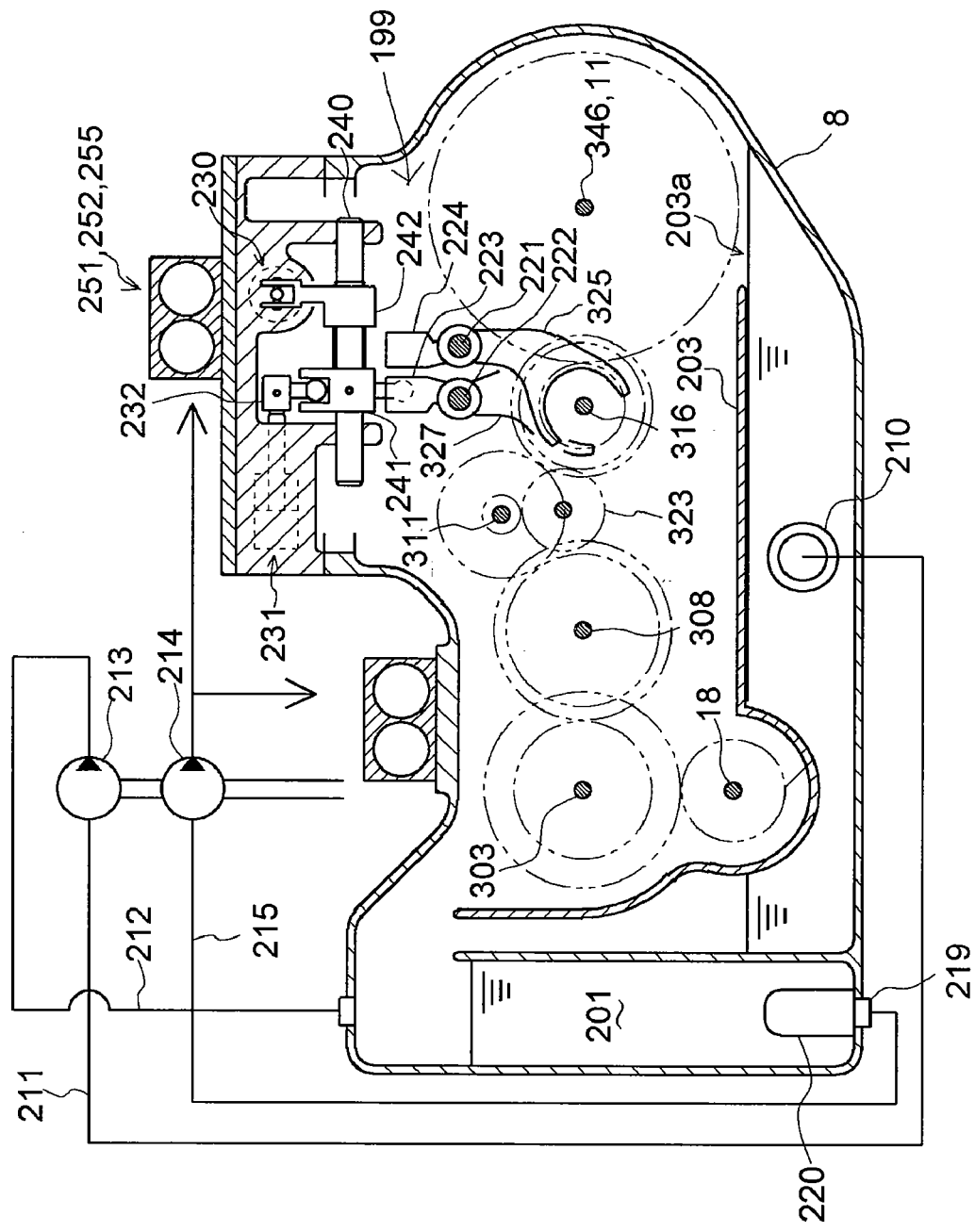
FIG. 38 is a sectional front view of the multi-speed transmission according to the fourth embodiment.

As shown in FIGS. 37 and 38, output shaft 6 of engine 5 is directly connected to input shaft 18 of transmission 199 through flywheel 7. A gear 304 is relatively unrotatably fitted on input shaft 18. Input shaft 18 projects forward from transmission casing 8 so as to also serve as a drive shaft for pumps 213 and 214.

Main clutch 301 is disposed above input shaft 18, and integrated with sub clutch 302 at a front portion thereof. Preferably, main and sub clutches 301 and 302 are wet type multi-disk clutches. Clutch housings of respective clutches 301 and 302 are fixed on common clutch input shaft 303. A gear 305 is fixed on clutch input shaft 303 and meshes with gear 304 fixed on input shaft 18, so as to transmit the rotary force of input shaft 18 to clutch input shaft 303.

During normal traveling of vehicle 1, power is transmitted from main clutch 301 to traveling gearshift driven shaft 316 through one of the multi-speed gear trains. In this regard, a cylindrical main clutch output shaft 306 is extended rearward from main clutch 301 and relatively rotatably fitted on clutch input shaft 303. A gear 307 is relatively unrotatably fitted on main clutch output shaft 306. Wet multi friction disks of main clutch 301 are interposed between the clutch housing of main clutch 301 and main clutch output shaft 306 so that the friction disks relatively unrotatably fitted to the clutch housing and the friction disks relatively unrotatably fitted to main clutch output shaft 306 are alternately aligned.

Counter shaft 308 is disposed leftward from clutch input shaft 303. A gear 309 is relatively unrotatably fitted on a rear portion of counter shaft 308, and meshes with gear 307 fixed on main clutch output shaft 306. A gear 310 is relatively unrotatably fitted on a rear end of counter shaft 308 so as to transmit power to traveling gearshift drive shaft 311.

Traveling gearshift drive shaft 311 is disposed upwardly leftward from counter shaft 308. A third speed normal drive gear 312 is relatively unrotatably fitted on a rear end of traveling gearshift drive shaft 311. Third speed normal drive gear 312 meshes with gear 310 fixed on counter shaft 308 so as to also serve as an input shaft for inputting power to traveling gearshift drive shaft 311. In this way, traveling gearshift drive shaft 311 receives the rotary force of main clutch output shaft 306 through gears 307, 309, 310 and 312.

Traveling gearshift drive shaft 311 is fixedly (relatively unrotatably) provided thereon with third speed normal drive gear 312, a second speed normal drive gear 313 disposed in front of third speed normal drive gear 312, a first speed normal drive gear 314 disposed in front of second speed normal drive gear 313, and a reverse drive gear 315 disposed in front of first speed normal drive gear 314.

Traveling gearshift driven shaft 316 is disposed downwardly leftward from traveling gearshift drive shaft 311, and relatively rotatably provided thereon with a third speed normal driven gear 317, a second speed normal driven gear 318 disposed in front of third speed normal driven gear 317, a first speed normal driven gear 319 disposed in front of second speed normal driven gear 318, and a reverse driven gear 320 disposed in front of first speed normal driven gear 319. Normal driven gears 319, 318 and 317 mesh with respective normal drive gears 314, 313 and 312 fixed on traveling gearshift drive shaft 311, and reverse driven gear 320 meshes with reverse drive gear 315 fixed on traveling gearshift drive shaft 311 through an idle gear 323.

Figure 39:
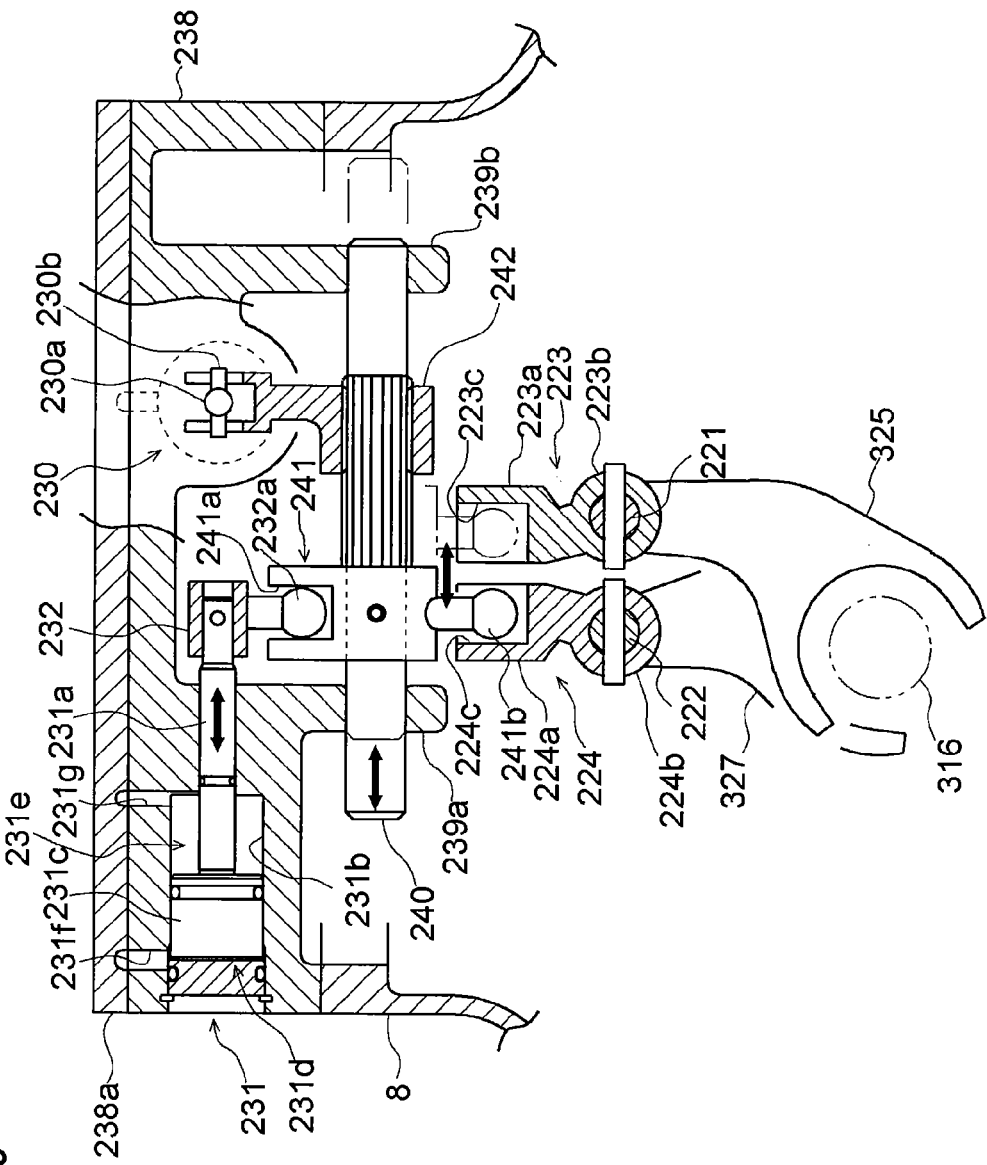
FIG. 39 is a sectional front view of a fork control mechanism in the multi-speed transmission according to the fourth embodiment.

Traveling gearshift driven shaft 316 is fixedly provided thereon with a first splined hub 336 disposed between reverse driven gear 320 and first speed normal driven gear 319. A first shifter 324 is axially slidably and relatively unrotatably fitted on first splined hub 336 and is engaged with a first fork 325 as shown in FIG. 39 so as to be shiftable among a reverse (backward traveling) position, a neutral position and a first speed normal (forward traveling) position along traveling gearshift driven shaft 316. When first shifter 324 is disposed at the reverse position, first shifter 324 relatively unrotatably connects reverse driven gear 320 to traveling gearshift driven shaft 316 through a synchronizer and first splined hub 336. When first shifter 324 is disposed at the first speed normal position, first shifter 324 relatively unrotatably connects first speed normal driven gear 319 to traveling gearshift driven shaft 316 through a synchronizer and first splined hub 336. When first shifter 324 is disposed at the neutral position, both gears 319 and 320 remain relatively rotatably fitted to traveling gearshift driven shaft 316.

Figure 40:
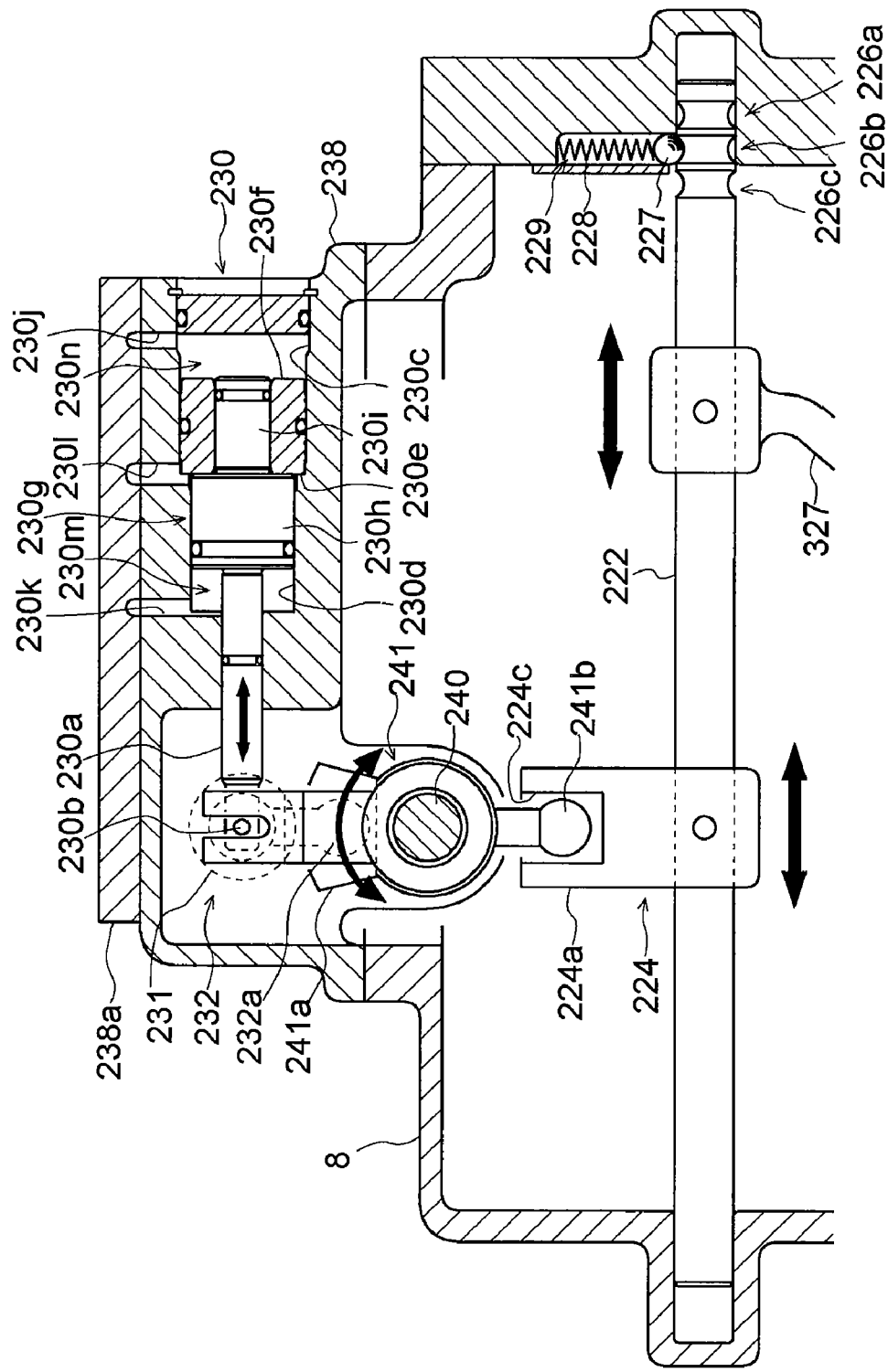
FIG. 40 is a sectional left side view of the fork control mechanism.

Traveling gearshift driven shaft 316 is also fixedly provided thereon with a second splined hub 337 disposed between second speed normal driven gear 318 and third speed normal driven gear 317. A second shifter 326 is axially slidably and relatively unrotatably fitted on second splined hub 337, and is engaged with a second fork 327 as shown in FIGS. 39 and 40, so as to be shiftable among a second speed normal (forward traveling) position, a neutral position and a third speed normal (forward traveling) position along traveling gearshift driven shaft 316. When second shifter 326 is disposed at the second speed normal position, second shifter 326 relatively unrotatably connects second speed normal driven gear 318 to traveling gearshift driven shaft 316 through a synchronizer and second splined hub 337. When second shifter 326 is disposed at the third speed normal position, second shifter 326 relatively unrotatably connects first speed normal driven gear 317 to traveling gearshift driven shaft 316 through a synchronizer and second splined hub 337. When second shifter 326 is disposed at the neutral position, both gears 317 and 318 remain relatively rotatably fitted to traveling gearshift driven shaft 316.

During traveling of vehicle 1, either first or second fork 325 or 327 is shifted to selectively drivingly (relatively unrotatably) connect one of driven gears 317, 318, 319 and 320 to traveling gearshift driven shaft 316 through corresponding splined hub 336 or 337.

Traveling gearshift driven shaft 316 is further relatively unrotatably fitted thereon with a driven gear 321 of the sub gear train, and with a gear 322. Gear 322 meshes with a bull gear 343 of a center differential gear unit 342, so as to transmit the rotary force of traveling gearshift driven shaft 316 to a bevel gear train 344 in center differential gear unit 342. Bevel gear train 344 distributes the rotary force of bull gear 343 between rear output shaft 11 and front output shaft 346. Rear output shaft 11 projects rearward from transmission casing 8 and is drivingly connected to rear propeller shaft 15 through universal joint 20. A front-wheel driving gear casing 348 is attached onto a front end of transmission casing 8, and front output shaft 346 is extended from center differential gear unit 342 into front-wheel driving gear casing 348, so as to be drivingly connected to front output shaft 10 through a gear train in front-wheel driving gear casing 348. Fore-and-aft front output shaft 10 is disposed at a laterally middle portion of transmission casing 8, and projects forward from front-wheel driving gear casing 348 so as to be drivingly connected to front propeller shaft 14 through universal joint 20.

Description will be given of power transmission from sub clutch 302 with the sub drive train. Sub clutch 302 is provided for continuously (unintermittently) transmitting power to traveling gearshift driven shaft 316 even during the gearshift operation. Therefore, sub clutch 302 is engaged only when the power transmission from main clutch 301 is shut off, i.e., main clutch 301 is disengaged. Preferably, sub clutch 302 is a slippable hydraulic multi-disk clutch in which the number of friction disks and the diameter of a piston are considered so as to ensure a capacity of sub clutch 302 that is smaller than the capacity of main clutch 301.

As shown in FIG. 37 and as mentioned above, sub clutch 302 and main clutch 301 are integrated with each other, and share common clutch input shaft 303. A cylindrical sub clutch output shaft 330 is extended forward from sub clutch 302, and is relatively rotatably fitted on clutch input shaft 303. A gear 331 is relatively unrotatably fitted on sub clutch output shaft 330. A double gear 332, including a diametrically larger gear 333 and a diametrically smaller gear 334, is relatively rotatably fitted on counter shaft 308. Diametrically larger gear 333 meshes with gear 331. A counter gear 335 is relatively rotatably fitted on traveling gearshift drive shaft 311 and meshes with diametrically smaller gear 334. Further, counter gear 335 meshes with driven gear 321 fixed on traveling gearshift driven shaft 316. In this way, the sub drive train comprises gear 331, double gear 332, gear 335 and driven gear 321, so as to transmit the rotary force of sub clutch output shaft 330 to traveling gearshift driven shaft 316.

Incidentally, the deceleration ratio of the sub drive train is set so as to substantially correspond to the third speed serving as the maximum speed of transmission 199.

A mechanism for controlling main clutch 301 and sub clutch 302 will be described. Referring to a hydraulic circuit of FIG. 41, a first hydraulic actuator 271 is provided for engaging and disengaging main clutch 301, and a second actuator 272 is provided for engaging and disengaging sub clutch 302.

An electromagnetic proportional pressure reduction valve 273 supplies or drains fluid to and from first hydraulic actuator 271 for main clutch 301. Due to the proportional pressure reduction effect of valve 273, the pressure of fluid supplied to first actuator 271 is gradually changed, so that the clutch pressure of main clutch 301 continuously (gradually) changes between zero and the maximum (proper) pressure determined by a relief valve 298, as understood from a later-discussed variation of clutch pressure of main clutch 301 for a period between timings D and F in FIG. 42. Main clutch 301 is half-engaged on the way of change of its clutch pressure, and when the clutch pressure of main clutch 301 is the maximum, main clutch 301 is engaged firmly (not slippably).

An electromagnetic switching valve 274 supplies or drains fluid to and from second hydraulic actuator 272 for sub clutch 302. Due to the switching of valve 274, the switching of second actuator 272 is instantaneous, so that the clutch pressure of sub clutch 302 is selectively set to either zero or the maximum (proper) pressure, as understood from a later-discussed variation of clutch pressure of sub clutch 302 at a timing E in FIG. 42. However, even when the clutch pressure of sub clutch 302 is the maximum, sub clutch 302 is slippable because of its capacity smaller than that of main clutch 301.

Figure 41:
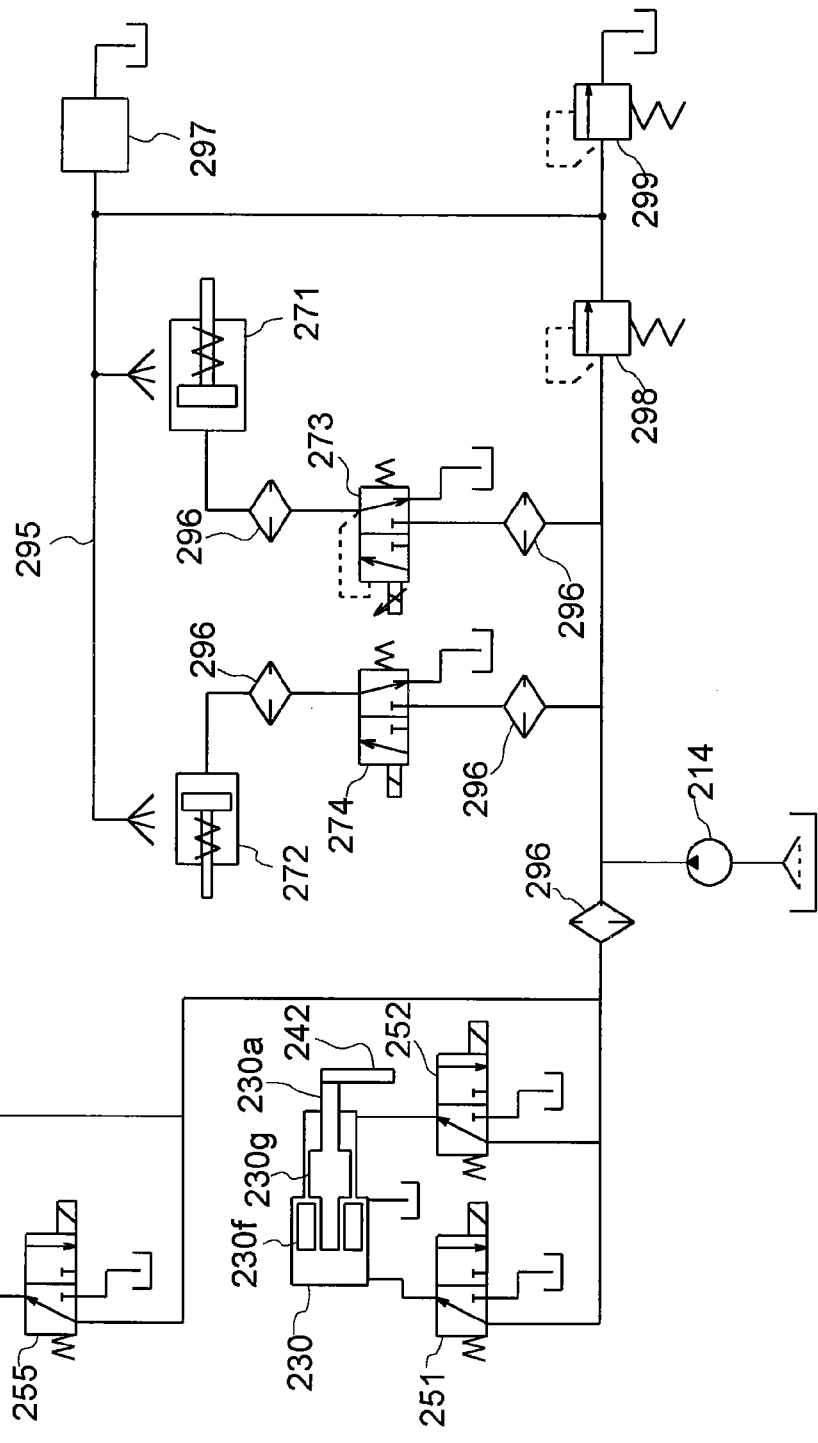
FIG. 41 is a hydraulic circuit diagram for gearshift or clutch operation according to the fourth embodiment.

Pump 214 supplies fluid from a fluid sump in transmission casing 8 to actuators 271 and 272 and later-discussed cylinders 230 and 231. The clutch controlling hydraulic circuit including actuators 271 and 272 and a shifter controlling hydraulic circuit including cylinders 230 and 231 are connected in parallel to pump 214, and regulated in hydraulic pressure by relief valve 298. A lubrication oil passage 295 is extended downstream of relief valve 298 so as to supply excessive hydraulic pressure fluid serving as lubricating fluid to first and second actuators 271 and 272, and the pressure of lubricating fluid is regulated by a relief valve 299. In FIG. 41, an element 297 represents other components lubricated by fluid from passage 295, such as the multi-speed gear trains and the sub gear train. Fluid filters 296 are provided on suitable portions of the clutch controlling hydraulic circuit.

A mechanism for controlling first and second forks 325 and 327 will be described. Referring to FIGS. 39 and 40, as mentioned above, first and second forks 325 and 327 are engaged to respective first and second shifters 324 and 326. More specifically, as shown in FIG. 39, fork-like shaped lower portions of forks 325 and 327 are fitted into respective annular grooves of shifters 324 and 326.

First and second shifter shafts 221 and 222 are axially slidably extended in the fore-and-aft horizontal direction above traveling gearshift driven shaft 316, and laterally juxtaposed at the same height. First fork 325 is fixed onto first shifter shaft 221, and second fork 326 is fixed onto second shifter shaft 222.

As shown in FIG. 40, second shifter shaft 222 is axially slidably passed through front and rear walls of transmission casing 8. Second shifter shaft 222 is peripherally formed thereon with annular grooves 226a, 226b and 226c, one of which can be selectively opened to a bottom opening of a vertical hole 229 upwardly bored in the rear wall of transmission casing 8. A spring 228 and a detent ball 227 are fitted in hole 229 so as to constitute a detent mechanism for holding second shifter shaft 222 at selected one of a second speed normal (forward traveling) position, a neutral position and a third speed normal (forward traveling) position.

In this way, detent ball 227 pressed by spring 228 toward second shifter shaft 222 is selectively fitted into one of grooves 226a, 226b and 226c, in correspondence to the axial sliding position of second shifter shaft 222. When ball 227 is fitted into groove 226a, second shifter shaft 222 is held at the second speed normal position. When ball 227 is fitted into groove 226b, second shifter shaft 222 is held at the neutral position. When ball 227 is fitted into groove 226a, second shifter shaft 222 is held at the third speed normal position. First shifter shaft 221 is provided with a similar detent mechanism such as to be selectively held at one of a reverse (backward traveling) position, a neutral position and a first speed normal (forward traveling) position.

As shown in FIGS. 39 and 40, hydraulic cylinders 230 and 231 constitute a fork control mechanism for moving first and second forks 325 and 327. In the fork control mechanism, cylinder 231 is activated for selectively sliding one of first and second shifter shafts 221 and 222, thereby locating fork 325 or 327 (with shifter 324 or 326) on selected shifter shaft 221 or 222. In this regard, when first shifter shaft 221 is selectively slid, first fork 325 (with first shifter 324) is shifted among the reverse position, the neutral position and the first speed normal position. When second shifter shaft 222 is selectively slid, second fork 327 (with second shifter 326) is shifted among the second speed normal position, the neutral position and the third speed normal position.

As shown in FIGS. 39 and 40, hydraulic cylinders 230 and 231 are disposed in a shifter casing 238 attached onto the top of transmission casing 8 so as to cover the top opening above first and second shifter shafts 221 and 222. Cylinder 231 serves as a selector for selecting one of first and second forks 325 and 327 to be slid. Cylinder 230 serves as a shifter controlling actuator for sliding first and second shifter shafts 221 and 222 with respective first and second forks 325 and 327 in the fore-and-aft direction.

Referring to FIG. 39, the selector for selecting a fork to be moved will be described. A piston rod 231a of hydraulic cylinder 231 is extended horizontally leftward (rightward in FIG. 39) perpendicular to the axial direction of a piston rod 230a of cylinder 230. On the assumption that piston rod 230a is extended forward, piston rod 230a is shiftable between a rear position as illustrated in FIG. 40 and a front position. An engaging member 232, formed with an engaging ball-shaped bottom portion 232a, is fixedly fitted on a tip of piston rod 231a.

As shown in FIGS. 39 and 40, a fork control shaft 240 is disposed below cylinder 231. Fork control shaft 240 is extended laterally in parallel to piston rod 231a, and axially slidably supported at opposite ends thereof by respective support legs 239a and 239b.

A lever 241 is fixed on fork control shaft 240. A basal portion 241c of lever 241 is relatively unrotatably and axially unslidably fitted on fork control shaft 240. An upward, forward and rearward opened engaging recess 241a is formed in a top portion of lever 241. Engaging ball-shaped portion 232a is engaged into engaging recess 241a. Lever 241 is formed with a substantially ball-shaped bottom portion 241b.

As shown in FIGS. 39 and 40, an engaging member 224 is fixed on second shifter shaft 222 in front of second fork 327. An engaging member 224 includes a basal portion 224b relatively unrotatably and axially (fore-and-aft) unslidably fitted on second shifter shaft 222. Engaging member 224 also includes an engaging portion 224a formed with an upward and leftward opened engaging recess 224c into which ball-shaped bottom portion 241b of lever 241.

As shown in FIG. 39, an engaging member 223 is fixed on first shifter shaft 221 in front of first fork 325, and adjoined leftward of engaging member 224. An upward and rightward opened engaging recess 223c is formed in engaging member 223. Therefore, adjoining engaging members 223 and 224 with respective recesses 223c and 224c are laterally symmetrically formed. When both shifter shafts 221 and 222 are disposed at the respective neutral positions, as show in FIG. 39, the rightward opening of recess 223c faces the leftward opening of recess 224c.

Referring to FIG. 39, both shifter shafts 221 and 222 are disposed at the respective neutral positions, and the vertical openings of recesses 223c and 224c face each other. In this state, ball-shaped portion 241b of lever 241 is shiftable between a position where it is engaged into only recess 223c and a position where it is engaged into only recess 224c.

FIG. 39 illustrates that piston rod 231a of cylinder 231 is withdrawn to arrange the tip of piston rod 231a at the right (in FIG. 39, left) position so that ball-shaped portion 241b of lever 241 is engaged in recess 224c on the side of second shifter shaft 222. When piston rod 231a is thrust out so as to move its tip leftward (in FIG. 39, rightward), engaging member 232 pushes lever 241 leftward so as to slide fork control shaft 240 leftward. Consequently, ball-shaped portion 241b of lever 241 moves from recess 224c to recess 223c on the side of first shifter shaft 221. Due to the function of cylinder 231 as the selector, either shifter shaft 221 or 222 to be moved is selected.

Referring to FIGS. 39 and 40, the function of hydraulic cylinder 230 as the shifter controlling actuator for moving either fork 325 or 327 (i.e., either shifter shaft 221 or 222) selected by hydraulic cylinder 231 will be described. In this regard, electromagnetic switching valves 251 and 252 (see FIG. 41) are controlled to shift the tip of piston rod 230a among three positions, i.e., a front position, a middle position and a rear position (on the assumption that the extension direction of piston rod 230a is forward).

An engaging pin 230b horizontally penetrates the tip of piston rod 230a and engages with a lever 242 for rotating fork control shaft 240. Lever 242 is axially slidably and relatively unrotatably spline-fitted at a bottom portion thereof onto fork control shaft 240 so as to convert the telescopic movement of piston rod 230a into the rotation of fork control shaft 240 centered on the axis thereof.

In FIGS. 39 and 40, second shifter shaft 222 with second fork 327 is selected to be moved by cylinder 230 through lever 241. The tip of piston rod 230a is disposed at the middle position so as to locate second fork 327 at the neutral position. When valves 251 and 252 are controlled to move the tip of piston rod 230a from the middle position to the front position, lever 242 rotates together with fork control shaft 240 and lever 241 counterclockwise when viewed in left side. Due to the rotation of lever 241, ball-shaped bottom portion 241b of lever 241 in engaging portion 224a of engaging member 224 pushes second shifter shaft 222 with engaging member 224 rearward. Consequently, second fork 327 (second shifter 326) moves to the third speed normal position so as to relatively unrotatably connect third speed normal driven gear 317 to traveling gearshift driven shaft 316 through splined hub 337.

On the contrary, when the tip of piston rod 230a moves from the middle position to the rear position, second shifter shaft 222 is pushed forward. Consequently, second fork 327 (second shifter 326) moves to the second speed normal position so as to relatively unrotatably connect second speed normal driven gear 318 to traveling gearshift driven shaft 316 through the synchronizer and second splined hub 337.

It is assumed that lever 241 is disposed so as to select first shifter shaft 221 to be shifted. When the tip of piston rod 230a is moved from the middle position to the front position, first fork 325 (first shifter 324) is pushed together with first shifter shaft 221 rearward to the first speed normal position so as to relatively unrotatably connect first speed normal driven gear 319 to traveling gearshift driven shaft 316 through first splined hub 336. When the tip of piston rod 230a is moved from the middle position to the rear position, first fork 325 (first shifter 324) is pushed together with first shifter shaft 221 forward to the reverse position so as to relatively unrotatably connect reverse driven gear 320 to traveling gearshift driven shaft 316 through first splined hub 336.

Construction and control manner of hydraulic cylinders 230 and 231 will be described. Referring to FIG. 40, three-positioned hydraulic cylinder 230 for shifting forks 325 and 327 is formed in shift casing 238 so as to have a rear first chamber 230c and a front second chamber 230d which is diametrically smaller than first chamber 230c. Shift casing 238 is formed with a shoulder portion 230e created by the diametric difference between first and second chambers 230c and 230d.

Cylinder 230 is provided with a first piton 230f and a second piston 230g. Second piston 230g includes a front diametrically large portion 230h and a rear diametrically small portion 230i. Ring-shaped first piston 230f is axially (fore-and-aft) slidably and fluid-tightly fitted on diametrically small portion 230i, and into first chamber 230c. Diametrically large portion 230h of second piston 230g is axially (fore-and-aft) slidably and fluid-tightly fitted into second chamber 230d. Piston rod 230a is extended forward from a front end surface of second piston 230g.

In first chamber 230c, a rear space behind first piston 230f filled with fluid is defined as a first fluid chamber 230m. In second chamber 230d, a front space in front of second piston 230g filled with fluid is defined as a second fluid chamber 230n.

A hydraulic pressure fluid suction-and-delivery port 230j is formed in a wall of shift casing 238 upward from a rear end portion of first chamber 230c, so that first fluid chamber 230m is fluidly connected to electromagnetic valve 251 through port 230j and a fluid duct formed in a duct plate 238a attached onto the top of shifter casing 238. In this way, electromagnetic valve 251 switches the hydraulic pressure of fluid in first fluid chamber 230m between a proper pressure determined by a relief valve 298 and a drain pressure (see FIG. 41).

A hydraulic pressure fluid suction-and-delivery port 230k is formed in a wall of shift casing 238 upward from a front end portion of second chamber 230d, so that second fluid chamber 230n is fluidly connected to electromagnetic valve 252 through port 230k and a fluid duct formed in duct plate 238a. In this way, electromagnetic valve 252 switches the hydraulic pressure of fluid in second fluid chamber 230n between a proper pressure determined by relief valve 298 and a drain pressure (see FIG. 41).

Further, shift casing 238 is formed in an upper portion of shoulder portion 230e with a hydraulic pressure fluid suction-and-delivery port 230l connected to the fluid sump in transmission casing 8 through a duct formed in duct plate 238a. The hydraulic pressure in port 230l is constantly kept low (the drain pressure).

Electromagnetic valves 251, 252 and 255 are mounted on the top surface of duct plate 238a. The ducts formed in duct plate 238a are grooves opened downward to the top surface of shift casing 238. When duct plate 238a is joined to shift casing 238, the grooves are closed by the top surface of shift casing 238 except for portions thereof opened to respective ports 230J, 230k and 230l, thereby fluidly connecting electromagnetic valves 251, 252 and 255 to hydraulic cylinders 230 and 231 formed in shift casing 238.

When electromagnetic valves 251 and 252 control so as to pressurize first fluid chamber 230m to the proper pressure and to depress second chamber 230n to the drain pressure, the tip of piston rod 230a is disposed at the front position. When electromagnetic valves 251 and 252 control so as to depress first fluid chamber 230m to the drain pressure and to pressurize second chamber 230n to the proper pressure, the tip of piston rod 230a is disposed at the rear position. When electromagnetic valves 251 and 252 control so as to pressurize both first and second fluid chambers 230m and 230n to the respective proper pressures, the tip of piston rod 230a is disposed at the middle position.

Referring to the movement of cylinder 230, when first fluid chamber 230m is properly pressurized and second fluid chamber 230n is depressed, the hydraulic pressure in first fluid chamber 230m pushes diametrically large portion 230h of second piston 230g backward so that the rear end surface of diametrically small portion 230i of second piston 230g and the rear end surface of first piston 230f fitted on diametrically small portion 230i are pressed against a cap disposed at the rear end of cylinder 230, thereby retaining the tip of piston rod 230a at the rear position.

On the contrary, when first fluid chamber 230m is depressed and second fluid chamber 230n is properly pressurized, the hydraulic pressure in second fluid chamber 230n pushes diametrically small portion 230i of second piston 230g and first piston 230f fitted on diametrically small portion 230i forward so that the front end surface of diametrically large portion 230h of second piston 230g is pressed against a front end wall surface of cylinder 230, thereby retaining the tip of piston rod 230a at the front position.

When first and second fluid chambers 230m and 230n are evenly pressurized to the proper pressures, second piston 230g is pushed rearward by the hydraulic pressure of fluid in first fluid chamber 230m because the area of the front end surface of diametrically large portion 230h receiving the hydraulic pressure in first fluid chamber 230m exceeds the area of the rear end surface of diametrically small portion 230i receiving the hydraulic pressure in second fluid chamber 230n. On the other hand, first piston 230f is pushed forward against diametrically large portion 230h of second piston 230g by the hydraulic pressure of fluid in second fluid chamber 230n and is pressed against shoulder 230e, because the area of the rear end surface of first piston 230f receiving the hydraulic pressure in second fluid chamber 230n exceeds the area of the front end surface of diametrically large portion 230h of second piston 230g receiving the hydraulic pressure in first fluid chamber 230m. Consequently, as illustrated in FIG. 40, second piston 230g is retained at the position where diametrically large portion 230h is pressed against first piston 230f retained by shoulder 230e, thereby surely retaining the tip of piston rod 230a at the middle position.

Hydraulic cylinder 231 serving as the selector for selecting either fork 325 or 327 will be described with reference to FIG. 39. Two-position switched hydraulic cylinder 231 includes a horizontally axial cylinder chamber 231b formed in shift casing 238, and a piston 231c is axially (laterally) slidably and fluid-tightly fitted in cylinder chamber 231. Piston rod 231a is extended from one end surface of piston 231c laterally of vehicle 1. In cylinder chamber 231b, a space on one side of piston 231c filled with fluid is defined as a first fluid chamber 231d, and a space on the other side of piston 231c filled with fluid is defined as a second fluid chamber 231e.

As shown in FIG. 39, hydraulic pressure fluid suction-and-delivery ports 231f and 231g are formed in a wall of shift casing 238 upward from respective left and right ends of cylinder chamber 231b. As shown in FIG. 41, first fluid chamber 231d is fluidly connected to electromagnetic switching valve 255 through port 231f and a duct formed in duct plate 238a. Valve 255 is switchable between one position for supplying first fluid chamber 231d with fluid delivered from pump 214 and regulated by relief valve 298 and the other position for draining fluid from first fluid chamber 231d. In other words, the hydraulic pressure in first fluid chamber 231d is switchable between a high (proper) pressure determined by relief valve 298 and a low (drain) pressure. On the other hand, second fluid chamber 231e is constantly supplied through port 231g and a duct formed in duct plate 238a with fluid delivered from pump 214 and regulated in pressure by relief valve 298 without another valve.

Referring to FIGS. 39 and 41, the area of piston 231c facing first fluid chamber 231d is larger than the area of piston 231c facing second fluid chamber 231e because piston rod 231a exists in second fluid chamber 231e. Due to the area difference of piston 231c, when first fluid chamber 231d is pressurized to the proper pressure equal to the pressure in second fluid chamber 231e, piston rod 231a is extended, i.e., the tip of piston rod 231a is moved leftward (rightward in FIG. 39), so as to select first shifter shaft 221 and first fork 325. When fluid is drained from first fluid chamber 231d, piston rod 231a is contracted, i.e., the tip of piston rod 231a is moved rightward (leftward in FIG. 39), so as to select second shifter shaft 222 and second fork 327.

An automatic gearshift control by multi-speed transmission 199 will be described. Main clutch 301, sub clutch 302 and first and second forks 325 and 327 are automatically controlled for gearshift of transmission 199 in correspondence to depression of the accelerator pedal (opening degree of the throttle valve of engine 5) and the actual vehicle traveling speed (rotary speed of axles 25 and 36). When engine 5 is started up, all electromagnetic valves 251, 252 and 255 are unexcited as shown in FIG. 41, so that hydraulic cylinder 231 serving as the selector selects second shifter shaft 222, and hydraulic cylinder 230 serving as the shifter controlling actuator holds shifter shaft 222 at the neutral position.

Figure 43:
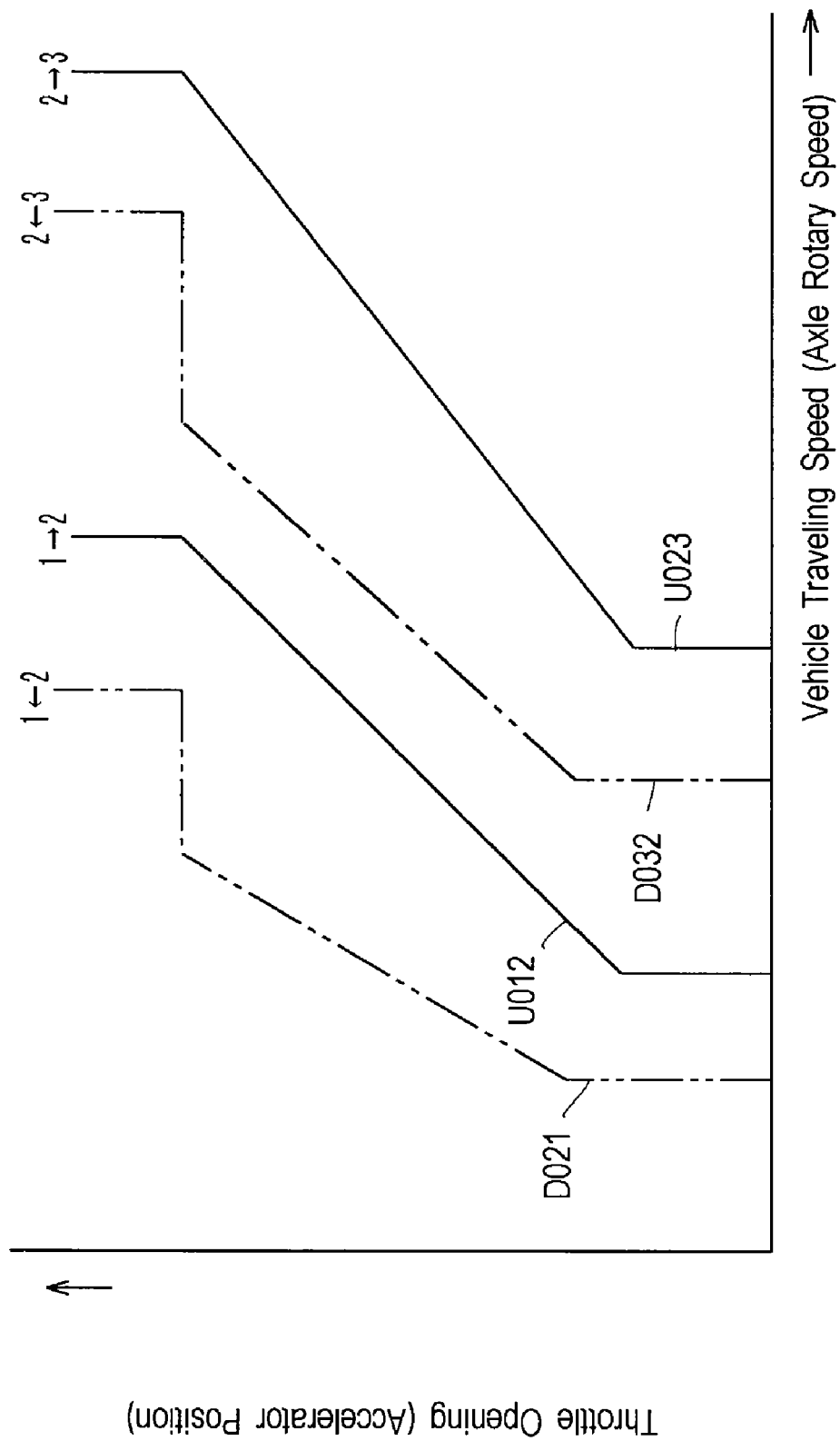
FIG. 43 is a map of characteristic curves according to the fourth embodiment.

A shift-up or shift-down signal is issued from the controller according to a map of FIG. 43 based on detection of the vehicle traveling speed by the vehicle traveling speed sensor and detection of the accelerator position by the accelerator sensor or detection of the throttle valve opening by the throttle sensor. The above-mentioned description of the gearshift of transmission 19 (42) referring to FIG. 8 is adaptable for the gearshift of transmission 199 referring to FIG. 43. For example, while an accelerator position is kept, graph D021 for shift-down from the second speed to the first speed corresponds to a vehicle traveling speed less than that to which graph U012 for shift-up from the first speed to the second speed corresponds, thereby reducing the frequency of gearshift between the first and second speeds.

Figure 42:
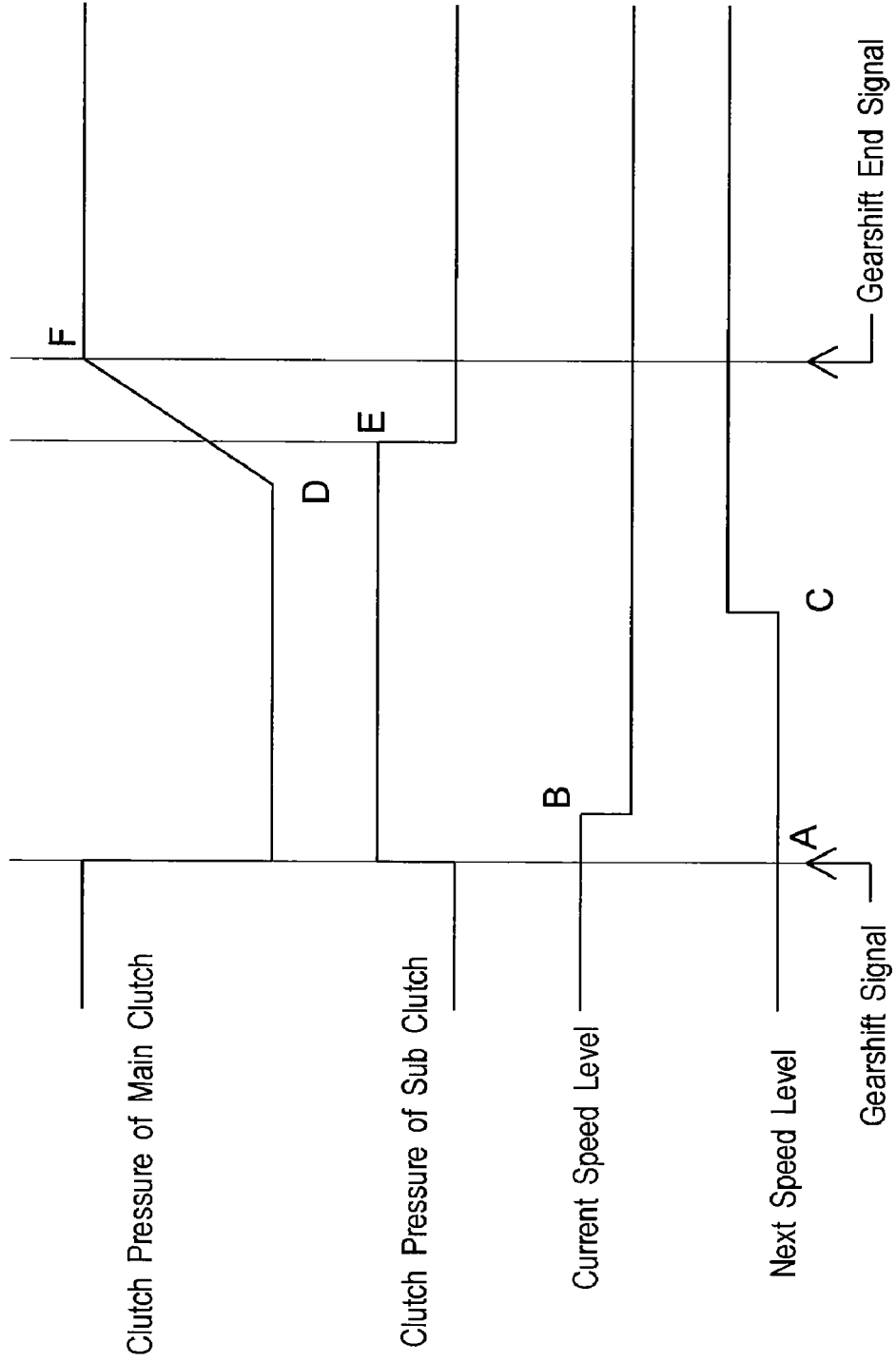
FIG. 42 is a diagram showing a gearshift control process according to the fourth embodiment.

Referring to FIG. 42, a representative gearshift control when the accelerator pedal is depressed for shift-up from the first speed to the second speed will be described. During the first speed traveling of vehicle 1, referring to FIG. 37, main clutch 301 is engaged, and sub clutch 302 is disengaged. First fork 325 is disposed at the rear first speed normal position, so that first speed normal driven gear 319 is drivingly connected to traveling gearshift driven shaft 316. Second fork 327 (second shifter 326) is disposed at the neutral position.

In FIG. 42, when the vehicle traveling speed is increased and the first-to-second speed shift-up signal is issued at a timing A, electromagnetic proportional pressure reduction valve 273 is switched for disengaging main clutch 301, and simultaneously, electromagnetic valve 274 is shifted to engage sub clutch 302. Consequently, while main clutch 301 does not transmit power to any gear train for gearshift, sub clutch 302 transmits power to the sub drive (gear) train.

As mentioned above, the speed ratio of the sub gear train between sub clutch output shaft 330 and traveling gearshift driven shaft 316 substantially corresponds to the third speed established by the third speed normal gear train. Accordingly, during the first-to-second speed shift-up, the rotary speed of sub clutch output shat 330 is different from that of clutch input shaft 303, i.e., sub clutch output shaft 330 rotates slower than clutch input shaft 303. However, sub clutch 302 slips because the capacity of sub clutch 302 is smaller than that of main clutch 301. Thus, the rotation of sub clutch output shaft 330 is not completely synchronized to that of clutch input shaft 303. In other words, sub clutch 302 and the sub drive train transmit only a supplementary power to traveling gearshift driven shaft 316 such as to keep a required traveling performance of vehicle 1 while main clutch 301 is disengaged.

As shown in FIG. 42, the controller issues a signal for separating first speed normal driven gear 319 from traveling gearshift driven shaft 316 (see FIG. 37) at a timing B after the shift-up signal is issued, sub clutch 302 is engaged and main clutch 301 is disengaged. In this regard, referring to FIG. 41, electromagnetic valves 251 and 252 are shifted so as to locate the tip of piston rod 230a at the middle position. Accordingly, first fork 325 (first shifter 324) moves from the first speed normal position to the neutral position so as to separate first speed normal driven gear 319 from traveling gearshift driven shaft 316.

Referring to FIG. 42, the controller issues a signal for drivingly connecting second speed normal driven gear 318 to traveling gearshift driven shaft 316 (see FIG. 37) at a timing C after first speed normal driven gear 319 is disengaged from traveling gearshift driven shaft 316. In this regard, referring to FIG. 41, electromagnetic valves 255 is shifted so as to contract piston rod 231a of cylinder 231. Accordingly, as shown in FIG. 39, ball-shaped portion 241b of lever 241 moves from recess 223c on the side of first fork 325 to recess 224c on the side of second fork 327. As shown in FIG. 41, electromagnetic valves 251 and 252 are shifted so as to move the tip of piston rod 230a of cylinder 230 from the middle position to the front position. Accordingly, second fork 327 (second shifter 326) moves from the neutral position to the second speed normal position so as to relatively unrotatably connect second speed normal driven gear 318 to traveling gearshift driven shaft 316. Sub clutch 302 still transmits the supplementary power to traveling gearshift driven shaft 316.

In FIG. 42, a signal for engaging main clutch 301 is issued at a timing D after a while since the issue of the signal for moving second fork 327. Accordingly, electromagnetic proportional pressure reduction valve 273 is controlled to gradually increase the clutch pressure of main clutch 301.

The clutch pressure of main clutch 301 becomes substantially equal to the clutch pressure of sub clutch 302 at a timing E. Then, electromagnetic valve 274 is shifted to disengage sub clutch 302. Therefore, the power transmission by sub clutch 302 and the sub drive train is shifted into the power transmission by main clutch 301 and the selected speed gear train.

The clutch pressure of main clutch 301 is still increased, and reaches the maximum (proper) pressure at a timing F. At this time, second fork 327 (second shifter 326) completely reaches the second speed normal position, thereby completing the first-to-second speed shift-up.

The other speed shift-up and shift-down processes are similar to the above-mentioned first-to-second speed shift-up process. However, the gearshift (shift-up or shift-down) between the second speed and the third speed does not require movement of lever 241, i.e., shift of piston rod 231a of cylinder 231.

As mentioned above, mechanical gear type multi-speed transmission 199 ensures continuous (unintermittent) smooth power transmission by the automatic gearshift using sub clutch 302 and the sub drive (gear) train.

In transmission 199, main clutch 301 serves as a start-up clutch to be engaged for start of vehicle 1.

As mentioned above referring to FIG. 37, while output shaft 6 of engine 5 is disposed fore-and-aft of vehicle 1, multi-speed transmission 199 has the same advantage of multi-speed transmission 19 that the transmission shafts interposed between input shaft 18 and front and rear output shafts 10 and 11 are extended fore-and-aft of vehicle 1 and are juxtaposed laterally so as to vertically minimize transmission casing 8. The horizontal alignment of shifter shafts 221 and 222 also ensures the vertical minimization of transmission casing 8.

Referring to FIG. 38, transmission casing 8 incorporating multi-speed transmission 199 is formed therein with a fluid tank 201 partitioned from a chamber incorporating multi-speed transmission 199 by a vertical wall, so as to absorb fluid from the chamber of multi-speed transmission 199, and lower the level of the fluid sump in the chamber of multi-speed transmission 199, thereby reducing the power loss caused by resistance of fluid against agitation of a gear of multi-speed transmission 199.

Pump 213 driven by input shaft 18 absorbs fluid from the chamber of multi-speed transmission 199 through a drain port 210 with a strainer to the outside of transmission casing 8, and into tank 201 formed in transmission casing 8 through pipes 211 and 212. In transmission casing 8, a top portion of tank 201 is opened to the chamber of multi-speed transmission 199 over the vertical partition, so as to allow fluid to overflow from tank 201 into the chamber of multi-speed transmission 199.

Pump 214 driven by input shaft 18 drains fluid from a bottom drain port 219 of tank 201 through an oil filter 220 and supplies it as lube into transmission casing 8 through a pipe 215. The control valves and hydraulic actuators for gearshift are supplied with a part of fluid stored in tank 201, or alternatively they may be supplied with fluid from another hydraulic pressure fluid source.

In this way, pump 213 forcibly drains fluid from the fluid sump in transmission casing 8, and pump 214 supplies fluid as lube and hydraulic pressure fluid into transmission casing 8. Consequently, the level of fluid sump in the chamber of multi-speed transmission 199 becomes sufficiently low so as to reduce the power loss caused by agitation resistance of fluid, thereby ensuring efficient high-speed traveling of vehicle 1.

The leak of lube and hydraulic pressure fluid is substantially proportionally increased according to increase of engine rotary speed. However, the rotary speed of pumps 213 and 214 driven by input shaft 18 is also substantially proportionally increased according to increase of engine rotary speed, thereby increasing the speed of absorbing leaked fluid in proportion to the increase of leaked fluid. Further, the delivery quantity of pump 213 is set to be considerably larger than that of pump 214 so as to constantly maintain the overflow from tank 201 to the chamber of multi-speed transmission 199. In this way, the optimally determined level of fluid sump in the chamber of multi-speed transmission 199 is kept so as to ensure the effect of reducing power loss caused by the agitation resistance of fluid.

A horizontal partition 203 is formed in a lower portion of the chamber of multi-speed transmission 199 below the gears of multi-speed transmission 199 so as to prevent left or right ones of the gears from being deeply submerged in the fluid sump when vehicle 1 is laterally tilted on a rough road.

The portion of the chamber of multi-speed transmission 199 above partition 203 is defined as a gear chamber, and the portion of the chamber below partition 203 is defined as a fluid sump chamber. The left end (referring to FIG. 38, the right end) of partition 203 is separated from the left (referring to FIG. 38, right) end wall of transmission casing 8 so as to form an opening 203a just below coaxial shafts 346 and 11 in the gear chamber, so that the fluid sump chamber is opened to the gear chamber through opening 203a, thereby collecting fluid leaked from the gears into the fluid sump chamber. The above-mentioned vertical partition wall is erected from the bottom of transmission casing 8 to partition tank 201 from the gear chamber, and a right (referring to FIG. 38, left) end portion of partition 203 laterally opposite to opening 203a is bend and extended upward in parallel to the vertical partition wall of transmission casing 8 so as to allow fluid to overflow over the top of the vertical partition wall from tank 201 to the fluid sump chamber. An alternative external tank may be disposed outside transmission casing 8 instead of inner tank 201.

Shafts 346 and 11 are the slowest rotating shafts of the transmission shafts of multi-speed transmission 199. Even when fluid in the fluid sump chamber overflows into the gear chamber through opening 203a, low-speed rotating gears on shafts 346 and 11 are mainly submerged into the overflowing fluid, thereby preventing increase of power loss caused by the agitation resistance of fluid.

Alternatively, in multi-speed transmission 199, a proportional pressure reduction valve similar to that for controlling main clutch 301 may be provided for controlling sub clutch 302, instead of electromagnetic valve 274. Therefore, the clutch pressure, i.e., slip rate of sub clutch 302 can be optimized in correspondence to difference of speed level, or to whether the gearshift is shift-up or shift-down, so as to optimize the deceleration ratio of the sub drive train.

Alternatively, multi-speed transmission 199 may have other numbered speed levels than the three speed levels.

It is further understood by those skilled in the art that the foregoing descriptions are preferred embodiments of the disclosed apparatus and that various changes and modifications may be made in the invention without departing from the spirit and scope thereof defined by the following claims.

INDUSTRIAL APPLICABILITY

The present vehicle is provided with an economic and durable transmission which performs gearshift while continuously transmitting power from engine to axles, and ensures efficient high-speed traveling and efficient traveling start. Various vehicles, such as a tractor, a utility vehicle having a cargo, a buggy, and an all-terrain vehicle, are applicable.

What is claimed is:

1. A vehicle transmission system for transmitting power from a prime mover to an axle, comprising:
   a speed-changing mode setting means, wherein a reverse mode can be set by the speed-change mode setting means;
   a reversing operation member that is shiftable between a forward traveling position and a backward traveling position; and
   a multi-speed transmission including:
   an input portion for receiving power from the prime mover;
   an output portion for outputting power to the axle;
   a first drive train group including odd-numbered speed drive trains for forward-traveling;
   an odd-numbered speed shifter for selecting one odd-numbered speed drive train to be ready for transmitting power from the input portion to the output portion;

a first clutch for the first drive train group, wherein when the odd-numbered speed shifter selects one of the odd-numbered speed drive trains and the first clutch is engaged, power of the input portion is transmitted to the output portion via the selected odd-numbered speed drive train and the engaged first clutch;

a second drive train group including even-numbered speed drive trains for forward-traveling;

an even-numbered speed shifter for selecting one even-numbered speed drive train to be ready for transmitting power from the input portion to the output portion;

a second clutch for the second drive train group, wherein when the even-numbered speed shifter selects one of the even-numbered speed drive trains and the second clutch is engaged, power of the input portion is transmitted to the output portion via the selected even-numbered speed drive train and the engaged second clutch, and wherein, when the clutch-engagement is shifted between the first and second clutches, an engagement action of one of the first and second clutches and a disengagement action of the other of the first and second clutches overlap;

a backward traveling drive train belonging to either the first or second drive train group, wherein the first or second clutch for the first or second drive train group including the backward traveling drive train serves as a backward traveling clutch;

a backward traveling shifter for selecting the backward traveling drive train to be ready for transmitting power from the input portion to the output portion, wherein, when the backward traveling shifter selects the backward traveling drive train and the backward traveling clutch is engaged, power of the input portion is transmitted to the output portion via the selected backward traveling drive train and the engaged backward traveling clutch, and wherein, when the reverse mode is set by the speed-changing mode setting means, the backward traveling drive train is selected by the backward traveling shifter, and one odd or even numbered speed drive train belonging to the first or second drive train group that does not include the backward traveling drive train is selected by the corresponding odd or even numbered speed shifter so as to be defined as a forward traveling drive train selected in the reverse mode, so that, when the reversing operation member is set at the forward traveling position, the first or second clutch that does not serve as the backward traveling clutch is engaged and the first or second clutch that serves as the backward traveling clutch is disengaged so as to transmit power from the input portion to the output portion via the forward traveling drive train selected in the reverse mode, and so that, when the reversing operation member is set at the backward traveling position, the first or second clutch that serves as the backward traveling clutch is engaged and the first or second clutch that does not serve as the backward traveling clutch is disengaged so as to transmit power from the input portion to the output portion via the selected backward traveling drive train.

2. The vehicle transmission system according to claim 1, wherein the the first drive train group is disposed downstream of the first clutch so that, when the first clutch is engaged after one odd-numbered speed drive train is selected by the odd-numbered speed shifter, the selected odd-numbered speed drive train receives power from the input portion via the engaged first clutch, wherein the second drive train group is disposed downstream of the second clutch so that, when the second clutch is engaged after one even-numbered speed drive train is selected by the even-numbered speed shifter, the selected even-numbered speed drive train receives power from the input portion via the engaged second clutch, and wherein, when the first or second clutch that serves as the backward traveling clutch is engaged after the backward traveling drive train is selected by the backward traveling shifter, the backward traveling drive train receives power from the input portion via the engaged first or second clutch that serves as the backward traveling clutch.

3. The vehicle transmission system according to claim 1, wherein the backward traveling drive train has a deceleration ratio larger than a standard deceleration ratio, and wherein the standard deceleration ratio is calculated by averaging deceleration ratios possessed by the odd-and-even numbered speed drive trains.

4. The vehicle transmission system according to claim 1, further comprising:

a sub transmission disposed downstream of the multi-speed transmission, wherein the sub transmission has plural sub speed drive trains, and wherein the reverse mode is realized only when a certain sub speed drive train of the sub transmission is selected to receive power outputted from the multi-speed transmission.

5. The vehicle transmission system according to claim 1, further comprising:

a rated speed selection means for selecting one of several forward traveling speeds each of which is defined as a speed of a forward traveling power outputted by each of the odd and even number speed drive trains of the first and second drive train groups, wherein the forward traveling speed selected by the rated speed selection means is defined as a rated forward traveling speed, wherein an odd or even numbered speed drive train for outputting power whose speed is the rated forward traveling speed is defined as a rated forward traveling speed drive train, and wherein the forward traveling drive train selected in the reverse mode is the rated forward traveling speed drive train or another odd or even numbered speed drive train for outputting power whose speed is another forward traveling speed lower than the rated forward traveling speed.

6. The vehicle transmission system according to claim 5, wherein, when a load on the prime mover during traveling of a vehicle exceeds a threshold load, the rated forward traveling speed is automatically changed to a provisional rated forward traveling speed lower than the forward traveling speed originally selected as the rated forward traveling speed, whereby the forward traveling drive train selected in the reverse mode is an odd or even numbered speed drive train for outputting power whose speed is the provisional rated forward traveling speed or another odd or even numbered speed drive train for outputting power whose speed is lower than the provisional rated forward traveling speed.

7. The vehicle transmission system according to claim 5, wherein an accelerator is provided to be operated for changing a rotary speed of the prime mover, and wherein an actual backward traveling speed of a vehicle by driving the backward traveling drive train and by fully operating the accelerator for increasing the rotary speed of the prime mover does not exceed an actual forward traveling speed of the vehicle by driving the rated forward traveling speed drive train and by fully operating the accelerator for increasing the rotary speed of the prime mover.

* * * * *